United States Patent
Ikeda et al.

(10) Patent No.: US 8,036,008 B2
(45) Date of Patent: Oct. 11, 2011

(54) DC/DC POWER CONVERTING APPARATUS

(75) Inventors: Matahiko Ikeda, Tokyo (JP); Takahiro Urakabe, Tokyo (JP); Kiyoharu Anzai, Tokyo (JP); Akihiko Iwata, Tokyo (JP); Hirotoshi Maekawa, Tokyo (JP); Toshiyuki Kikunaga, Tokyo (JP); Masaru Kobayashi, Tokyo (JP); Tatsuya Okuda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 397 days.

(21) Appl. No.: 12/441,025

(22) PCT Filed: May 17, 2007

(86) PCT No.: PCT/JP2007/000527
§ 371 (c)(1),
(2), (4) Date: Mar. 12, 2009

(87) PCT Pub. No.: WO2008/032424
PCT Pub. Date: Mar. 20, 2008

(65) Prior Publication Data
US 2010/0019753 A1    Jan. 28, 2010

(30) Foreign Application Priority Data

Sep. 15, 2006  (JP) ................................. 2006-250442

(51) Int. Cl.
*H02M 7/10* (2006.01)
(52) U.S. Cl. ........................................... 363/68; 363/65
(58) Field of Classification Search .................... 363/65, 363/67–71; 323/222–225, 268, 271, 282, 323/288
See application file for complete search history.

(56) References Cited

U.S. PATENT DOCUMENTS

| | | | |
|---|---|---|---|
| 5,761,058 A | 6/1998 | Kanda et al. | |
| 6,172,882 B1 | 1/2001 | Tanaka et al. | |
| 6,359,424 B2 * | 3/2002 | Iida et al. | 323/251 |
| 7,619,907 B2 * | 11/2009 | Urakabe et al. | 363/37 |

(Continued)

FOREIGN PATENT DOCUMENTS

JP    63 190551    8/1988

(Continued)

OTHER PUBLICATIONS

Deriha, F. et al., "Control Method of Resonant Switched Capacitor Converter", The Institute of Electronics, Information and Communication Engineers, IEICE Communication Society Conference, p. 228, (2006), (with partial English translation).

(Continued)

*Primary Examiner* — Matthew Nguyen
(74) *Attorney, Agent, or Firm* — Oblon, Spivak, McClelland, Maier & Neustadt, L.L.P.

(57) ABSTRACT

Three or more circuits including a driving inverter circuit and rectifier circuits are connected in series, each of the circuits including a high-voltage side MOSFET and a low-voltage side MOSFET connected in series as well as a smoothing capacitor having positive and negative terminals between which the MOSFETs are connected. LC series circuits, each including a capacitor and an inductor, are disposed individually between one specific circuit and the other circuits with periods of resonance of the LC series circuits made equal to one another. In performing DC/DC power conversion through charging and discharging operation of the capacitors, a resonance phenomenon of the LC series circuits is used to improve conversion efficiency and achieve a reduction in size of the apparatus structure.

22 Claims, 23 Drawing Sheets

U.S. PATENT DOCUMENTS

| | | | |
|---|---|---|---|
| 7,729,144 B2 * | 6/2010 | Urakabe et al. ............. 363/71 |
| 2005/0099827 A1 | 5/2005 | Sase et al. | |
| 2005/0105313 A1 | 5/2005 | Bocchiola | |
| 2008/0252145 A1 | 10/2008 | Urakabe et al. | |
| 2008/0253156 A1 | 10/2008 | Urakabe et al. | |

FOREIGN PATENT DOCUMENTS

| | | |
|---|---|---|
| JP | 7 298608 | 11/1995 |
| JP | 9 47032 | 2/1997 |
| JP | 9 191638 | 7/1997 |
| JP | 2000 324851 | 11/2000 |
| JP | 2005 108840 | 4/2005 |
| JP | 2005 151608 | 6/2005 |
| JP | 2006 262619 | 9/2006 |

OTHER PUBLICATIONS

Shoyama, M. et al., "Operation Analysis of Boost Resonant Switched Capacitor Converter", The Institute of Electrical Engineers of Japan, No. 3-005, vol. 3, pp. 7-8, (2004) (with English translation).

U.S. Appl. No. 12/439,829, filed Mar. 4, 2009, Urakabe, et al.

* cited by examiner

DC/DC POWER CONVERTING APPARATUS

TECHNICAL FIELD

The present invention relates to a DC/DC power converting apparatus for converting a DC voltage into a raised or lowered DC voltage.

BACKGROUND ART

A DC/DC converter known as a conventional DC/DC power converting apparatus is configured with an inverter circuit provided with two or more semiconductor switches including a semiconductor switch connected to a positive potential and a semiconductor switch connected to a negative potential, and a voltage-multiplier rectifier circuit provided with a plurality of series-connected rectifiers and a plurality of series-connected capacitors, wherein the inverter circuit produces an AC voltage and, further, the voltage-multiplier rectifier circuit produces a high DC voltage which is supplied to a load (refer to Patent Document 1, for example).

A switched capacitor converter which is another example of a conventional DC/DC power converting apparatus is configured with an inverter circuit and a voltage-doubler rectifier circuit, wherein a capacitor is connected in series with an inductor. The switched capacitor converter increases charging/discharging currents to and from the capacitor by using an LC resonance phenomenon to realize power conversion in which a reduction in efficiency is insignificant even when a large amount of electric power is transferred (refer to Non-patent Document 1, for example).

Patent Document 1: Japanese Patent Application Publication No. 1996-191638

Non-patent Document 1: "Control Characteristics of Resonant Switched Capacitor Converter," Deriha, Fumitoshi, et al., Shingaku-Giho, IEICE Technical Report, EE2005-62, pp 7-12, 2006.

DISCLOSURE OF THE INVENTION

Problems to be Solved by the Invention

The aforementioned conventional DC/DC power converting apparatuses are provided with an inverter circuit and a rectifier circuit to perform DC/DC power conversion by using charging and discharging operation of capacitors. If inductors are series-connected to the capacitors and the LC resonance phenomenon is used, it is possible to transfer a large amount of electric power at high efficiency. If a voltage-multiplier rectifier circuit including a plurality of rectifier circuits connected together in this case, there arises a problem that it is necessary to increase permissible current values of capacitors and inductors, resulting in an increase in size of the apparatus structure.

The present invention has been made to overcome the aforementioned problem. Accordingly, it is an object of the invention to provide a DC/DC power converting apparatus provided with three or more circuits including an inverter circuit and a rectifier circuit, the apparatus being configured to utilize charging and discharging operation of a capacitor, wherein conversion efficiency is improved by use of a resonance phenomenon of the capacitor and an inductor and a reduction in size of the apparatus structure is achieved.

Means for Solving the Problems

A DC/DC power converting apparatus according to a first invention is such that a plurality of circuits are connected in series, each of the circuits including a high-voltage side device and a low-voltage side device made of semiconductor switching devices connected in series as well as a smoothing capacitor having positive and negative terminals between which the semiconductor switching devices are connected. Capacitors for energy transfer are connected individually between one specific circuit and the others of the plurality of circuits, and inductors are disposed in charging and discharging paths of the capacitors. Among the plurality of circuits, at least a specific circuit is used as a driving inverter circuit and any other circuit is used as a rectifier circuit to perform DC/DC conversion through charging and discharging operation of the capacitors.

A DC/DC power converting apparatus according to a second invention is such that a plurality of circuits are connected in series, the circuits including a driving inverter circuit configured with a high-voltage side device and a low-voltage side device made of semiconductor switching devices connected in series as well as a smoothing capacitor having positive and negative terminals between which the semiconductor switching devices are connected and a rectifier circuit configured with a high-voltage side device and a low-voltage side device made of diode devices connected in series as well as a smoothing capacitor having positive and negative terminals between which the diode devices are connected. Capacitors for energy transfer are connected individually between one specific circuit and the others of the plurality of circuits, and inductors are disposed in charging and discharging paths of the capacitors. The DC/DC power converting apparatus performs DC/DC conversion through charging and discharging operation of the capacitors.

Advantageous Effects of the Invention

In the first and second DC/DC power converting apparatuses according to the present invention, a plurality of circuits including a driving inverter circuit and a rectifier circuit are connected in series, wherein capacitors are connected individually between one specific circuit and the others of the circuits, and inductors are disposed in charging and discharging paths of the capacitors. Thus, it is possible to improve conversion efficiency by use of a resonance phenomenon of the capacitor and the inductor, reduce the values of currents flowing through the capacitor and the inductor, lower current ratings of the individual capacitors and the individual inductors and reduce the size of the apparatus structure.

BEST MODES FOR CARRYING OUT THE INVENTION

First Embodiment

Figure 1:
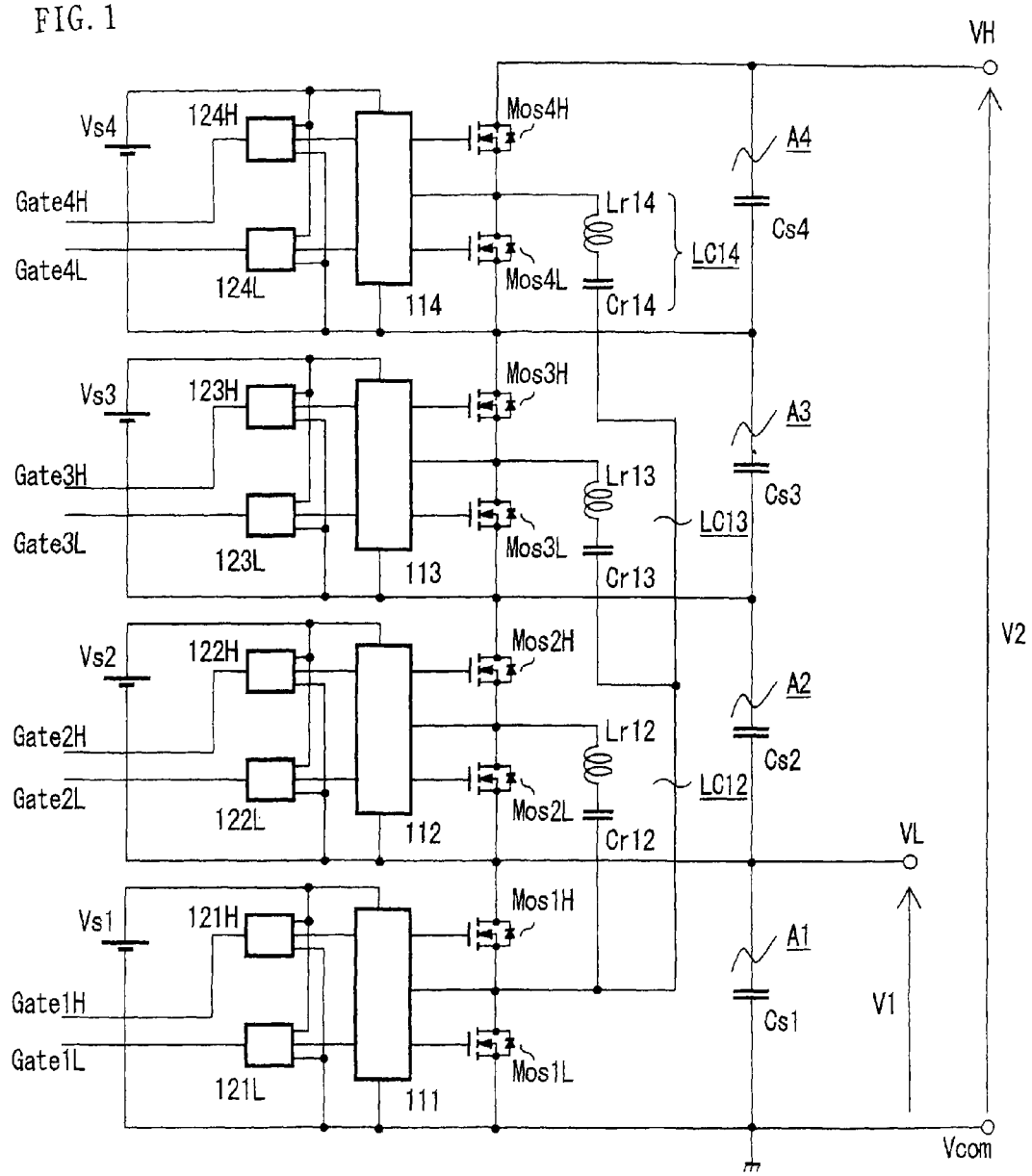
FIG. 1 is a diagram showing the circuit configuration of a principal portion of a DC/DC power converting apparatus according to a first embodiment of the present invention.
Figure 2:
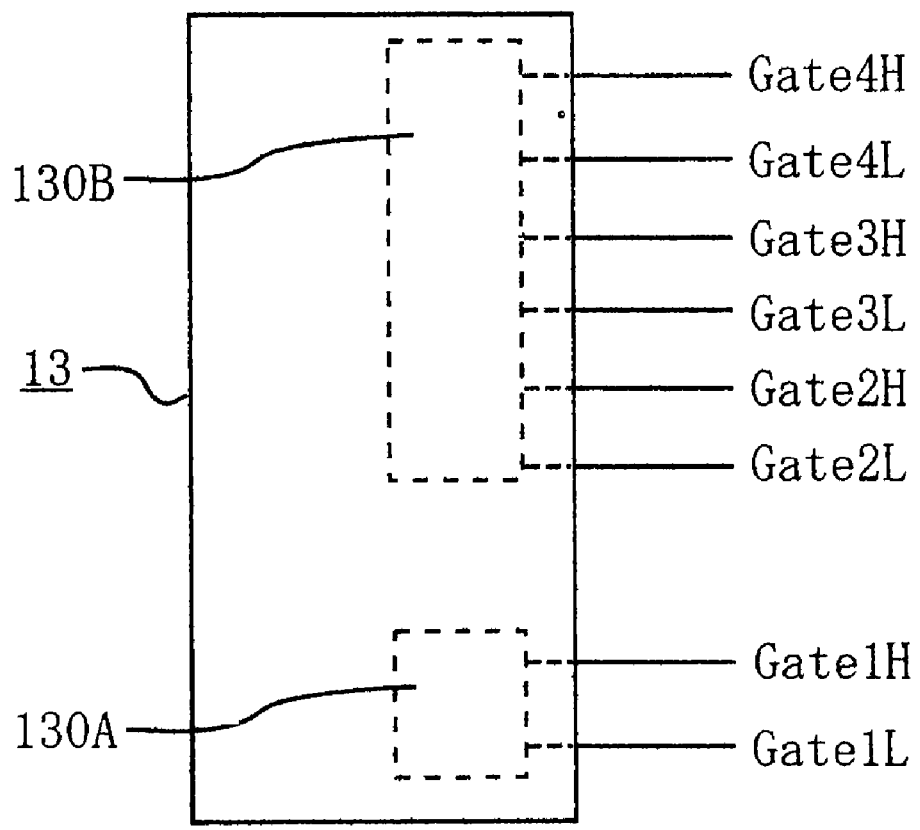
FIG. 2 is a diagram showing the circuit configuration of a gate signal generator of the DC/DC power converting apparatus according to the first embodiment of the present invention.

A DC/DC power converting apparatus according to a first embodiment of the present invention is described hereinbelow with reference to the drawings. FIGS. 1 and 2 show the circuit configuration of the DC/DC power converting apparatus according to the first embodiment of the present invention. Particularly, FIG. 1 shows a principal portion of the apparatus and FIG. 2 shows a gate signal generator.

As shown in FIG. 1, the DC/DC power converting apparatus has a function to convert a voltage V1 input from across voltage terminals VL and Vcom to a voltage V2, which is approximately four times as high as the voltage V1, and output the voltage V2 thus raised from across voltage terminals VH and Vcom.

Main circuitry of the DC/DC power converting apparatus is configured with circuits A1, A2, A3, A4 which are connected in series, together including smoothing capacitors Cs1, Cs2, Cs3, Cs4 for smoothing the input/output voltages V1, V2, serving also as voltage sources for energy transfer, and a plurality of MOSFETs. The MOSFETs are configured to form pairs of MOSFETs (Mos1L, Mos1H), (Mos2L, Mos2H), (Mos3L, Mos3H), (Mos4L, Mos4H), wherein one of each pair of MOSFETs serving as a low-voltage side device and the other as a high-voltage side device are connected in series, and each pair of MOSFETs is connected across opposite terminals of one of the smoothing capacitors Cs1, Cs2, Cs3, Cs4. A connecting point of the two MOSFETs of each of the circuits A1, A2, A3, A4 is used as an intermediate terminal. LC series circuits LC12, LC13, LC14 which function as energy transfer devices configured with series-connected units, each including one of capacitors Cr12, Cr13, Cr14 and one of inductors Lr12, Lr13, Lr14, are connected between the intermediate terminals of the circuit A1 which constitutes one specific circuit and the circuits A2, A3, A4, respectively.

Each of the MOSFETs is a power MOSFET in which a parasitic diode is formed between a source and a drain.

Electrical connections in the main circuitry are now described in detail. The two terminals of the smoothing capacitor Cs1 are connected to the voltage terminals VL and Vcom with the latter voltage terminal Vcom being grounded. The VL-side voltage terminal of the smoothing capacitor Cs1 is connected to one terminal of the smoothing capacitor Cs2, the other terminal of the smoothing capacitor Cs2 is connected to one terminal of the smoothing capacitor Cs3, the other terminal of the smoothing capacitor Cs3 is connected to one terminal of the smoothing capacitor Cs4, and the other terminal of the smoothing capacitor Cs4 is connected to the voltage terminal VH.

A source terminal of Mos1L is connected to the voltage terminal Vcom, a drain terminal of Mos1L is connected to a source terminal of Mos1H, and a drain terminal of Mos1H is connected to the voltage terminal VL. A source terminal of Mos2L is connected to the low-voltage side terminal of the smoothing capacitor Cs2, a drain terminal of Mos2L is connected to a source terminal of Mos2H, and a drain terminal of Mos2H is connected to the high-voltage side terminal of the smoothing capacitor Cs2. A source terminal of Mos3L is connected to the low-voltage side terminal of the smoothing capacitor Cs3, a drain terminal of Mos3L is connected to a source terminal of Mos3H, and a drain terminal of Mos3H is connected to the high-voltage side terminal of the smoothing capacitor Cs3. A source terminal of Mos4L is connected to the low-voltage side terminal of the smoothing capacitor Cs4, a drain terminal of Mos4L is connected to a source terminal of Mos4H, and a drain terminal of Mos4H is connected to the high-voltage side terminal of the smoothing capacitor Cs4.

One end of the LC series circuit LC12 is connected to the connecting point of Mos1L and Mos1H, and the other end of the LC series circuit LC12 is connected to the connecting point of Mos2L and Mos2H. One end of the LC series circuit LC13 is connected to the connecting point of Mos1L and Mos1H, and the other end of the LC series circuit LC13 is connected to the connecting point of Mos3L and Mos3H. One end of the LC series circuit LC14 is connected to the connecting point of Mos1L and Mos1H, and the other end of the LC series circuit LC14 is connected to the connecting point of Mos4L and Mos4H. Values of periods of resonance determined by inductance values and capacitance values of the inductors Lr and the capacitors Cr of the individual stages are made equal to one another.

Gate terminals of Mos1L and Mos1H are connected to output terminals of a gate driving circuit 111, and gate driving signals referenced to the voltage of the source terminal of Mos1L are input into input terminals of the gate driving circuit 111. The gate driving circuit is an ordinary bootstrap-type driving circuit configured with a driver IC for driving a half-bridge inverter circuit, a capacitor for driving the high-voltage side MOSFETs, and so on. Gate terminals of Mos2L and Mos2H are connected to output terminals of a gate driving circuit 112, and gate driving signals referenced to the voltage of the source terminal of Mos2L are input into input terminals of the gate driving circuit 112. Gate terminals of Mos3L and Mos3H are connected to output terminals of a gate driving circuit 113, and gate driving signals referenced to the voltage of the source terminal of Mos3L are input into input terminals of the gate driving circuit 113. Gate terminals of Mos4L and Mos4H are connected to output terminals of a gate driving circuit 114, and gate driving signals referenced to the voltage of the source terminal of Mos4L are input into input terminals of the gate driving circuit 114.

The gate driving signal for driving Mos1L is output from a photocoupler 121L and the gate driving signal for driving Mos1H is input from a photocoupler 121H. Gate signals Gate1L, Gate1H are input into the photocouplers 121L, 121H, respectively. The gate driving signal for driving Mos2L is output from a photocoupler 122L and the gate driving signal for driving Mos2H is output from a photocoupler 122H. Gate signals Gate2L, Gate2H are input into the photocouplers 122L, 122H, respectively. The gate driving signal for driving Mos3L is input from a photocoupler 123L and the gate driving signal for driving Mos3H is input from a photocoupler 123H. Gate signals Gate3L, Gate3H are input into the photocouplers 123L, 123H, respectively. The gate driving signal for driving Mos4L is output from a photocoupler 124L and the gate driving signal for driving Mos4H is output from a photocoupler 124H. Gate signals Gate4L, Gate4H are input into the photocouplers 124L, 124H, respectively.

Power supplies Vs1, Vs2, Vs3, Vs4 are power supplies referenced respectively to the source terminals of Mos1L, Mos2L, Mos3L, Mos4L for driving the MOSFETs, the gate driving circuits and the photocouplers.

The circuit A1 is used as a driving inverter circuit for transferring energy input from across the voltage terminals VL and Vcom to a high-voltage side through ON/OFF operation of the MOSFETs (Mos1L, Mos1H). Also, the circuits A2, A3, A4 are used as rectifier circuits for rectifying a current driven by the driving inverter circuit A1 and transferring the energy to the high-voltage side.

As shown in FIG. 2, the gate signals Gate1L, Gate1H, Gate2L, Gate2H, Gate3L, Gate3H, Gate4L, Gate4H are generated by a control circuit 13 which constitutes the gate signal generator. The control circuit 13 has a driving gate signal generating portion 130A for generating the driving gate signals Gate1L, Gate1H for driving the driving inverter circuit A1 and a rectification gate signal generating portion 130B for generating the rectification gate signals Gate2L, Gate2H, Gate3L, Gate3H, Gate4L, Gate4H for driving the rectifier circuits A2, A3, A4. In this embodiment, a signal processing circuit like a microcomputer generates the driving gate signals and the rectification gate signals.

Next, the working is described.

The capacitance values of the smoothing capacitors Cs1, Cs2, Cs3, Cs4 are set at sufficiently large values as compared to the capacitance values of the capacitors Cr12, Cr13, Cr14 of the LC series circuits.

As the voltage V1 input from across the voltage terminals VL and Vcom is raised to the voltage V2 which is approximately four times as high as the voltage V1 and the voltage V2 thus raised is output from across the voltage terminals VH and Vcom as mentioned above, a load is connected between the voltage terminals VH and Vcom and, thus, the voltage V2 has a smaller value than $4 \times V1$. Under steady-state conditions, the smoothing capacitor Cs1 is charged to a voltage equal to the voltage V1 and each of the smoothing capacitors Cs2, Cs3, Cs4 is charged to a voltage equal to $(V2-V1)/3$ on average.

Figure 3:
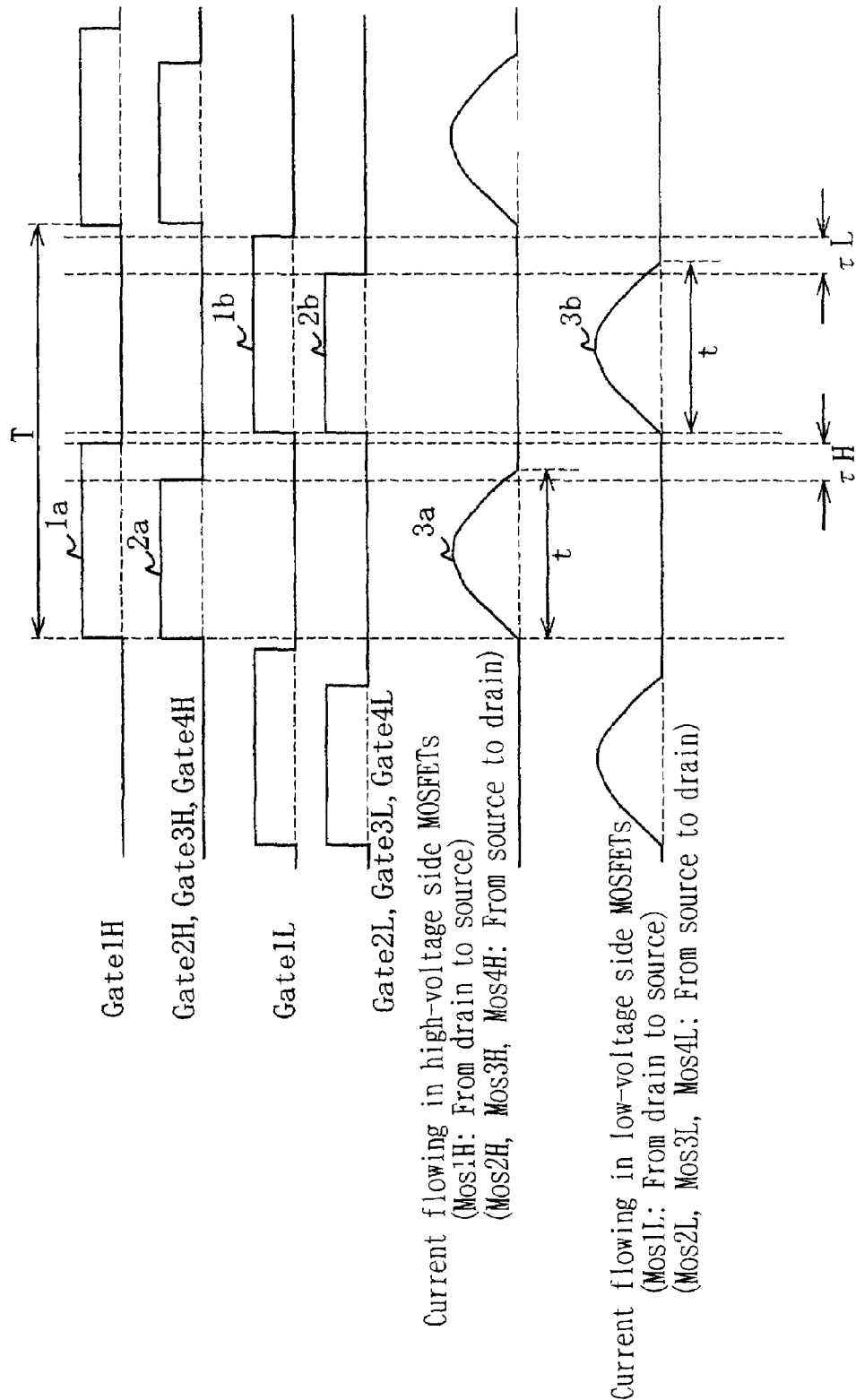
FIG. 3 is a diagram showing gate signals and current waveforms at individual points according to the first embodiment of the present invention.

FIG. 3 shows the driving gate signals Gate1L, Gate1H, the rectification gate signals Gate2L, Gate2H, Gate3L, Gate3H, Gate4L, Gate4H, currents flowing in the high-voltage side MOSFETs (Mos1H, Mos2H-Mos4H) of the driving inverter circuit A1 and the rectifier circuits A2-A4, and currents flowing in the low-voltage side MOSFETs (Mos1L, Mos2L-Mos4L). The currents flow from the drains to the sources in the MOSFETs of the driving inverter circuit A1 whereas the currents flow from the sources to the drains in the MOSFETs of the rectifier circuits A2-A4. Each of the MOSFETs turns on when the gate signal is at a high voltage.

As shown in FIG. 3, the driving gate signals Gate1H, Gate1L are ON/OFF signals having a period T which is slightly longer than the period of resonance determined by each of the LC series circuits LC12, LC13, LC14 having Lr and Cr and a duty cycle of about 50%. In the Figure, t indicates a period of time equal to one-half the period of resonance, and 1a and 1b indicate pulses (hereinafter referred to as driving pulses) of the respective driving gate signals Gate1H, Gate1L.

The rectification gate signals Gate2H, Gate3H, Gate4H fed into the high-voltage side MOSFETs of the rectifier circuits A2, A3, A4 and the rectification gate signals Gate2L, Gate3L, Gate4L fed into the low-voltage side MOSFETs are ON/OFF signals containing pulses (hereinafter referred to as rectification pulses 2a, 2b) which are generated within the time period t from rise timings of the driving pulses 1a, 1b of the driving gate signals Gate1H, Gate1L, respectively. Here, rise timings of the rectification pulses 2a, 2b are set to coincide with the rise timings of the driving pulses 1a, 1b and fall timings of the rectification pulses 2a, 2b are set to precede fall timings of the driving pulses 1a, 1b by specific time periods τH, τL, respectively.

When Mos1L, Mos2L, Mos3L, Mos4L which are the low-voltage side MOSFETs of the individual circuits A1-A4 are brought into an ON state by the driving pulse 1b and the rectification pulse 2b of the gate signals fed into the low-voltage side MOSFETs, part of energy stored in the smoothing capacitors Cs1, Cs2, Cs3 is transferred to the capacitors Cr12, Cr13, Cr14 through paths shown below, respectively, due to the presence of voltage differences. In Mos2L, Mos3L, Mos4L, currents flow from the sources to the drains through the parasitic diodes of the respective MOSFETs even when the rectification pulse 2b is in an OFF state. Specifically, in each of the MOSFETs Mos2L, Mos3L, Mos4L, a current 3b flows during the time period t which is equal to one-half the period of resonance of the LC series circuits LC12, LC13, LC14 and, then, the current is interrupted by a reverse current preventing function of the parasitic diode.

$Cs1 \Rightarrow Mos2L \Rightarrow Lr12 \Rightarrow Cr12 \Rightarrow Mos1L$
$Cs1 \Rightarrow Cs2 \Rightarrow Mos3L \Rightarrow Lr13 \Rightarrow Cr13 \Rightarrow Mos1L$
$Cs1 \Rightarrow Cs2 \Rightarrow Cs3 \Rightarrow Mos4L \Rightarrow Lr14 \Rightarrow Cr14 \Rightarrow Mos1L$ Subsequently, when Mos1H, Mos2H, Mos3H, Mos4H which are the high-voltage side MOSFETs of the individual circuits A1-A4 are brought into an ON state by the driving pulse 1a and the rectification pulse 2a of the gate signals fed into the high-voltage side MOSFETs, the energy charged into the capacitors Cr12, Cr13, Cr14 is transferred to the smoothing capacitors Cs2, Cs3, Cs4 through paths shown below, respectively, due to the presence of voltage differences. In Mos2H, Mos3H, Mos4H, currents flow from the sources to the drains through the parasitic diodes of the respective MOSFETs even when the rectification pulse 2a is in an OFF state. Specifically, in each of the MOSFETs Mos2H, Mos3H, Mos4H, a current 3a flows during the time period t which is equal to one-half the period of resonance of the LC series circuits LC12, LC13, LC14 and, then, the current is interrupted by the reverse current preventing function of the parasitic diode.

$Cr12 \Rightarrow Lr12 \Rightarrow Mos2H \Rightarrow Cs2 \Rightarrow Mos1H$
$Cr13 \Rightarrow Lr13 \Rightarrow Mos3H \Rightarrow Cs3 \Rightarrow Cs2 \Rightarrow Mos1H$
$Cr14 \Rightarrow Lr14 \Rightarrow Mos4H \Rightarrow Cs4 \Rightarrow Cs3 \Rightarrow Cs2 \Rightarrow Mos1H$ The energy is transferred from the smoothing capacitor Cs1 to the smoothing capacitors Cs2, Cs3, Cs4 as a result of charging and discharging operation of the capacitors Cr12, Cr13, Cr14 as discussed above. Then, the voltage V1 input from across the voltage terminals VL and Vcom is raised to the voltage V2 which is approximately four times as high as the voltage V1 and the voltage V2 thus raised is output from across the voltage terminals VH and Vcom. Also, the inductors Lr12, Lr13, Lr14 are series-connected to the capacitors Cr12, Cr13, Cr14 to configure the LC series circuits LC12, LC13, LC14, respectively. This configuration utilizes a resonance phenomenon for transferring the energy, making it possible to efficiently transfer a large amount of energy.

In this embodiment, the LC series circuits LC12, LC13, LC14 are connected between the driving inverter circuit A1, which includes the smoothing capacitor Cs1 having the two terminals to which the low-voltage side voltage terminals VL and Vcom serving as input terminals are connected, and the other circuits A2, A3, A4 serving as the rectifier circuits, respectively.

The values of currents flowing through the LC series circuits LC12, LC13, LC14 of the present embodiment are expressed as I12, I13, I14 and voltages across the capacitors Cr12, Cr13, Cr14 are expressed as V12, V13, V14, respectively. Considered now as a comparative example is a case in which LC series circuits LC12, LC23, LC34 are connected between the intermediate terminals (i.e., the connecting points of the pairs of low-voltage side MOSFET and high-voltage side MOSFET) of the adjacent circuits, that is, between A1 and A2, between A2 and A3, and between A3 and A4, respectively, and this configuration is operated in the same fashion as in the present embodiment. Expressing the values of the currents flowing through the LC series circuits LC12, LC23, LC34 as I12r, I23r, I34r and voltages across capacitors Cr12, Cr23, Cr34 in the LC series circuits LC12, LC23, LC34 as V12r, V23r, V34r, respectively, there exist the following relationships in this comparative example:

$I12r:I23r:I34r=3:2:1$ $V12r=V23r=V34r$

On the other hand, there exist the following relationships in this embodiment:

$I12=I13=I14(=I34r)$ $V12:V13:V14=1:2:3(V12=V12r=V23r=V34r)$

As the LC series circuits LC12, LC13, LC14 are connected between the intermediate terminal of the driving inverter circuit A1 and the intermediate terminals of the other circuits A2, A3, A4, respectively, as discussed above in the present embodiment, the voltages across the capacitors Cr12, Cr13, Cr14 increase compared to the aforementioned comparative example. Nevertheless, it is possible to reduce the value of the current flowing through the LC series circuit LC12 to one-third and the value of the current flowing through the LC series circuit LC13 whose high-voltage side is connected to the circuit A3 to one-half the value of the current flowing through the LC series circuit LC23 of the comparative example. In other words, it is possible to make the values of the currents flowing through the individual LC series circuits LC12, LC13, LC14 equal to minimum values. This makes it possible to lower current ratings of the inductors Lr and the capacitors Cr of the LC series circuits LC12, LC13, LC14 used for energy transfer and reduce the inductors Lr and the capacitors Cr in size.

The present embodiment employs the MOSFETs in the rectifier circuits A2-A4 so that it is possible to reduce conduction loss and improve power conversion efficiency as compared to levels achieved with an arrangement using diodes.

Also, the MOSFETs of the rectifier circuits A2-A4 are brought into the ON state simultaneously with the MOSFETs of the driving inverter circuit A1 and brought into an OFF state earlier than the MOSFETs of the driving inverter circuit A1 by a period of time not exceeding the time period t. It would be possible to minimize the conduction loss if the ON period of the MOSFETs of the rectifier circuits A2-A4 is matched to the conduction period t of the MOSFETs. However, the MOSFETs of the rectifier circuits A2-A4 conduct through the parasitic diodes if the ON state of the MOSFETs is terminated earlier as discussed above, so that the energy can be transferred during this conduction period as well. It is therefore possible to avoid problems caused by a delay in control, for instance, and improve reliability.

Additionally, since the rectification pulses 2a, 2b are generated within the time period t from the rise timings of the driving pulses 1a, 1b, respectively, currents are interrupted after flowing during the time period t which is equal to one-half the period of resonance of the LC series circuits LC12, LC13, LC14 and, thus, the currents do not flow in a reverse direction. The occurrence of the reverse currents could result in not only a reduction in the amount of transferred energy but also an increase in loss and deterioration of power conversion efficiency as it becomes necessary to flow large amounts of currents to obtain a desired level of electric power. As such reversing of the currents is prevented in this embodiment, it is possible to effectively use the resonance phenomenon of the LC series circuits LC12, LC13, LC14. Moreover, as the conduction loss can be reduced by use of the MOSFETs, it is possible to realize a DC/DC power converting apparatus having a high conversion efficiency.

Furthermore, since the control circuit 13 has the driving gate signal generating portion 130A and the rectification gate signal generating portion 130B to separately generate the driving gate signals Gate1L, Gate1H and the rectification gate signals Gate2L, Gate2H, Gate3L, Gate3H, Gate4L, Gate4H, it is possible to easily control the MOSFETs of the rectifier circuits A2-A4 separately from the MOSFETs of the driving inverter circuit A1 and realize the above-described desirable operation as well as a DC/DC power converting apparatus having a high conversion efficiency in a reliable fashion.

Second Embodiment

While the boost-type DC/DC power converting apparatus for raising the voltage V1 to the voltage V2 which is approximately four times as high as the voltage V1 has been described in the foregoing first embodiment, the following discussion of the present embodiment illustrates a buck-type DC/DC power converting apparatus which lowers the voltage V2 down to the voltage V1.

While a principal portion of the circuit configuration of the DC/DC power converting apparatus according to the present embodiment is the same as the circuit configuration shown in FIG. 1, the circuits A2, A3, A4 are used as driving inverter circuits and the circuit A1 is used as a rectifier circuit in this embodiment. A control circuit 13a which is a gate signal generator differing from that of the foregoing first embodiment is shown in FIG. 4.

Figure 4:
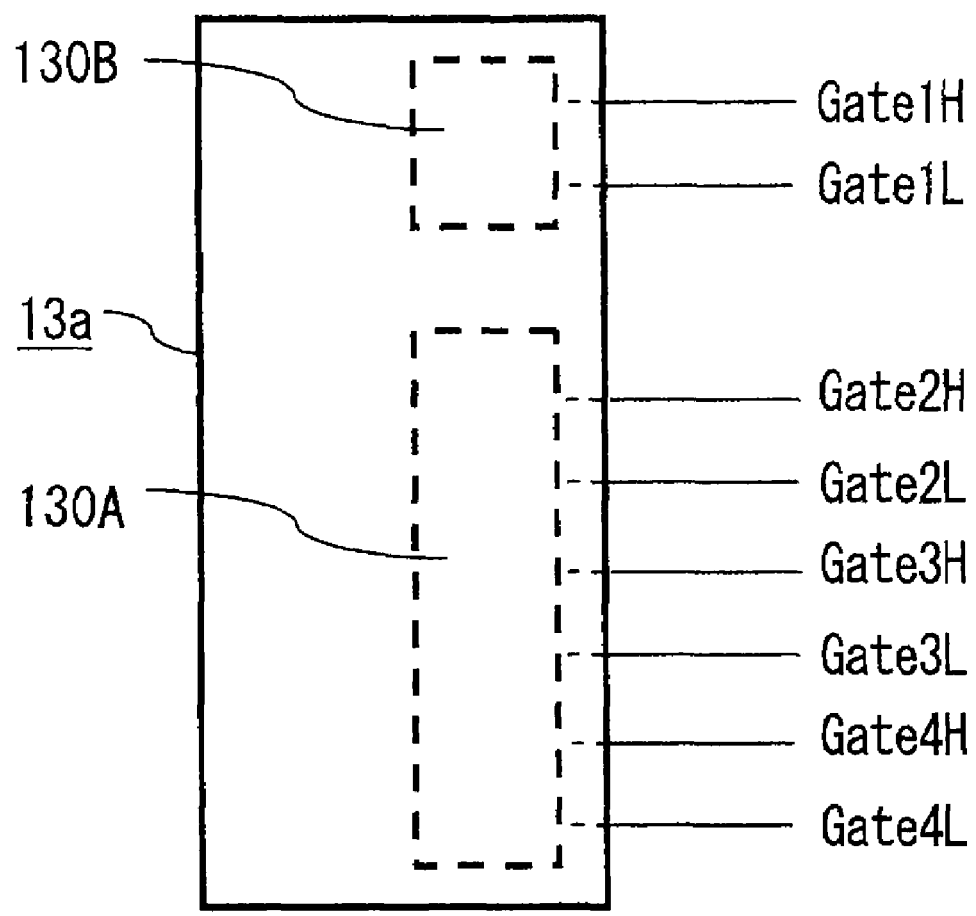
FIG. 4 is a diagram showing the circuit configuration of a gate signal generator of a DC/DC power converting apparatus according to a second embodiment of the present invention.

As shown in FIG. 4, the gate signals Gate1L, Gate1H, Gate2L, Gate2H, Gate3L, Gate3H, Gate4L, Gate4H are generated by the control circuit 13a. The control circuit 13a has a driving gate signal generating portion 130A for generating the driving gate signals Gate2L, Gate2H, Gate3L, Gate3H, Gate4L, Gate4H for driving the driving inverter circuits A2, A3, A4 and a rectification gate signal generating portion 130B for generating the rectification gate signals Gate1L, Gate1H for driving the rectifier circuit A1. A signal processing circuit like a microcomputer is used to generate the driving gate signals and the rectification gate signals in this embodiment as well.

Next, the working is described.

The capacitance values of the smoothing capacitors Cs1, Cs2, Cs3, Cs4 are set at sufficiently large values as compared to the capacitance values of the capacitors Cr12, Cr13, Cr14 of the LC series circuits.

As the voltage V2 input from across the voltage terminals VH and Vcom is lowered to the voltage V1 which is approximately ¼ times the voltage V2 and the voltage V1 thus lowered is output from across the voltage terminals VL and Vcom, a load is connected between the voltage terminals VL and Vcom and, thus, the voltage V2 has a larger value than 4×V1.

Figure 5:
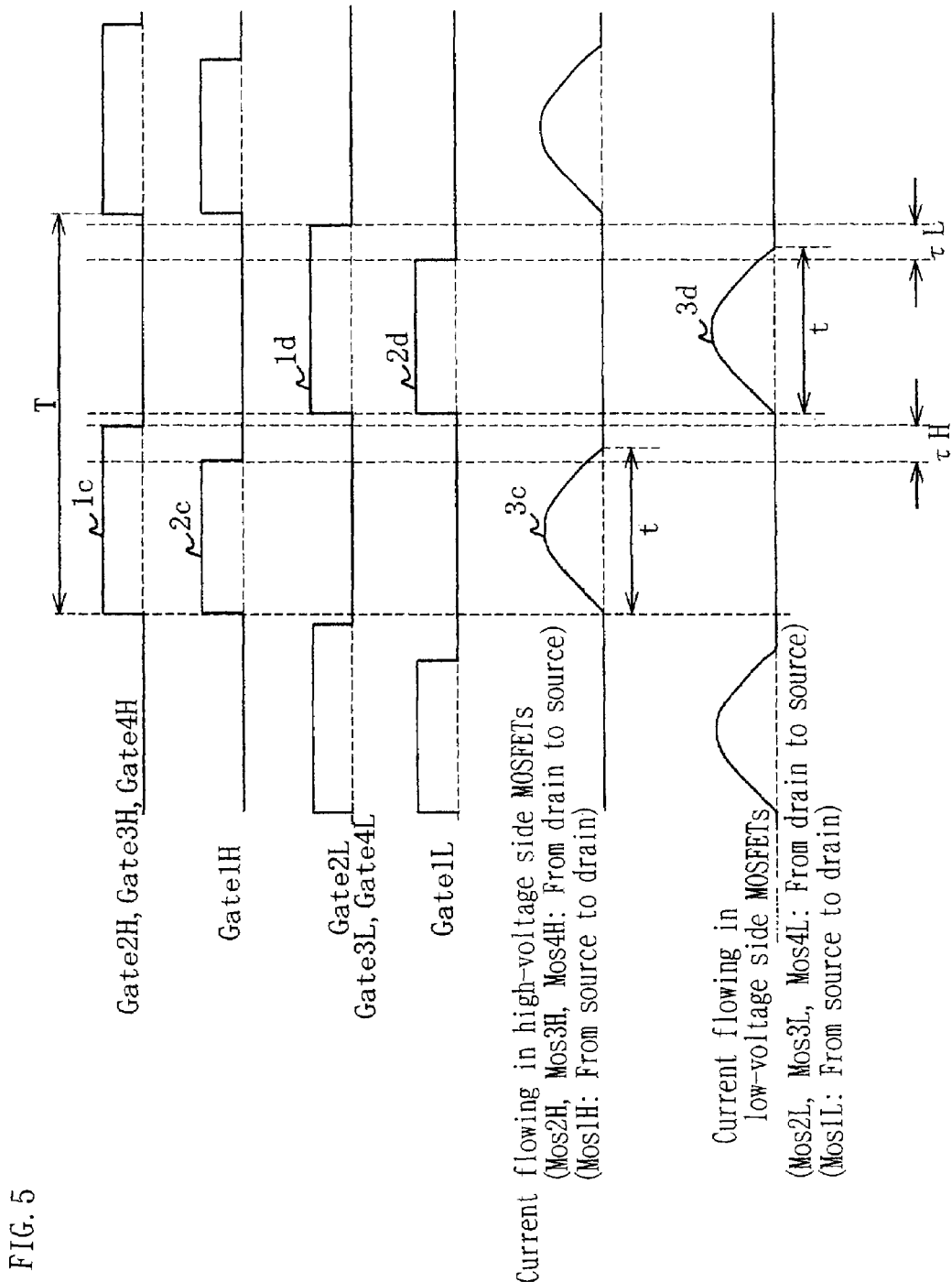
FIG. 5 is a diagram showing gate signals and current waveforms at individual points according to the second embodiment of the present invention.

FIG. 5 shows the driving gate signals Gate2L, Gate2H, Gate3L, Gate3H, Gate4L, Gate4H, the rectification gate signals Gate1L, Gate1H, currents flowing in the high-voltage side MOSFETs (Mos2H-Mos4H, Mos1H) of the driving inverter circuits A2-A4 and the rectifier circuit A1, and currents flowing in the low-voltage side MOSFETs (Mos2L-Mos4L, Mos1L). In the MOSFETs of the driving inverter circuits A2-A4, the currents flow from the drains to the sources, and in the MOSFETs of the rectifier circuit A1, the currents flow from the sources to the drains. Each of the MOSFETs turns on when the gate signal is at the high voltage.

As shown in FIG. 5, the driving gate signals Gate2L, Gate2H, Gate3L, Gate3H, Gate4L, Gate4H are ON/OFF signals having a period T which is slightly longer than the period of resonance 2t determined by the LC series circuits LC12, LC13, LC14 of Lr and Cr and a duty cycle of about 50%. In the Figure, 1c and 1d indicate pulses (hereinafter referred to as driving pulses) of the respective driving gate signals Gate2L, Gate2H, Gate3L, Gate3H, Gate4L, Gate4H.

The rectification gate signal Gate1H fed into the high-voltage side MOSFETs of the rectifier circuit A1 and the rectification gate signal Gate1L fed into the low-voltage side MOSFETs are ON/OFF signals containing pulses (hereinafter referred to as rectification pulses $2c$, $2d$) which are generated within the time period t from rise timings of the driving pulses $1c$, $1d$, respectively. Here, rise timings of the rectification pulses $2c$, $2d$ are set to coincide with the rise timings of the driving pulses $1c$, $1d$ and fall timings of the rectification pulses $2c$, $2d$ are set to precede fall timings of the driving pulses $1c$, $1d$ by the specific time periods τH, τL, respectively.

When Mos2H, Mos3H, Mos4H, Mos1H which are the high-voltage side MOSFETs of the individual circuits A2-A4, A1 are brought into the ON state by the driving pulse $1c$ and the rectification pulse $2c$ of the gate signals fed into the high-voltage side MOSFETs, part of energy stored in the smoothing capacitors Cs2, Cs3, Cs4 is transferred to the capacitors Cr12, Cr13, Cr14 through paths shown below, respectively, due to the presence of voltage differences. In Mos1H, a current flows from the source to the drain through the parasitic diode of the MOSFET even when the rectification pulse $2c$ is in the OFF state. Specifically, in Mos1H, the current $3c$ flows during the time period t which is equal to one-half the period of resonance of the LC series circuits LC12, LC13, LC14 and, then, the current is interrupted by the reverse current preventing function of the parasitic diode.

Cs2⇒Cs3⇒Cs4⇒Mos4H⇒Lr14⇒Cr14⇒Mos1H
Cs2⇒Cs3⇒Mos3H⇒Lr13⇒Cr13⇒Mos1H
Cs2⇒Mos2H⇒Lr12⇒Cr12⇒Mos1H

Subsequently, when Mos2L, Mos3L, Mos4L, Mos1L which are the low-voltage side MOSFETs of the individual circuits A2-A4, A1 are brought into the ON state by the driving pulse $1d$ and the rectification pulse $2d$ of the gate signals fed into the low-voltage side MOSFETs, the energy charged into the capacitors Cr12, Cr13, Cr14 is transferred to the smoothing capacitors Cs1, Cs2, Cs3 through paths shown below, respectively, due to the presence of voltage differences. In Mos1L, currents flow from the sources to the drains through the parasitic diodes of the respective MOSFETs even when the rectification pulse $2d$ is in the OFF state. Specifically, in Mos1L, a current $3d$ flows during the time period t which is equal to one-half the period of resonance of the LC series circuits LC12, LC13, LC14 and, then, the current is interrupted by the reverse current preventing function of the parasitic diode.

Cr14⇒Lr14⇒Mos4L⇒Cs3⇒Cs2⇒Cs1⇒Mos1L
Cr13⇒Lr13⇒Mos3L⇒Cs2⇒Cs1⇒Mos1L
Cr12⇒Lr12⇒Mos2L⇒Cs1⇒Mos1L

The energy is transferred from the smoothing capacitors Cs2, Cs3, Cs4 to the smoothing capacitor Cs1 as a result of charging and discharging operation of the capacitors Cr12, Cr13, Cr14 as discussed above. Then, the voltage V2 input from across the voltage terminals VH and Vcom is lowered to the voltage V1 which is approximately ¼ times the voltage V2 and the voltage V1 thus lowered is output from across the voltage terminals VL and Vcom. Also, the inductors Lr12, Lr13, Lr14 are series-connected to the capacitors Cr12, Cr13, Cr14 to configure the LC series circuits LC12, LC13, LC14, respectively. This configuration utilizes the resonance phenomenon for transferring the energy, making it possible to efficiently transfer a large amount of energy.

Also, in this embodiment, the LC series circuits LC12, LC13, LC14 are connected between the rectifier circuit A1, which includes the smoothing capacitor Cs1 having the two terminals to which the low-voltage side voltage terminals VL and Vcom serving as input terminals are connected, and the other circuits A2, A3, A4 serving as the driving inverter circuits, respectively. In comparison with the comparative example shown in the foregoing first embodiment, that is, the case in which the LC series circuits LC12, LC23, LC34 are connected between the adjacent circuits and this configuration is operated in the same fashion as in the present embodiment, it is possible to reduce the value of the current flowing through the LC series circuit LC12 to one-third and the value of the current flowing through the LC series circuit LC13 whose high-voltage side is connected to the circuit A3 to one-half the value of the current flowing through the LC series circuit LC23 of the comparative example in this embodiment as well. In other words, it is possible to make the values of the currents flowing through the individual LC series circuits LC12, LC13, LC14 equal to minimum values. This makes it possible to lower current ratings of the inductors Lr and the capacitors Cr of the LC series circuits LC12, LC13, LC14 used for energy transfer and reduce the inductors Lr and the capacitors Cr in size.

The present embodiment employs the MOSFETs in the rectifier circuit A1 so that it is possible to reduce conduction loss and improve power conversion efficiency as compared to levels achieved with an arrangement using diodes.

Also, the MOSFETs of the rectifier circuits A1 are brought into the ON state simultaneously with the MOSFETs of the driving inverter circuits A2-A4 and brought into the OFF state earlier than the MOSFETs of the driving inverter circuits A2-A4 by a period of time not exceeding the time period t. It would be possible to minimize the conduction loss if the ON period of the MOSFETs of the rectifier circuit A1 is matched to the conduction period t of the MOSFETs. However, the MOSFETs of the rectifier circuit A1 conduct through the parasitic diodes if the ON state of the MOSFETs is terminated earlier as discussed above, so that the energy can be transferred during this conduction period as well. It is therefore possible to avoid problems caused by a delay in control, for instance, and improve reliability.

Additionally, since the rectification pulses 2c, 2d are generated within the time period t from the rise timings of the driving pulses 1c, 1d, respectively, currents are interrupted after flowing during the time period t which is equal to one-half the period of resonance of the LC series circuits LC12, LC13, LC14 and, thus, the currents do not flow in the reverse direction. It is therefore possible to effectively use the resonance phenomenon of the LC series circuits LC12, LC13, LC14. Moreover, as the conduction loss can be reduced by use of the MOSFETs, it is possible to realize a DC/DC power converting apparatus having a high conversion efficiency.

Furthermore, since the control circuit 13a has the driving gate signal generating portion 130A and the rectification gate signal generating portion 130B to separately generate the driving gate signals Gate2L, Gate2H, Gate3L, Gate3H, Gate4L, Gate4H and the rectification gate signals Gate1L, Gate1H, it is possible to easily control the MOSFETs of the rectifier circuit A1 separately from the MOSFETs of the driving inverter circuits A2-A4 and realize the above-described desirable operation as well as a DC/DC power converting apparatus having a high conversion efficiency in a reliable fashion.

Third Embodiment

While the boost-type DC/DC power converting apparatus for raising V1 to V2 has been described in the foregoing first embodiment and the buck-type DC/DC power converting apparatus for lowering V2 to V1 has been described in the foregoing second embodiment, the following discussion of the present embodiment illustrates a buck-boost DC/DC power converting apparatus having the functions of both the aforementioned first and second embodiments to realize bi-directional energy transfer.

A principal portion of the circuit configuration of the DC/DC power converting apparatus according to the present embodiment is the same as that of the first and second embodiments shown in FIG. 1. In this embodiment, the circuit A1 is used as a driving inverter circuit and the circuits A2, A3, A4 are used as rectifier circuits in voltage-boosting mode, while the circuits A2, A3, A4 are used as driving inverter circuits and the circuit A1 is used as a rectifier circuit in voltage-lowering mode. A control circuit 13b which is a gate signal generator differing from those of the foregoing first and second embodiments is shown in FIG. 6.

Figure 6:
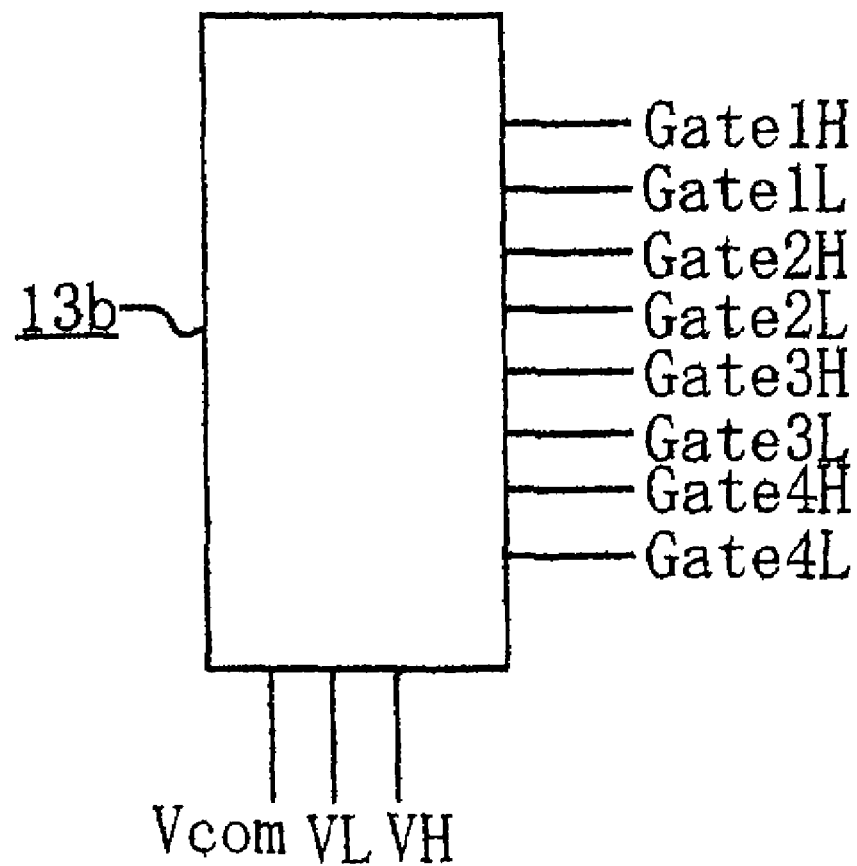
FIG. 6 is a diagram showing the circuit configuration of a gate signal generator of a DC/DC power converting apparatus according to a third embodiment of the present invention.

As shown in FIG. 6, voltages of the voltage terminals Vcom, VL, VH are input into the control circuit 13b, and the control circuit 13b generates and outputs the gate signals Gate1L, Gate1H, Gate2L, Gate2H, Gate3L, Gate3H, Gate4L, Gate4H. The control circuit 13b calculates V1 and V2 (V1: VL−Vcom, V2: VH−Vcom) from the individual terminal voltages that are input. Then, if V1×4>V2, the control circuit 13b recognizes that the voltage-boosting mode is currently selected and outputs gate signals in the same way as described in the foregoing first embodiment. If V1×4<V2, on the other hand, the control circuit 13b recognizes that the voltage-lowering mode is currently selected and outputs the gate signals in the same way as described in the foregoing second embodiment.

The buck-boost DC/DC power converting apparatus thus controlled makes it possible to obtain the same advantageous effects as discussed in the aforementioned first and second embodiments and realize bi-directional energy transfer with a single circuit, so that the apparatus is widely applicable.

Fourth Embodiment

Figure 7:
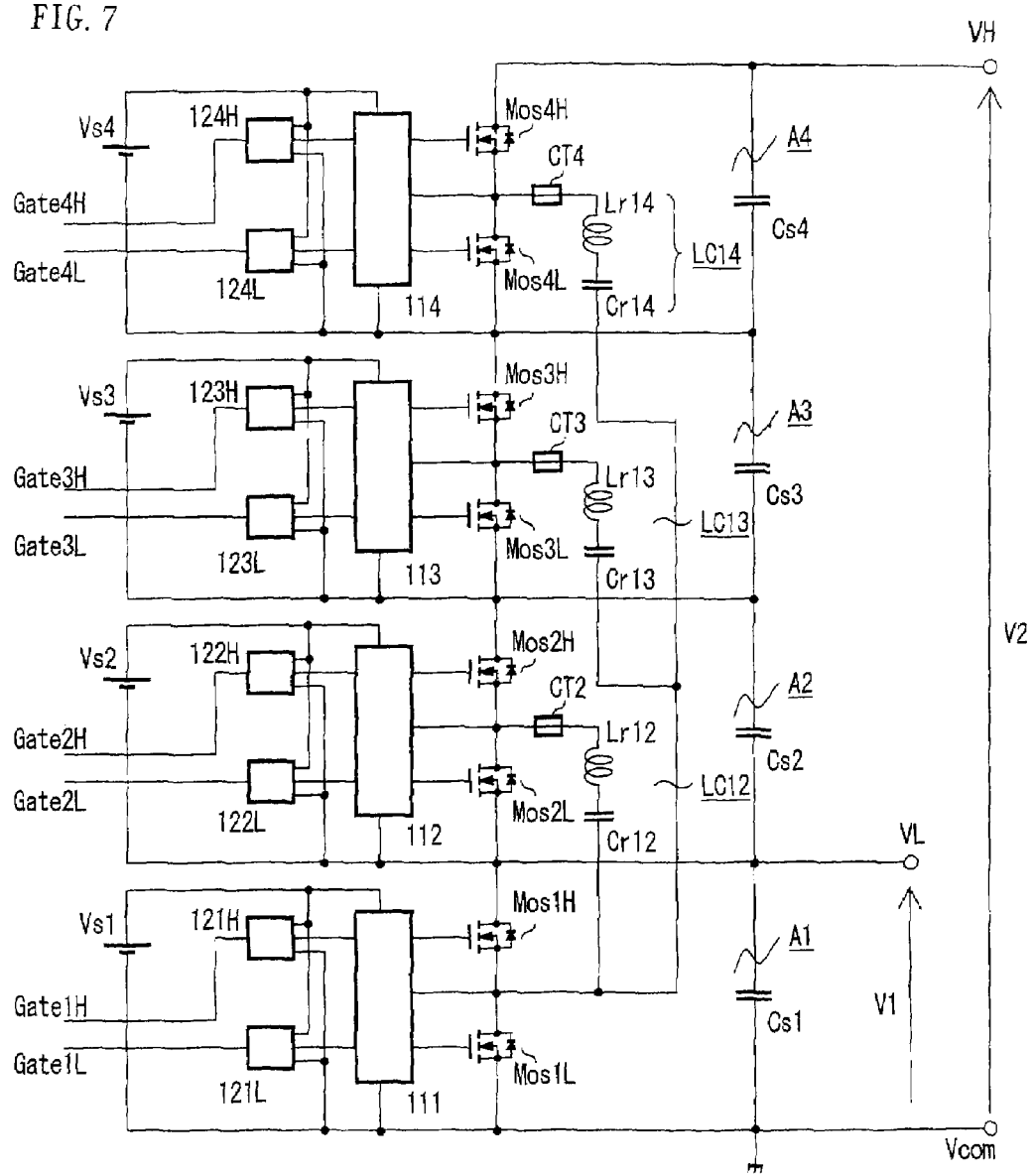
FIG. 7 is a diagram showing the circuit configuration of a principal portion of a DC/DC power converting apparatus according to a fourth embodiment of the present invention.

Next, a boost-type DC/DC power converting apparatus according to a fourth embodiment of the present invention is described with reference to the drawings. FIG. 7 is a diagram showing the circuit configuration of a principal portion of the DC/DC power converting apparatus according to the fourth embodiment of the present invention.

As shown in FIG. 7, the DC/DC power converting apparatus converts a voltage V1 input from across voltage terminals VL and Vcom to a voltage V2, which is approximately four times as high as the voltage V1, and outputs the voltage V2 thus raised from across voltage terminals VH and Vcom in the same way as in the aforementioned first embodiment. This DC/DC power converting apparatus is provided with current sensors CT2, CT3, CT4 serving as current sensing means in addition to the circuit configuration shown in FIG. 1.

The current sensor CT2 is disposed on a line between the connecting point of Mos2L and Mos2H and the LC series circuit LC12 to detect a current flowing from the connecting point of Mos2L and Mos2H. The current sensor CT3 is disposed on a line between the connecting point of Mos3L and Mos3H and the LC series circuit LC13 to detect a current flowing from the connecting point of Mos3L and Mos3H. The current sensor CT4 is disposed on a line between the connecting point of Mos4L and Mos4H and the LC series circuit LC14 to detect a current flowing from the connecting point of Mos4L and Mos4H.

In this embodiment, the circuit A1 is also used as a driving inverter circuit for transferring energy input from across the voltage terminals VL and Vcom to the high-voltage side through ON/OFF operation of the MOSFETs (Mos1L, Mos1H) as in the aforementioned first embodiment. Also, the circuits A2, A3, A4 are used as rectifier circuits for rectifying a current driven by the driving inverter circuit A1 and transferring the energy to the high-voltage side.

Although a gate signal generator is not illustrated here, the apparatus of this embodiment is provided with a control circuit for generating the driving gate signals Gate1L, Gate1H and a circuit having comparators for generating the rectification gate signals Gate2L, Gate2H, Gate3L, Gate3H, Gate4L, Gate4H.

As in the aforementioned first embodiment, the driving gate signals Gate1L, Gate1H are ON/OFF signals having a period T which is slightly longer than the period of resonance $2t$ determined by the LC series circuits LC12, LC13, LC14 and a duty cycle of about 50%. The rectification gate signals Gate2L, Gate2H are generated by comparing an output signal of the current sensor CT2 with threshold voltages VtL, VtH. Specifically, when a current from the connecting point of Mos2L and Mos2H flows in a positive direction, the control circuit generates a rectification pulse to turn on Mos2L, and when the current flows in a negative direction, the control circuit generates a rectification pulse to turn on Mos2H. As a result, Mos2L, Mos2H turn on during periods when the parasitic diodes of the respective MOSFETs conduct. In the case of the rectifier circuits A3, A4, the rectification gate signals are generated by comparing output signals of the current sensors CT3, CT4 with the threshold voltages VtL, VtH as in the case of the rectifier circuit A2. It is to be noted that the threshold voltages VtL, VtH are set at such voltage levels which permit the current sensors CT2-CT4 to detect currents flowing in either the positive or negative direction.

Due to the aforementioned gate signals Gate1L, Gate1H, Gate2L, Gate2H, Gate3L, Gate3H, Gate4L, Gate4H, currents flow through the same current paths as shown in the aforementioned first embodiment and the energy is transferred from the smoothing capacitor Cs1 to the smoothing capacitors Cs2, Cs3, Cs4 as a result of charging and discharging operation of the capacitors Cr12, Cr13, Cr14. Then, the voltage V1 input from across the voltage terminals VL and Vcom is raised to the voltage V2 which is approximately four times as high as the voltage V1 and the voltage V2 thus raised is output from across the voltage terminals VH and Vcom.

In this embodiment, there are provided the current sensors CT2, CT3, CT4 for detecting output currents from the connecting points of the high-voltage side MOSFETs and the low-voltage side MOSFETs of the rectifier circuits A2-A4, and the rectification gate signals Gate2L, Gate2H, Gate3L, Gate3H, Gate4L, Gate4H are generated according to the detected currents, respectively. It is therefore possible to cause the MOSFETs of the rectifier circuits A2-A4 to turn on during the periods when the parasitic diodes of the respective MOSFETs conduct. For this reason, it is possible to generate the rectification pulses of the gate signals within the time period t which is equal to one-half the period of resonance of the LC series circuits LC12, LC13, LC14 from rise timings of the respective driving pulses in a reliable fashion. The currents are interrupted after flowing during the time period t so that the currents do not flow in the reverse direction. It is therefore possible to effectively use the resonance phenomenon of the LC series circuits LC12, LC13, LC14. Moreover, as the conduction loss can be reduced by use of the MOSFETs in the rectifier circuits A2-A4, it is possible to realize a DC/DC power converting apparatus having a high conversion efficiency.

It is possible to generally match the rectification pulses to the conduction period t of the MOSFETs and minimize the conduction loss by properly setting the threshold voltages VtL, VtH.

Since provision is made to separately generate the driving gate signals Gate1L, Gate1H and the rectification gate signals Gate2L, Gate2H, Gate3L, Gate3H, Gate4L, Gate4H in this embodiment as well, it is possible to easily control the MOSFETs of the rectifier circuits A2-A4 separately from the MOSFETs of the driving inverter circuit A1 and realize the above-described desirable operation as well as a DC/DC power converting apparatus having a high conversion efficiency in a reliable fashion.

While the output currents from the connecting points of the high-voltage side MOSFETs and the low-voltage side MOSFETs of the rectifier circuits A2-A4 are detected in the foregoing fourth embodiment, the currents detected by the current sensors CT2-CT4 generally coincide with currents flowing through the individual capacitors Cr12-Cr14 connected to the rectifier circuits A2-A4. For this reason, it may be well said that the currents flowing through the individual capacitors Cr12-Cr14 connected to the rectifier circuits A2-A4 are detected by use of the current sensors CT2-CT4 and the rectification gate signals for the rectifier circuits A2-A4 are generated according to these detected currents.

Fifth Embodiment

A fifth embodiment described below deals with a buck-type DC/DC power converting apparatus for lowering a voltage V2 down to a voltage V1 which is approximately ¼ times the voltage V2 as discussed in the aforementioned second embodiment. A principal portion of the circuit configuration of the DC/DC power converting apparatus according to the present embodiment is shown in FIG. 8.

Figure 8:
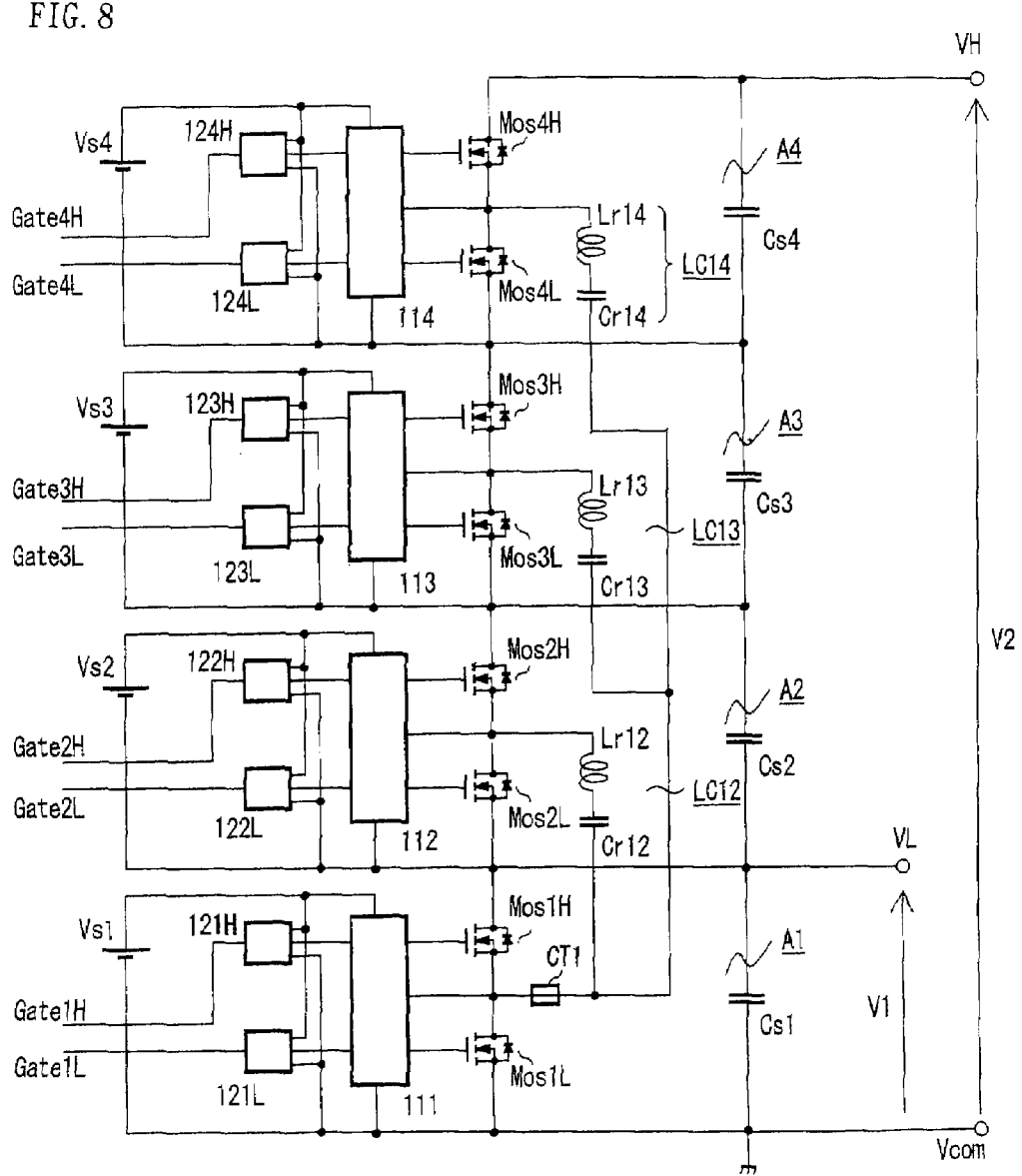
FIG. 8 is a diagram showing the circuit configuration of a principal portion of a DC/DC power converting apparatus according to a fifth embodiment of the present invention.

As shown in FIG. 8, the DC/DC power converting apparatus is provided with a current sensor CT1 serving as current sensing means in addition to the circuit configuration shown in FIG. 1. In this embodiment, the circuits A2-A4 are used as driving inverter circuits and the circuit A1 is used as a rectifier circuit. The current sensor CT1 detects an output current from the connecting point of the high-voltage side MOSFET and the low-voltage side MOSFET of the rectifier circuit A1.

Although a gate signal generator is not illustrated here, the apparatus of this embodiment is provided with a control circuit for generating the driving gate signals Gate2L, Gate2H, Gate3L, Gate3H, Gate4L, Gate4H and a circuit having comparators for generating the rectification gate signals Gate1L, Gate1H.

As in the aforementioned second embodiment, the driving gate signals Gate2L, Gate2H, Gate3L, Gate3H, Gate4L, Gate4H are ON/OFF signals having a period which is slightly longer than the period of resonance $2t$ determined by the LC series circuits LC12, LC13, LC14 and a duty cycle of about 50%. The rectification gate signals Gate1L, Gate1H are generated by comparing an output signal of the current sensor CT1 with the threshold voltages VtL, VtH. Specifically, when a current from the connecting point of Mos1L and Mos1H flows in the positive direction, the control circuit generates a rectification pulse to turn on Mos1L, and when the current flows in a negative direction, the control circuit generates a rectification pulse to turn on Mos1H. As a result, Mos1L, Mos1H turn on during periods when the parasitic diodes of the respective MOSFETs conduct. It is to be noted that the threshold voltages VtL, VtH are set at such voltage levels which permit the current sensor CT1 to detect a current flowing in either the positive or negative direction.

Due to the aforementioned gate signals Gate1L, Gate1H, Gate2L, Gate2H, Gate3L, Gate3H, Gate4L, Gate4H, currents flow through the same current paths as shown in the aforementioned second embodiment and the energy is transferred from the smoothing capacitors Cs2, Cs3, Cs4 to the smoothing capacitor Cs1 as a result of charging and discharging operation of the capacitors Cr12, Cr13, Cr14. Then, the voltage V2 input from across the voltage terminals VH and Vcom is lowered to the voltage V1 which is approximately ¼ times as high as the voltage V2 and the voltage V1 thus lowered is output from across the voltage terminals VL and Vcom.

In this embodiment, there is provided the current sensor CT1 for detecting the output current from the connecting point of the high-voltage side MOSFET and the low-voltage side MOSFET of the rectifier circuit A1, and the rectification gate signals Gate1L, Gate1H are generated according to the detected currents. It is therefore possible to cause the MOSFETs of the rectifier circuit A1 to turn on during the periods when the parasitic diodes of the respective MOSFETs conduct. For this reason, it is possible to generate the rectification pulses of the gate signals within the time period t which is equal to one-half the period of resonance of the LC series circuits LC12, LC13, LC14 from rise timings of the respective driving pulses in a reliable fashion. The currents are interrupted after flowing during the time period t so that the currents do not flow in the reverse direction. It is therefore possible to effectively use the resonance phenomenon of the LC series circuits LC12, LC13, LC14. Moreover, as the conduction loss can be reduced by use of the MOSFETs in the rectifier circuit A1, it is possible to realize a DC/DC power converting apparatus having a high conversion efficiency.

It is possible to generally match the rectification pulses to the conduction period t of the MOSFETs and minimize the conduction loss by properly setting the threshold voltages VtL, VtH.

Since provision is made to separately generate the driving gate signals Gate2L, Gate2H, Gate3L, Gate3H, Gate4L, Gate4H and the rectification gate signals Gate1L, Gate1H in this embodiment as well, it is possible to easily control the MOSFETs of the rectifier circuit A1 separately from the MOSFETs of the driving inverter circuits A2-A4 and realize the above-described desirable operation as well as a DC/DC power converting apparatus having a high conversion efficiency in a reliable fashion.

While the output current from the connecting point of the high-voltage side MOSFET and the low-voltage side MOSFET of the rectifier circuit A1 is detected in the foregoing fifth embodiment, the current detected by the current sensor CT1 generally coincides with currents flowing through the individual capacitors Cr12-Cr14 in phase although the former differs from the latter in amplitude value. It is therefore possible to detect the currents flowing through the individual capacitors Cr12-Cr14 connected to the rectifier circuit A1 using the output of the current sensor CT1, so that the same advantageous effects as discussed in the foregoing fifth embodiment can be obtained by generating the rectification gate signals for the rectifier circuit A1.

While the boost-type DC/DC power converting apparatus for raising V1 to V2 has been described in the foregoing fourth embodiment and the buck-type DC/DC power converting apparatus for lowering V2 to V1 has been described in the foregoing fifth embodiment, it is possible to realize bi-directional energy transfer with the apparatus having the functions of both the aforementioned fourth and fifth embodiments provided with current sensors CT1, CT2, CT3, CT4 serving as current sensing means in addition to the circuit configuration shown in FIG. 1. In this case, the apparatus should be provided with a circuit for generating rectification gate signals for voltage-boosting operation and a circuit for generating rectification gate signals for voltage-lowering operation and switch the gate signals between the voltage-boosting mode and the voltage-lowering mode by using the detected currents.

Also, while each of the current sensors is disposed on a line between the connecting point of the high-voltage and low-voltage side MOSFETs and the LC series circuit to detect a current in the foregoing fourth and fifth embodiments, currents flowing in the individual MOSFETs may be detected by the current sensors.

Sixth Embodiment

While the output currents from the intermediate terminals of the individual circuits A1-A4 (i.e., the connecting points of the high-voltage side MOSFETs and the low-voltage side MOSFETs) are detected by the current sensors CT1-CT4 and the rectification gate signals are generated according to the detected currents in the foregoing fourth and fifth embodiments, currents flowing through the capacitors Cr for energy transfer are directly detected in this embodiment.

Since each of the LC series circuits LC12, LC13, LC14 is connected between the intermediate terminals of the circuit A1 and one of the other circuits as discussed above, the currents flowing through the individual capacitors Cr generally coincide with the currents detected by the current sensors CT2-CT4 of the aforementioned fourth embodiment, and the currents flowing through the individual capacitors Cr generally coincide with the current detected by the current sensor CT1 of the aforementioned fifth embodiment in phase although the former differ from the latter in amplitude value. It is therefore possible to generate the rectification gate signals in the same way as in the foregoing fourth and fifth embodiments according to the detected currents which flow through the individual capacitors Cr.

Figure 9:
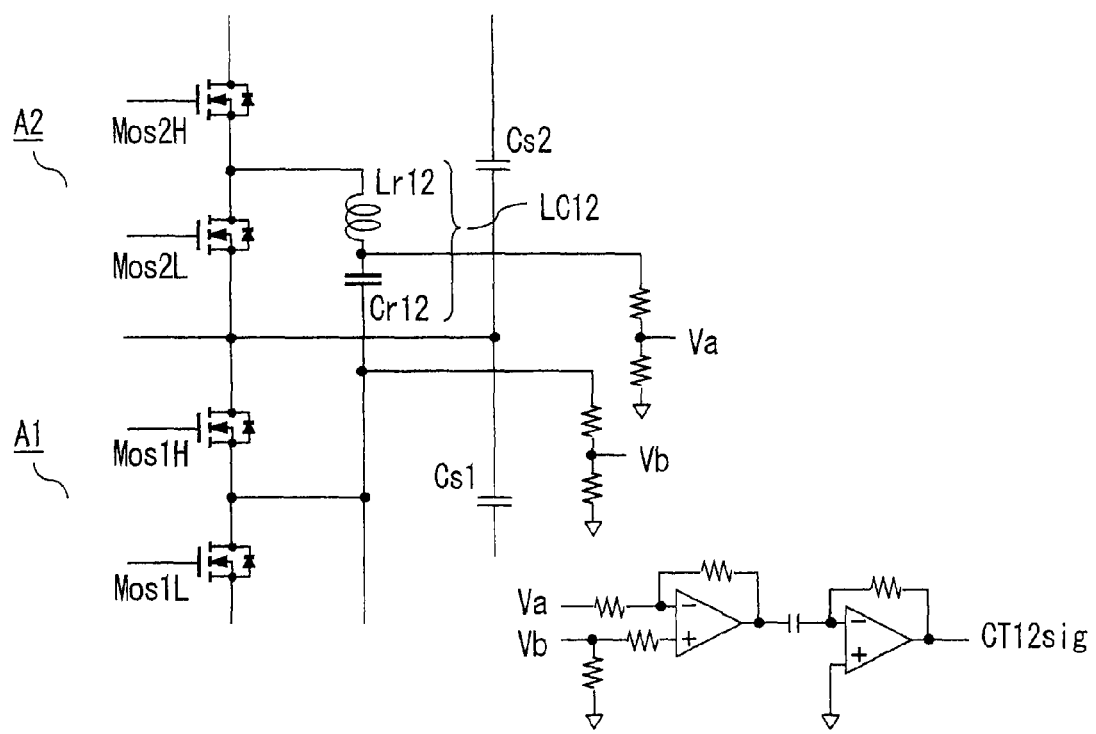
FIG. 9 is a fragmentary circuit diagram of a DC/DC power converting apparatus according to a sixth embodiment of the present invention.

FIG. 9 is a fragmentary circuit diagram of a DC/DC power converting apparatus according to the present embodiment, showing in particular a circuit for detecting the current flowing through the capacitor Cr12 of the LC series circuit LC12, for example.

As shown in the Figure, the current flowing through the capacitor Cr12 is detected by differentiating a voltage difference between a voltage Va obtained by dividing a voltage of the capacitor Cr12 on a side of the circuit A2 and a voltage Vb obtained by dividing a voltage of the capacitor Cr12 on a side of the circuit A1. A current signal thus detected is output as a signal CT12sig.

It is possible to generate the rectification gate signals based on the current signal CT12sig thus output in the same way as from the output signals of the current sensors CT1-CT4 of the foregoing fourth and fifth embodiments, so that the same advantageous effects can be obtained.

Figure 10:
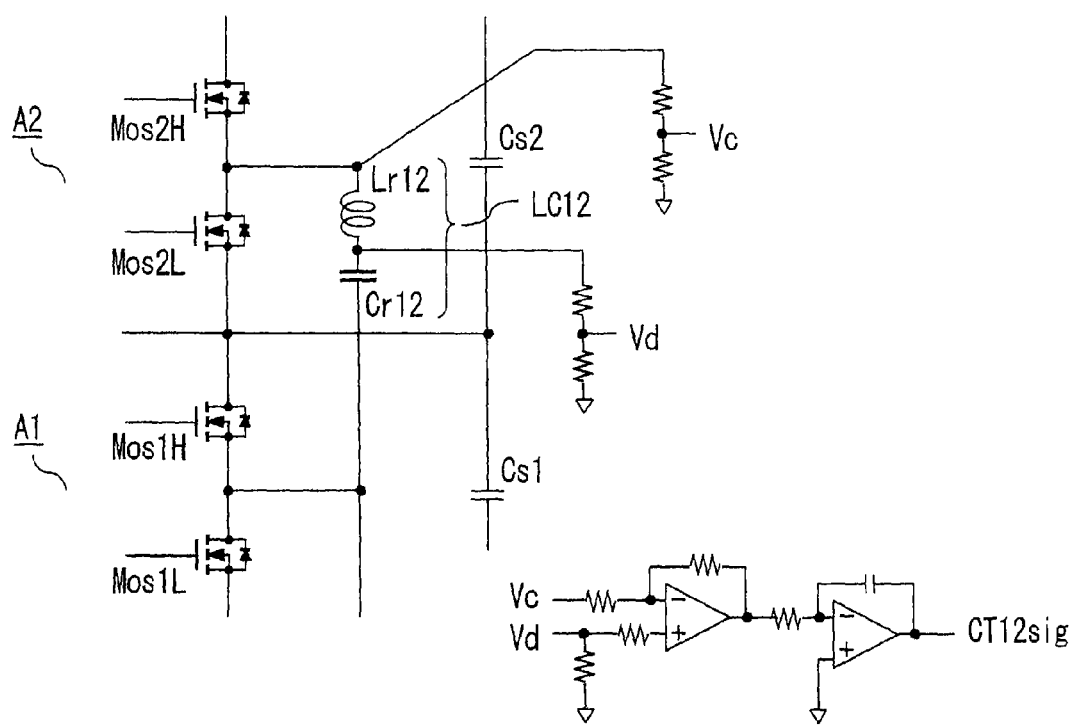
FIG. 10 is a fragmentary circuit diagram of a DC/DC power converting apparatus in another example of the sixth embodiment of the present invention.

While the currents flowing through the capacitors Cr are detected in the foregoing sixth embodiment, currents flowing through the inductors Lr may be detected instead. It is to be noted that the currents flowing through the capacitors Cr are identical to the currents flowing through the inductors Lr because these currents flow through the same LC series circuits. Shown in FIG. 10 is a circuit for detecting the current flowing through the inductor Lr12 of the LC series circuit LC12, for example.

As shown in the Figure, the current flowing through the inductor Lr12 is detected by integrating a voltage difference between a voltage Vc obtained by dividing a voltage of the inductor Lr12 on the side of the circuit A2 and a voltage Vd obtained by dividing a voltage of the inductor Lr12 on the side of the circuit A1. A current signal thus detected is output as the signal CT12sig. Then, it is possible to generate the rectification gate signals in the same way as in the foregoing sixth embodiment and thus obtain the same advantageous effects.

While the foregoing discussion of the embodiment has described how the current flowing through the LC series circuit LC12 is detected, it is possible to detect the currents flowing through the other LC series circuits LC13, LC14 in the same fashion and generate the rectification gate signals based on current signals thus detected.

Seventh Embodiment

Figure 11:
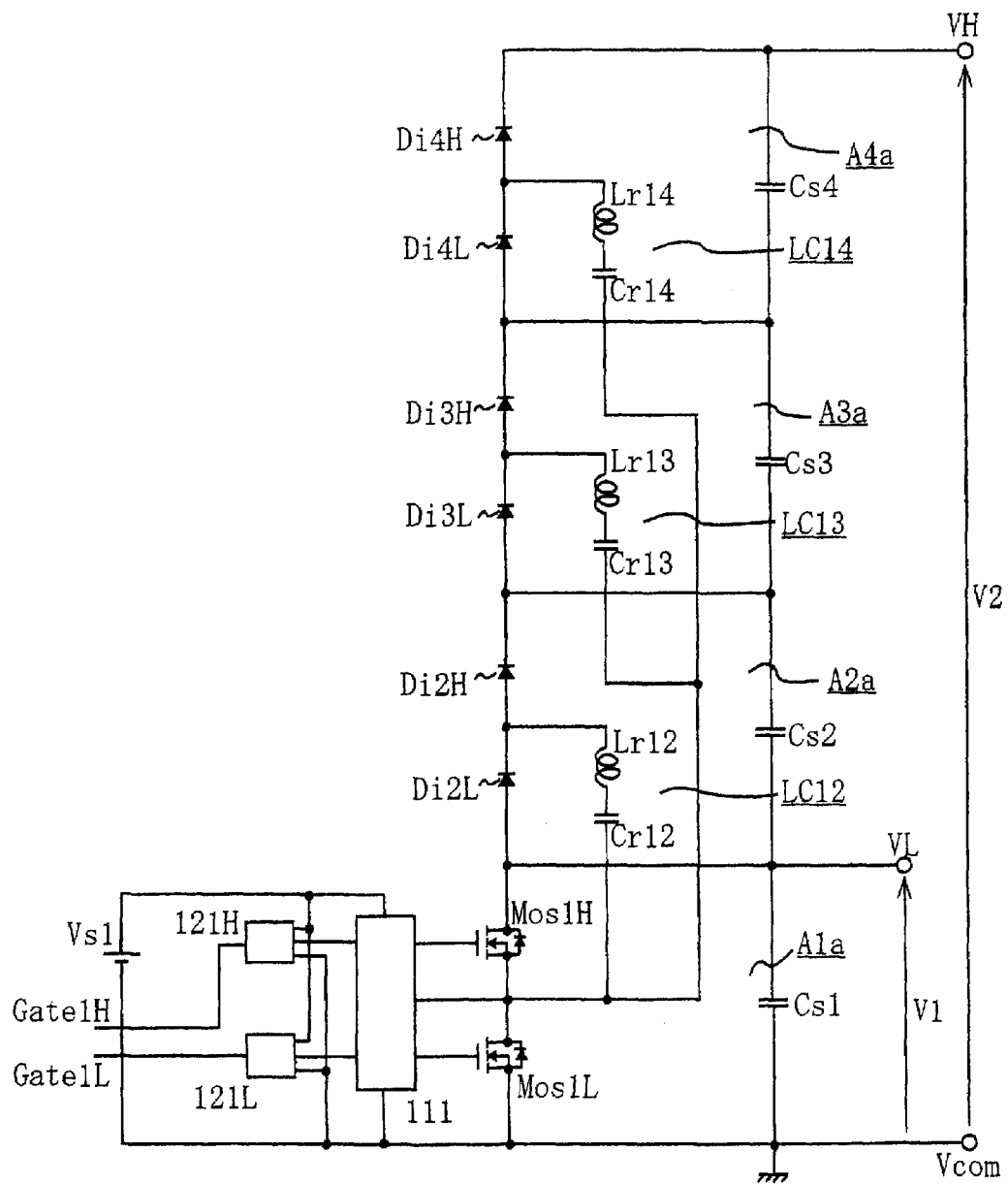
FIG. 11 is a diagram showing the circuit configuration of a principal portion of a DC/DC power converting apparatus according to a seventh embodiment of the present invention.

Next, a DC/DC power converting apparatus according to a seventh embodiment of the present invention is described with reference to the drawings. FIG. 11 shows the circuit configuration of the DC/DC power converting apparatus according to the seventh embodiment of the present invention.

Shown in this seventh embodiment is a boost-type DC/DC power converting apparatus which transfers energy from a voltage V1 across voltage terminals VL and Vcom to a voltage V2 across voltage terminals VH and Vcom. As in the foregoing first embodiment, the voltage V2 is approximately four times as high as the voltage V1, V1 and V2 being 50V and approximately 200V, respectively.

As shown in FIG. 11, the DC/DC power converting apparatus of this embodiment employs circuits A1a-A4a instead of the circuits A1-A4 of the DC/DC power converting apparatus of the aforementioned first embodiment shown in FIG. 1. The circuit A1a has the same configuration as the circuit A1 whereas the circuits A2a-A4a are configured with diodes (Di2L, Di2H), (Di3L, Dis3H), (Di4L, Di4H) which substitute for the pairs of MOSFETs (Mos2L, Mos2H), (Mos3L, Mos3H), (Mos4L, Mos4H). Specifically, the driving inverter circuit A1a is configured with two MOSFETs (Mos1L, Mos1H), one serving as a low-voltage side device and the other as a high-voltage side device, which are connected in series and together connected across opposite terminals of a smoothing capacitor Cs1. Also, the rectifier circuits A2a-A4a are configured to form pairs of diodes (Di2L, Di2H), (Di3L, Dis3H), (Di4L, Di4H), wherein each pair of diodes, one serving as a low-voltage side device and the other as a high-voltage side device which are connected in series, is connected across opposite terminals of one of smoothing capacitors Cs2, Cs3, Cs4. Accordingly, elements other than the gate driving circuit 111, the photocouplers 121H, 121L, the power supply Vs1 and the gate signals Gate1H, Gate1L for driving the MOSFETs (Mos1L, Mos1H) are eliminated from the configuration shown in FIG. 1. In this embodiment, only the driving gate signals Gate1H, Gate1L are output from a control circuit. The DC/DC power converting apparatus has otherwise the same configuration as the aforementioned first embodiment shown in FIG. 1.

Next, the working is described.

The capacitance values of the smoothing capacitors Cs1, Cs2, Cs3, Cs4 are set at sufficiently large values as compared to the capacitance values of the capacitors Cr of the LC series circuits LC12, LC13, LC14. As the voltage V1 input from across the voltage terminals VL and Vcom is raised to the voltage V2 which is approximately four times as high as the voltage V1 and the voltage V2 thus raised is output from across the voltage terminals VH and Vcom, a load is connected between the voltage terminals VH and Vcom and, thus, the voltage V2 has a smaller value than 4×V1. Under steady-state conditions, the smoothing capacitor Cs1 is charged to a voltage equal to the voltage V1 and each of the smoothing capacitors Cs2, Cs3, Cs4 is charged to a voltage equal to (V2−V1)/3 on average.

The driving inverter circuit A1a transfers energy input from across the voltage terminals VL and Vcom to the high-voltage side through ON/OFF operation of the MOSFETs (Mos1L, Mos1H) while the rectifier circuits A2a-A4a rectify a current driven by the driving inverter circuit A1a and transfers the energy to the high-voltage side.

While the driving gate signals Gate1H, Gate1L are generated in the same way as in the aforementioned first embodiment, the currents which flow through the MOSFETs of the rectifier circuits in the aforementioned first embodiment flow through the diodes of the rectifier circuits A2a-A4a in this embodiment, thus causing conduction loss. Due to the voltage-boosting operation performed in the same way as in the aforementioned first embodiment, however, it is possible to effectively use the resonance phenomenon of the LC series circuits LC12, LC13, LC14 and realize a DC/DC power converting apparatus having a high conversion efficiency.

Additionally, the currents I12, I13, I14 flowing through the respective LC series circuits LC12, LC13, LC14 are approximately the same as in the case of the aforementioned first embodiment. Specifically, since the LC series circuits LC12, LC13, LC14 are connected between the intermediate terminals of the driving inverter circuit A1a and the rectifier circuits A2a-A4a, respectively, in a similar way to the aforementioned first embodiment, it is possible to reduce the currents flowing through the LC series circuits LC12, LC13, LC14 for energy transfer, lower current ratings of the inductors Lr and the capacitors Cr of the individual LC series circuits LC12, LC13, LC14 and reduce the inductors Lr and the capacitors Cr in size.

Eighth Embodiment

Figure 12:
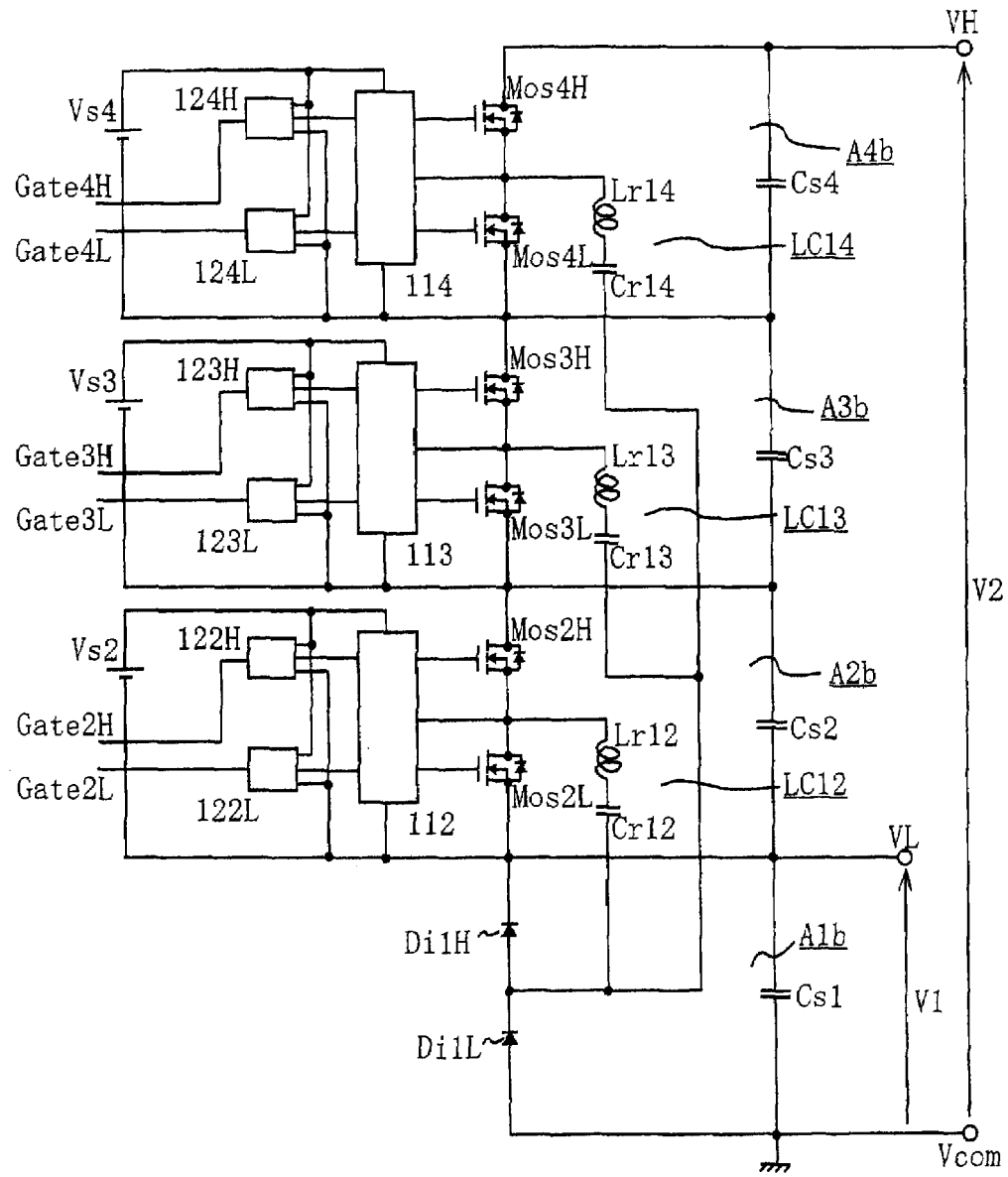
FIG. 12 is a diagram showing the circuit configuration of a principal portion of a DC/DC power converting apparatus according to an eighth embodiment of the present invention.

Next, a DC/DC power converting apparatus according to an eighth embodiment of the present invention is described with reference to the drawings. FIG. 12 shows the circuit configuration of the DC/DC power converting apparatus according to the eighth embodiment of the present invention.

Shown in this eighth embodiment is a buck-type DC/DC power converting apparatus which transfers energy from a voltage V2 across voltage terminals VH and Vcom to a voltage V1 across voltage terminals VL and Vcom. As in the foregoing second embodiment, the voltage V2 is approximately four times as high as the voltage V1, V1 and V2 being 50V and approximately 200V, respectively.

As shown in FIG. 12, the DC/DC power converting apparatus of this embodiment employs circuits A1b-A4b instead of the circuits A1-A4 of the DC/DC power converting apparatus of the aforementioned second embodiment shown in FIG. 1. The circuits A2b-A4b have the same configuration as the circuits A2-A4 whereas the circuit A1b is configured with diodes (Di1L, Di1H) which substitute for the two MOSFETs (Mos1L, Mos1H), respectively. Specifically, the driving inverter circuits A2b-A4b are configured with pairs of MOSFETs, wherein each pair of MOSFETs, one serving as a low-voltage side device and the other as a high-voltage side device which are connected in series, is connected across opposite terminals of one of smoothing capacitors Cs2, Cs3, Cs4. Also, the rectifier circuit A1b is configured with the two diodes (Di1L, Di1H), one serving as a low-voltage side device and the other as a high-voltage side device, which are connected in series and together connected across opposite terminals of a smoothing capacitor Cs1. Accordingly, the gate driving circuit 111, the photocouplers 121H, 121L, the power supply Vs1 and the gate signals Gate1H, Gate1L for driving the MOSFETs of the circuit A1 of FIG. 1 are eliminated from the configuration shown in FIG. 1. In this embodiment, only the driving gate signals Gate2H-Gate4H, Gate2L-Gate4L are output from a control circuit. The DC/DC power converting apparatus has otherwise the same configuration as the aforementioned second embodiment shown in FIG. 1.

While the driving gate signals Gate2H-Gate4H, Gate2L-Gate4L are generated in the same way as in the aforementioned second embodiment, the currents which flow through the MOSFETs of the rectifier circuits in the aforementioned second embodiment flow through the diodes of the rectifier circuit A1b in this embodiment, thus causing conduction loss. Due to the voltage-lowering operation performed in the same way as in the aforementioned second embodiment, however, it is possible to effectively use the resonance phenomenon of the LC series circuits LC12, LC13, LC14 and realize a DC/DC power converting apparatus having a high conversion efficiency.

Additionally, currents I12, I13, I14 flowing through the respective LC series circuits LC12, LC13, LC14 are approximately the same as in the case of the aforementioned second embodiment. Specifically, since the LC series circuits LC12, LC13, LC14 are connected between the intermediate terminals of the rectifier circuit A1b and the driving inverter circuits A2b-A4b, respectively, in a similar way to the aforementioned second embodiment, it is possible to reduce the currents flowing through the LC series circuits LC12, LC13, LC14 for energy transfer, lower current ratings of the inductors Lr and the capacitors Cr of the individual LC series circuits LC12, LC13, LC14 and reduce the inductors Lr and the capacitors Cr in size.

Ninth Embodiment

Figure 13:
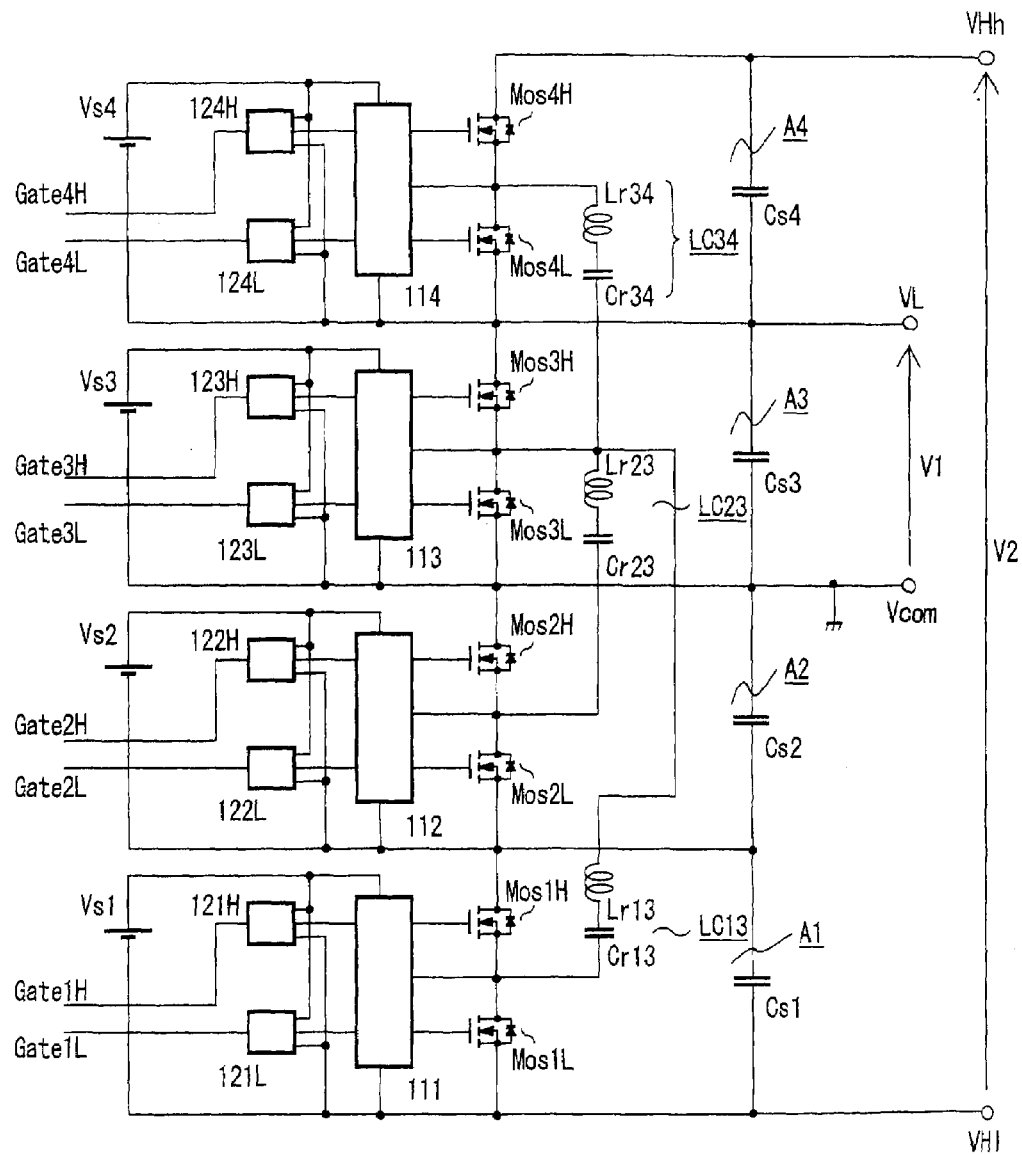
FIG. 13 is a diagram showing the circuit configuration of a principal portion of a DC/DC power converting apparatus according to a ninth embodiment of the present invention.
Figure 14:
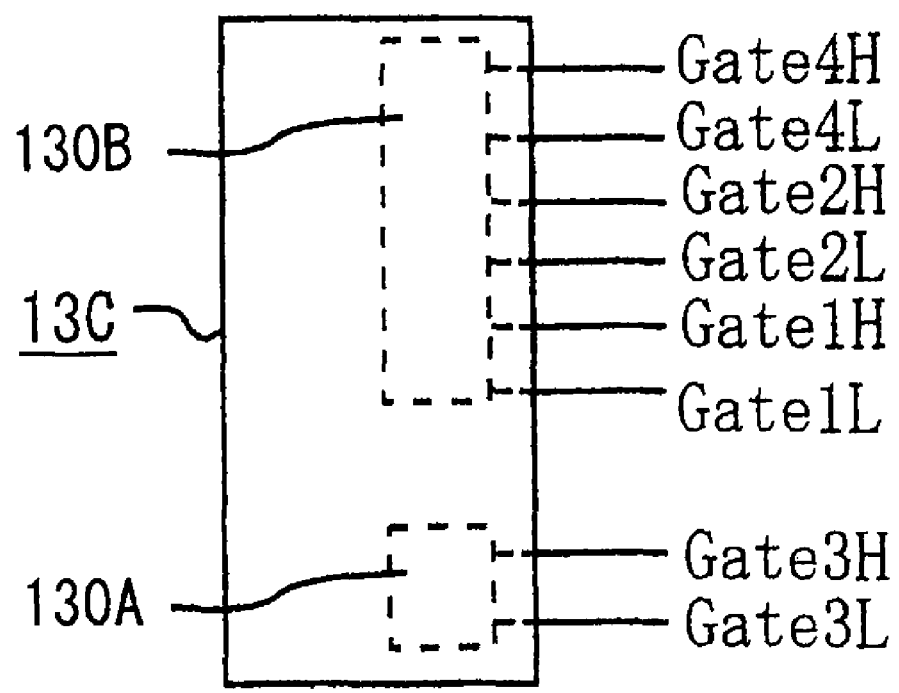
FIG. 14 is a diagram showing the circuit configuration of a gate signal generator of the DC/DC power converting apparatus according to the ninth embodiment of the present invention.

Next, a DC/DC power converting apparatus according to a ninth embodiment of the present invention is described. FIGS. 13 and 14 show the circuit configuration of the DC/DC power converting apparatus according to the ninth embodiment of the present invention. Particularly, FIG. 13 shows a principal portion of the apparatus and FIG. 14 shows a gate signal generator.

Shown in this ninth embodiment is a boost-type DC/DC power converting apparatus having a function to convert a voltage V1 input from across voltage terminals VL and Vcom to a voltage V2, which is approximately four times as high as the voltage V1, and output the voltage V2 thus raised from across voltage terminals VHh and VHl. The voltage V2 is approximately four times as high as the voltage V1, V1 and V2 being 50V and approximately 200V, respectively, here.

As shown in FIG. 13, the DC/DC power converting apparatus employs circuits A1-A4 whose MOSFETs and smoothing capacitors are configured in the same way as in the circuits A1-A4 of the aforementioned first embodiment. The DC/DC power converting apparatus differs from that of the first embodiment in connections of the LC series circuits and voltage terminals provided between the individual circuits. Specifically, the positive voltage terminal VL on the low-voltage side is connected to a connecting point of smoothing capacitors Cs3 and Cs4, and the grounded negative voltage terminal Vcom on the low-voltage side is connected to a connecting point of smoothing capacitors Cs2 and Cs3. Also, the positive voltage terminal VHh on the high-voltage side is connected to the high-voltage side terminal of the smoothing capacitor Cs4, and the negative voltage terminal VHl on the high-voltage side is connected to the low-voltage side terminal of a smoothing capacitor Cs1.

Then, LC series circuits LC13, LC23, LC34 which function as energy transfer devices configured with series-connected units, each including one of capacitors Cr13, Cr23, Cr34 and one of inductors Lr13, Lr23, Lr34, are connected between the intermediate terminals of the circuit A3 which constitutes one specific circuit and the other circuits A1, A2, A4, respectively. Values of periods of resonance determined by inductance values and capacitance values of the inductors Lr and the capacitors Cr of the individual stages are made equal to one another.

Each of the MOSFETs is a power MOSFET in which a parasitic diode is formed between a source and a drain.

The circuit A3 is used as a driving inverter circuit for transferring energy input from across the voltage terminals VL and Vcom to the high-voltage side and the low-voltage side through ON/OFF operation of the MOSFETs (Mos3L, Mos3H). Also, the circuits A1, A2, A4 are used as rectifier circuits for rectifying a current driven by the driving inverter circuit A3 and transferring the energy.

As shown in FIG. 14, gate signals Gate1L, Gate1H, Gate2L, Gate2H, Gate3L, Gate3H, Gate4L, Gate4H are generated by a control circuit 13c which constitutes the gate signal generator. The control circuit 13c has a driving gate signal generating portion 130A for generating the driving gate signals Gate3L, Gate3H for driving the driving inverter circuit A3 and a rectification gate signal generating portion 130B for generating the rectification gate signals Gate1L, Gate1H, Gate2L, Gate2H, Gate4L, Gate4H for driving the rectifier circuits A1, A2, A4. In this embodiment, a signal processing circuit like a microcomputer generates the driving gate signals and the rectification gate signals.

Next, the working is described.

The capacitance values of the smoothing capacitors Cs1, Cs2, Cs3, Cs4 are set at sufficiently large values as compared to the capacitance values of the capacitors Cr13, Cr23, Cr34 of the LC series circuits.

As the voltage V1 input from across the voltage terminals VL and Vcom is raised to the voltage V2 which is approximately four times as high as the voltage V1 and the voltage V2 thus raised is output from across the voltage terminals VHh and VHl as mentioned above, a load is connected between the voltage terminals VHh and VHl and, thus, the voltage V2 has a smaller value than 4×V1. Under steady-state conditions, the smoothing capacitor Cs3 is charged to a voltage equal to the voltage V1 and each of the smoothing capacitors Cs1, Cs2, Cs4 is charged to a voltage equal to (V2−V1)/3 on average.

Like the driving gate signals Gate1L, Gate1H of the aforementioned first embodiment, the driving gate signals Gate3L, Gate3H are ON/OFF signals having a period T which is slightly longer than the period of resonance 2t determined by LC series resonance of Lr and Cr and a duty cycle of about 50%. Also, as is the case with the rectification gate signals Gate2L, Gate2H, Gate3L, Gate3H, Gate4L, Gate4H of the aforementioned first embodiment, rise timings of individual pulses of the rectification gate signals Gate1L, Gate1H, Gate2L, Gate2H, Gate4L, Gate4H are set to coincide with rise timings of individual pulses of the driving gate signals and fall timings of the individual pulses of the rectification gate signals Gate1L, Gate1H, Gate2L, Gate2H, Gate4L, Gate4H are set to precede fall timings of the individual pulses of the driving gate signals by specific time periods τH, τL, respectively (refer to FIG. 3).

When Mos1L, Mos2L, Mos3L, Mos4L which are the low-voltage side MOSFETs of the individual circuits A1-A4 are brought into the ON state, part of energy stored in the smoothing capacitor Cs3 is transferred to the capacitor Cr34 and energy charged into the capacitors Cr23, Cr13 is transferred to the smoothing capacitors Cs2, Cs1 through paths shown below, respectively, due to the presence of voltage differences. In Mos1L, Mos2L, Mos4L, currents flow from the sources to the drains through the parasitic diodes of the respective MOSFETs even when the rectification pulse is in the OFF state. Specifically, in each of the MOSFETs Mos1L, Mos2L, Mos4L, a current flows during the time period t which is equal to one-half the period of resonance of the LC series circuits LC13, LC23, LC34 and, then, the current is interrupted by the reverse current preventing function of the parasitic diode.

Cs3⇒Mos4L⇒Lr34⇒Cr34⇒Mos3L
Cr23⇒Lr23⇒Mos3L⇒Cs2⇒Mos2L
Cr13⇒Lr13⇒Mos3L⇒Cs2⇒Cs1⇒Mos1L

Subsequently, when Mos1H, Mos2H, Mos3H, Mos4H which are the high-voltage side MOSFETs of the individual circuits A1-A4 are brought into the ON state, the energy charged into the capacitor Cr34 is transferred to the smoothing capacitor Cs4 and part of energy stored in the smoothing capacitors Cs2, Cs3 is transferred to the capacitors Cr13, Cr23 through paths shown below, respectively, due to the presence of voltage differences. In Mos1H, Mos2H, Mos4H, currents flow from the sources to the drains through the parasitic diodes of the respective MOSFETs even when the rectification pulse is in the OFF state. Specifically, in each of the MOSFETs Mos1H, Mos2H, Mos4H, a current flows during the time period t which is equal to one-half the period of resonance of the LC series circuits LC13, LC23, LC34 and, then, the current is interrupted by the reverse current preventing function of the parasitic diode.

Cr34⇒Lr34⇒Mos4H⇒Cs4⇒Mos3H
Cs3⇒Mos3H⇒Lr23⇒Cr23⇒Mos2H
Cs2⇒Cs3⇒Mos3H⇒Lr13⇒Cr13⇒Mos1H

The energy is transferred from the smoothing capacitor Cs3 to the smoothing capacitors Cs1, Cs2, Cs4 as a result of charging and discharging operation of the capacitors Cr13, Cr23, Cr34 as discussed above. Then, the voltage V1 input from across the voltage terminals VL and Vcom is raised to the voltage V2 which is approximately four times as high as the voltage V1 and the voltage V2 thus raised is output from across the voltage terminals VHh and VHl. Also, the inductors Lr13, Lr23, Lr34 are series-connected to the capacitors Cr13, Cr23, Cr34 to configure the LC series circuits LC13, LC23, LC34, respectively. This configuration utilizes the resonance phenomenon for transferring the energy, making it possible to efficiently transfer a large amount of energy.

In this embodiment, the LC series circuits LC13, LC23, LC34 are connected between the driving inverter circuit A3, which includes the smoothing capacitor Cs1 having the two terminals to which the low-voltage side voltage terminals VL and Vcom serving as input terminals are connected, and the other circuits A1, A2, A4 serving as the rectifier circuits, respectively. It is therefore possible to make the values of currents flowing through the individual LC series circuits LC13, LC23, LC34 equal to minimum values and, thus, reduce the current values as in the aforementioned first embodiment. This makes it possible to lower current ratings of the inductors Lr and the capacitors Cr of the LC series circuits LC13, LC23, LC34 used for energy transfer and reduce the inductors Lr and the capacitors Cr in size.

While the low-voltage side voltage terminals VL and Vcom are connected to both terminals of the smoothing capacitor Cs1 in the aforementioned first embodiment, the low-voltage side voltage terminals VL and Vcom are connected to both terminals of the smoothing capacitor Cs3 of the circuit A3 which is located midway between the other circuits, so that the voltage V1 is input across the terminals of the smoothing capacitor Cs3 in this embodiment. Expressing voltages across the capacitors Cr12, Cr13, Cr14 of the LC series circuits LC12, LC13, LC14 of the aforementioned first embodiment as V12r, V13r, V14r and voltages across the capacitors Cr13, Cr23, Cr34 of the LC series circuits LC13, LC23, LC34 of this embodiment as V13, V23, V34, respectively, there exist the following relationships:

$$V12r:V13r:V14r=1:2:3$$

$$V34:V13:V23=1:2:1$$

$$V34=V23=V12r$$

As the low-voltage side voltage terminals VL and Vcom are connected to both terminals of the smoothing capacitor Cs3 of the circuit A3 which is located midway between the other circuits as discussed above, the voltages across the capacitor Cr23 of this embodiment becomes one-third the voltages across the capacitor Cr14 of the first embodiment. It is possible to lower voltage ratings of the capacitors Cr13, Cr23, Cr34 and further reduce the capacitors in size compared to the aforementioned first embodiment by reducing the voltages across the capacitors Cr13, Cr23, Cr34 of the LC series circuits LC13, LC23, LC34 in the aforementioned manner.

The present embodiment employs the MOSFETs in the rectifier circuits A1, A2, A4 so that it is possible to reduce conduction loss and improve power conversion efficiency as compared to levels achieved with an arrangement using diodes.

Also, the MOSFETs of the rectifier circuits A1, A2, A4 are brought into the ON state simultaneously with the MOSFETs of the driving inverter circuit A3 and brought into the OFF state earlier than the MOSFETs of the driving inverter circuit A3 by a period of time not exceeding the time period t. It would be possible to minimize the conduction loss if the ON period of the MOSFETs of the rectifier circuits A1, A2, A4 is matched to the conduction period t of the MOSFETs. However, the MOSFETs of the rectifier circuits A1, A2, A4 conduct through the parasitic diodes if the ON state of the MOSFETs is terminated earlier as discussed above, so that the energy can be transferred during this conduction period as well. It is therefore possible to avoid problems caused by a delay in control, for instance, and improve reliability.

Additionally, since the rectification gate signals are generated within the time period t from the rise timings of the driving gate signals, currents are interrupted after flowing during the time period t which is equal to one-half the period of resonance of the LC series circuits LC13, LC23, LC34 and, thus, the currents do not flow in the reverse direction. It is therefore possible to effectively use the resonance phenomenon of the LC series circuits LC13, LC23, LC34. Moreover, as the conduction loss can be reduced by use of the MOSFETs, it is possible to realize a DC/DC power converting apparatus having a high conversion efficiency.

Furthermore, since the control circuit 13c has the driving gate signal generating portion 130A and the rectification gate signal generating portion 130B to separately generate the driving gate signals Gate3L, Gate3H and the rectification gate signals Gate1L, Gate1H, Gate2L, Gate2H, Gate4L, Gate4H, it is possible to easily control the MOSFETs of the rectifier circuits A1, A2, A4 separately from the MOSFETs of the driving inverter circuit A3 and realize the above-described desirable operation as well as a DC/DC power converting apparatus having a high conversion efficiency in a reliable fashion.

While the gate signals for the driving inverter circuit A3 and the gate signals for the rectifier circuits A1, A2, A4 are generated by the control circuit 13c in this ninth embodiment, the gate signals for the rectifier circuits A1, A2, A4 may be generated by detecting the currents flowing through the capacitors Cr as in the foregoing fourth to sixth embodiments.

Tenth Embodiment

While the boost-type DC/DC power converting apparatus for raising the voltage V1 to the voltage V2 which is approximately four times as high as the voltage V1 has been described in the foregoing ninth embodiment, the following discussion of the present embodiment illustrates a buck-type DC/DC power converting apparatus which lowers the voltage V2 down to the voltage V1.

Figure 15:
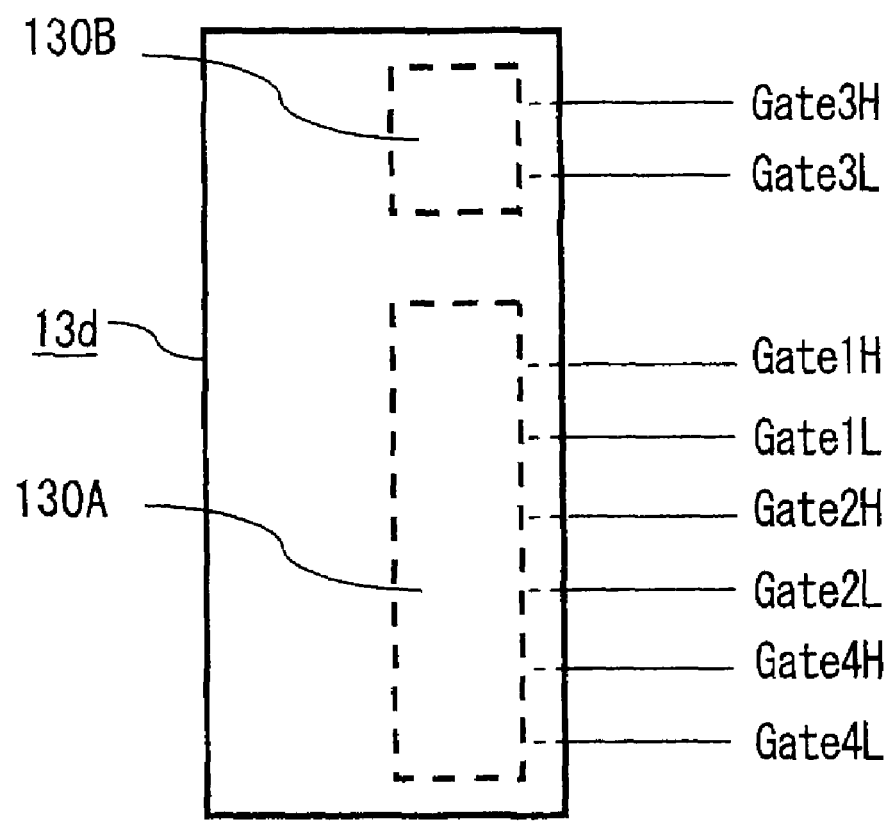
FIG. 15 is a diagram showing the circuit configuration of a gate signal generator of a DC/DC power converting apparatus according to a tenth embodiment of the present invention.

While a principal portion of the circuit configuration of the DC/DC power converting apparatus according to the present embodiment is the same as the circuit configuration shown in FIG. 13, the circuits A1, A2, A4 are used as driving inverter circuits and the circuit A3 is used as a rectifier circuit in this embodiment. A control circuit 13d which is a gate signal generator is shown in FIG. 15. In this embodiment, the voltage terminals VL, Vcom connected to both terminals of the smoothing capacitor Cs3 serve as output terminals from which the voltage V1 obtained from across the terminals of the smoothing capacitor Cs3 is output, and to which a load is connected.

As shown in FIG. 15, gate signals Gate1L, Gate1H, Gate2L, Gate2H, Gate3L, Gate3H, Gate4L, Gate4H are generated by a control circuit 13d. The control circuit 13d has a driving gate signal generating portion 130A for generating the driving gate signals Gate1L, Gate1H, Gate2L, Gate2H, Gate4L, Gate4H for driving the driving inverter circuits A1, A2, A4 and a rectification gate signal generating portion 130B for generating the rectification gate signals Gate3L, Gate3H for driving the rectifier circuit A3. A signal processing circuit like a microcomputer generates the driving gate signals and the rectification gate signals in this embodiment as well.

Next, the working is described.

The capacitance values of the smoothing capacitors Cs1, Cs2, Cs3, Cs4 are set at sufficiently large values as compared to the capacitance values of the capacitors Cr13, Cr23, Cr34 of the LC series circuits.

As the voltage V2 input from across the voltage terminals VHh and VHl is lowered to the voltage V1 which is approximately ¼ times the voltage V2 and the voltage V1 thus lowered is output from across the voltage terminals VL and Vcom as mentioned above, a load is connected between the voltage terminals VL and Vcom and, thus, the voltage V2 has a larger value than 4×V1.

The driving gate signals Gate1L, Gate1H, Gate2L, Gate2H, Gate4L, Gate4H are ON/OFF signals having a period T which is slightly longer than the period of resonance 2t determined by LC series resonance of Lr and Cr and a duty cycle of about 50%. Rise timings of the rectification gate signals Gate3L, Gate3H are set to coincide with rise timings of the driving gate signals and fall timings of the rectification gate signals Gate3L, Gate3H are set to precede fall timings of the driving gate signals by specific time periods τH, τL, respectively.

When Mos1H, Mos2H, Mos3H, Mos4H which are the high-voltage side MOSFETs of the individual circuits A1-A4 are brought into the ON state, part of energy stored in the smoothing capacitor Cs4 is transferred to the capacitor Cr34 and energy charged into the capacitors Cr23, Cr13 is transferred to the smoothing capacitors Cs2, Cs3 through paths shown below, respectively, due to the presence of voltage differences. In Mos3H, a current flows from the source to the drain through the parasitic diode of the MOSFET even when the rectification pulse is in the OFF state. Specifically, in Mos3H, the current flows during the time period t which is equal to one-half the period of resonance of the LC series circuits LC13, LC23, LC34 and, then, the current is interrupted by the reverse current preventing function of the parasitic diode.

Cs4⇒Mos4H⇒Lr34⇒Cr34⇒Mos3H
Cr23⇒Lr23⇒Mos3H⇒Cs3⇒Mos2H
Cr13⇒Lr13⇒Mos3H⇒Cs3⇒Cs2⇒Mos1H

Subsequently, when Mos1L, Mos2L, Mos3L, Mos4L which are the low-voltage side MOSFETs of the individual circuits A1-A4 are brought into the ON state, the energy charged into the capacitor Cr34 is transferred to the smoothing capacitor Cs3 and part of energy stored in the smoothing capacitors Cs1, Cs2 is transferred to the capacitors Cr13, Cr23 through paths shown below, respectively, due to the presence of voltage differences. In Mos3L, a current flows from the source to the drain through the parasitic diode of the MOSFET even when the rectification pulse is in the OFF state. Specifically, in Mos3L, the current flows during the time period t which is equal to one-half the period of resonance of the LC series circuits LC13, LC23, LC34 and, then, the current is interrupted by the reverse current preventing function of the parasitic diode.

Cr34⇒Lr34⇒Mos4L⇒Cs3⇒Mos3L
Cs2⇒Mos3L⇒Lr23⇒Cr23⇒Mos2L
Cs1⇒Cs2⇒Mos3L⇒Lr13⇒Cr13⇒Mos1L

The energy is transferred from the smoothing capacitors Cs1, Cs2, Cs4 to the smoothing capacitor Cs3 as a result of charging and discharging operation of the capacitors Cr13, Cr23, Cr34 as discussed above. Then, the voltage V2 input from across the voltage terminals VHh and VHl is lowered to the voltage V1 which is approximately ¼ times the voltage V2 and the voltage V1 thus lowered is output from across the voltage terminals VL and Vcom. Also, the inductors Lr13, Lr23, Lr34 are series-connected to the capacitors Cr13, Cr23, Cr34, respectively, to configure the LC series circuits. This configuration utilizes the resonance phenomenon for transferring the energy, making it possible to efficiently transfer a large amount of energy.

As in the foregoing ninth embodiment, it is possible to make the values of currents flowing through the individual LC series circuits LC13, LC23, LC34 equal to minimum values and, thus, reduce the current values in this embodiment as well. This makes it possible to lower current ratings of the inductors Lr and the capacitors Cr of the LC series circuits LC13, LC23, LC34 used for energy transfer and reduce the inductors Lr and the capacitors Cr in size.

Also, as the voltage terminals VL and Vcom serving as the output terminals are connected to both terminals of the smoothing capacitor Cs3 of the circuit A3 which is located midway between the other circuits, it is possible to lower voltage ratings of the capacitors Cr13, Cr23, Cr34 of the LC series circuits LC13, LC23, LC34 and further reduce the capacitors in size as in the foregoing ninth embodiment.

Also, the MOSFETs of the rectifier circuit A3 are brought into the ON state simultaneously with the MOSFETs of the driving inverter circuits A1, A2, A4 and brought into the OFF state earlier than the MOSFETs of the driving inverter circuits A1, A2, A4 by a period of time not exceeding the time period t. It would be possible to minimize the conduction loss if the ON period of the MOSFETs of the rectifier circuit A3 is matched to the conduction period t of the MOSFETs. However, the MOSFETs of the rectifier circuit A3 conduct through the parasitic diodes if the ON state of the MOSFETs is terminated earlier as discussed above, so that the energy can be transferred during this conduction period as well. It is therefore possible to avoid problems caused by a delay in control, for instance, and improve reliability.

Additionally, since pulses of the rectification gate signals are generated within the time period t from the rise timings of pulses of the driving gate signals in this embodiment as well, currents are interrupted after flowing during the time period t which is equal to one-half the period of resonance of the LC series circuits LC13, LC23, LC34 and, thus, the currents do not flow in the reverse direction. It is therefore possible to effectively use the resonance phenomenon of the LC series circuits LC13, LC23, LC34. Moreover, as the conduction loss can be reduced by use of the MOSFETs in the rectifier circuit A3, it is possible to realize a DC/DC power converting apparatus having a high conversion efficiency.

Furthermore, since provision is made to separately generate the driving gate signals and the rectification gate signals, it is possible to easily control the MOSFETs of the rectifier circuit A3 separately from the MOSFETs of the driving inverter circuits A1, A2, A4 and realize the above-described desirable operation as well as a DC/DC power converting apparatus having a high conversion efficiency in a reliable fashion.

It is to be pointed out that the gate signals for the rectifier circuit A3 may be generated by detecting the currents flowing through the capacitors Cr in this tenth embodiment too as in the foregoing fourth to sixth embodiments.

Furthermore, although the input/output voltage terminals VL, Vcom are connected to both terminals of the smoothing capacitor Cs3 in the foregoing ninth and tenth embodiments, the voltage terminals VL, Vcom may be connected to both terminals of the smoothing capacitor Cs2. This alternative configuration also makes it possible to obtain the same advantageous effects as discussed in the ninth and tenth embodiments. Moreover, even when the number of stages of rectifier circuits is increased, it is possible to obtain the same advantageous effects if the voltage terminals VL, Vcom are connected to both terminals of the smoothing capacitor Cs of a circuit located midway between other circuits.

Eleventh Embodiment

While the boost-type DC/DC power converting apparatus for raising V1 to V2 has been described in the foregoing ninth embodiment and the buck-type DC/DC power converting apparatus for lowering V2 to V1 has been described in the foregoing tenth embodiment, the following discussion of the present embodiment illustrates a buck-boost DC/DC power converting apparatus having the functions of both the aforementioned ninth and tenth embodiments to realize bi-directional energy transfer.

A principal portion of the circuit configuration of the DC/DC power converting apparatus according to the present embodiment is the same as that of the ninth and tenth embodiments shown in FIG. 13. In this embodiment, the circuit A3 is used as a driving inverter circuit and the circuits A1, A2, A4 are used as rectifier circuits in the voltage-boosting mode, while the circuit A3 is used as a driving inverter circuit and the circuits A1, A2, A4 are used as rectifier circuits in the voltage-lowering mode.

In this embodiment, the buck-boost DC/DC power converting apparatus is realized by inputting voltages at the voltage terminals VL, Vcom, VHh, VHl into a control circuit and switching the rectification gate signals and the driving gate signals by the control circuit based on the voltages at the voltage terminals as in the aforementioned third embodiment. Alternatively, the buck-boost DC/DC power converting apparatus may be realized by providing a circuit for generating rectification gate signals for voltage-boosting mode operation and a circuit for generating rectification gate signals for voltage-lowering mode operation, and switching the rectification gate signals and the driving gate signals by using detected currents as shown in the fifth embodiment.

Twelfth Embodiment

Figure 16:
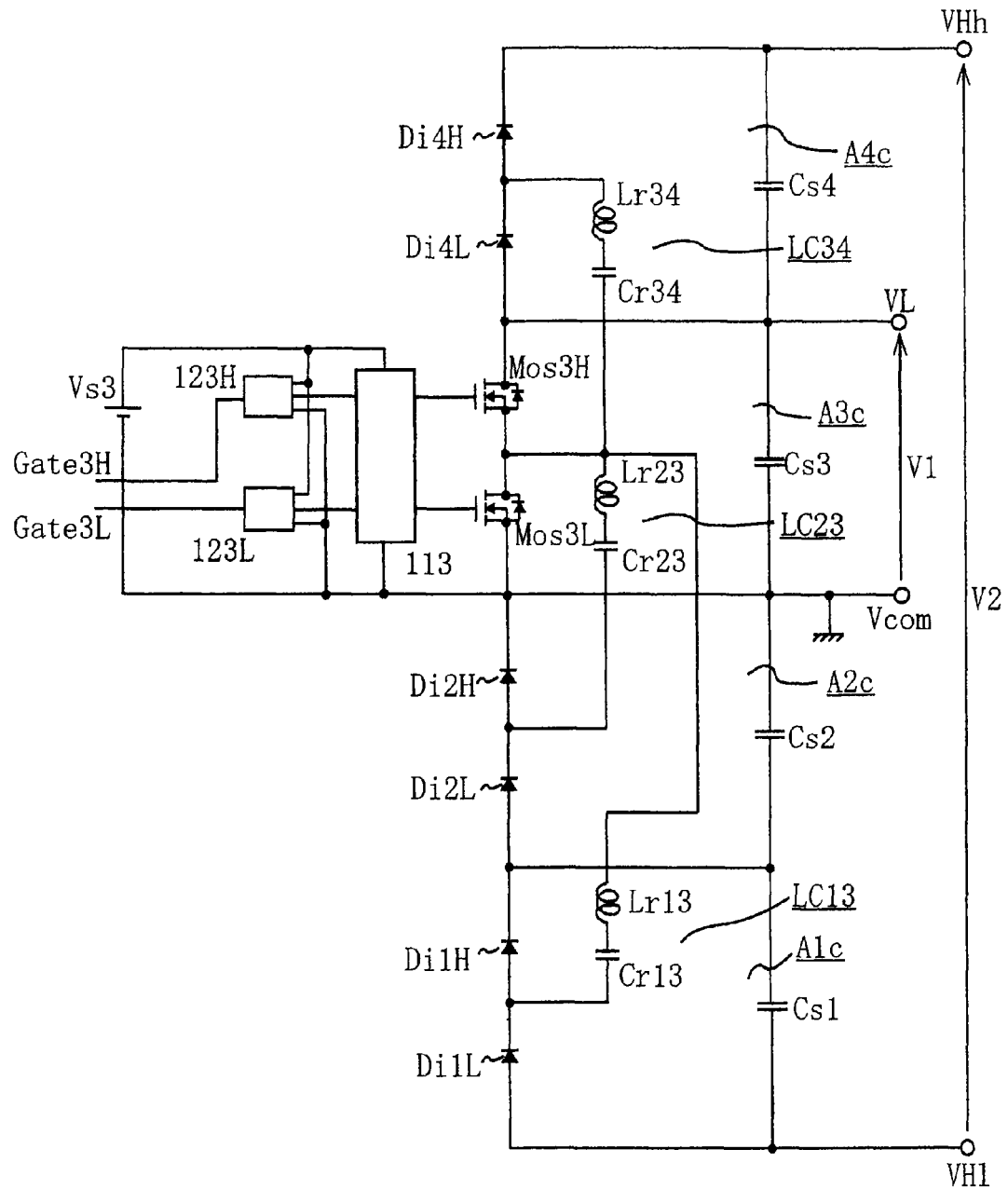
FIG. 16 is a diagram showing the circuit configuration of a principal portion of a DC/DC power converting apparatus according to a twelfth embodiment of the present invention.

Next, a DC/DC power converting apparatus according to a twelfth embodiment of the present invention is described. FIG. 16 shows the circuit configuration of the DC/DC power converting apparatus according to the twelfth embodiment of the present invention.

Shown in this twelfth embodiment is a boost-type DC/DC power converting apparatus which transfers energy from a voltage V1 across voltage terminals VL and Vcom to a voltage V2 across voltage terminals VHh and VHl. As in the foregoing ninth embodiment, the voltage V2 is approximately four times as high as the voltage V1, V1 and V2 being 50V and approximately 200V, respectively.

As shown in FIG. 16, the DC/DC power converting apparatus employs circuits A1c-A4c instead of the circuits A1-A4 of the DC/DC power converting apparatus of the aforementioned ninth embodiment shown in FIG. 13. The circuit A3c has the same configuration as the circuit A3 whereas the circuits A1c, A2c, A4c are configured with diodes (Di1L, Di1H), (Di2L, Di2H), (Di4L, Di4H) which substitute for the pairs of MOSFETs (Mos1L, Mos1H), (Mos2L, Mos2H), (Mos4L, Mos4H). Specifically, the driving inverter circuit A3c is configured with two MOSFETs (Mos3L, Mos3H), one serving as a low-voltage side device and the other as a high-voltage side device, which are connected in series and together connected across opposite terminals of a smoothing capacitor Cs3. Also, the rectifier circuits A1c, A2c, A4c are configured to form pairs of diodes (Di1L, Di1H), (Di2L, Di2H), (Di4L, Di4H), wherein each pair of diodes, one serving as a low-voltage side device and the other as a high-voltage side device which are connected in series, is connected across opposite terminals of one of smoothing capacitors Cs1, Cs2, Cs4. Accordingly, elements other than the gate driving circuit 113, the photocouplers 123H, 123L, the power supply Vs3 and the gate signals Gate3H, Gate3L for driving the MOSFETs (Mos3L, Mos3H) are eliminated from the configuration shown in FIG. 13. In this embodiment, only the driving gate signals Gate3H, Gate3L are output from a control circuit. The DC/DC power converting apparatus has otherwise the same configuration as the aforementioned ninth embodiment shown in FIG. 13.

Next, the working is described.

The driving inverter circuit A3c transfers energy input from across the voltage terminals VL and Vcom to the high-voltage side through ON/OFF operation of the MOSFETs (Mos3L, Mos3H) while the rectifier circuits A1c, A2c, A4c rectify a current driven by the driving inverter circuit A3c and transfers the energy to the high-voltage side.

While the driving gate signals Gate3H, Gate3L are generated in the same way as in the aforementioned ninth embodiment, the currents which flow through the MOSFETs of the rectifier circuits in the aforementioned ninth embodiment flow through the diodes of the rectifier circuits A1c, A2c, A4c in this embodiment, thus causing conduction loss. Due to the voltage-boosting operation performed in the same way as in the aforementioned ninth embodiment, however, it is possible to effectively use the resonance phenomenon of the LC series circuits LC13, LC23, LC34 and realize a DC/DC power converting apparatus having a high conversion efficiency.

Additionally, currents flowing through the respective LC series circuits LC13, LC23, LC34 and voltages across the capacitors Cr13, Cr23, Cr34 are approximately the same as in the case of the aforementioned ninth embodiment.

Specifically, it is possible to make the values of the currents flowing through the individual LC series circuits LC13, LC23, LC34 equal to minimum values and, thus, reduce the current values in this embodiment too as in the aforementioned ninth embodiment. This makes it possible to lower current ratings of the inductors Lr and the capacitors Cr of the LC series circuits LC13, LC23, LC34 used for energy transfer and reduce the inductors Lr and the capacitors Cr in size. Also, as the voltage terminals VL and Vcom serving as the output terminals are connected to both terminals of the smoothing capacitor Cs3 of the circuit A3 which is located midway between the other circuits, it is possible to lower voltage ratings of the capacitors Cr13, Cr23, Cr34 of the LC series circuits LC13, LC23, LC34 and further reduce the capacitors in size as in the foregoing ninth embodiment.

Thirteenth Embodiment

Figure 17:
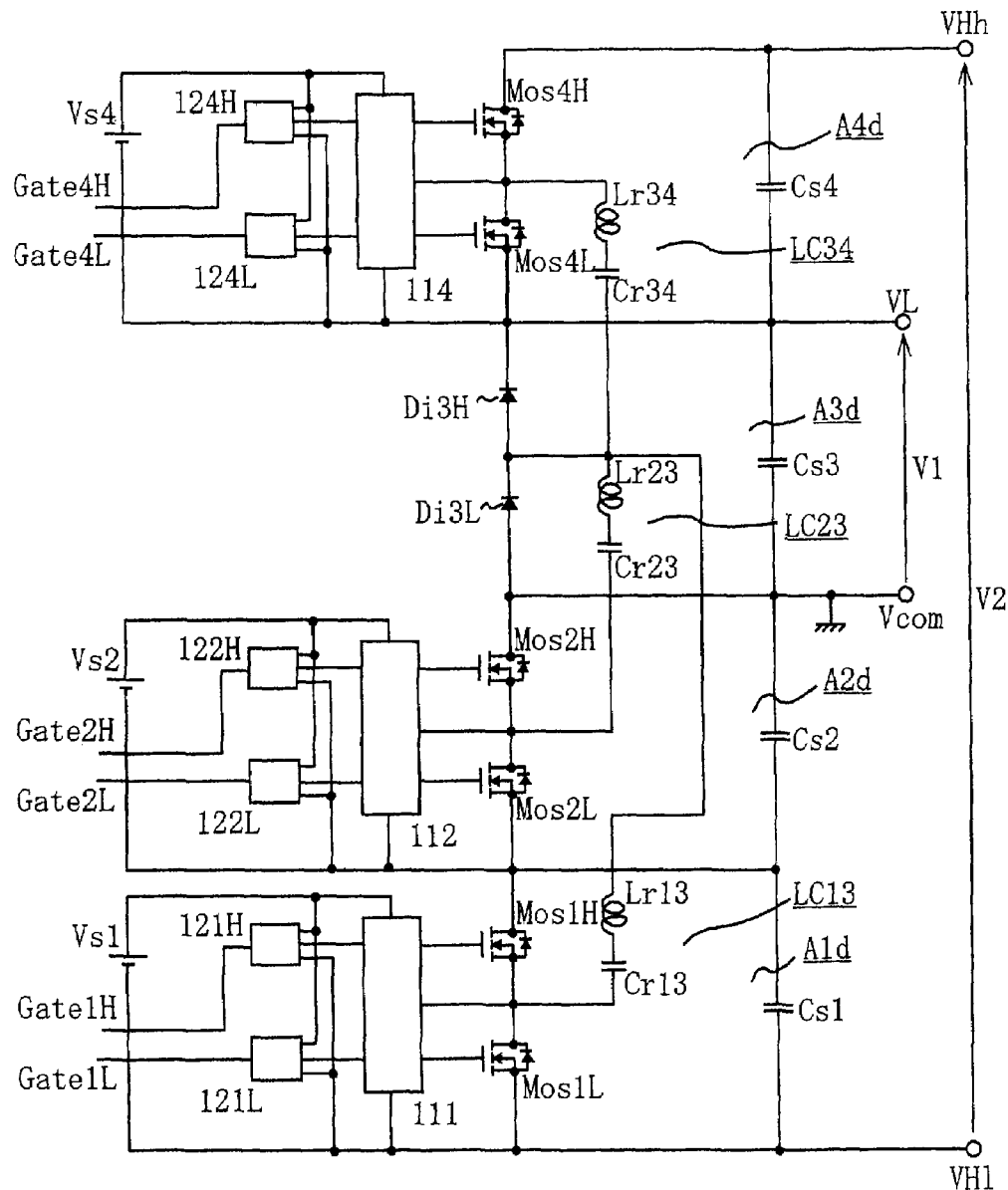
FIG. 17 is a diagram showing the circuit configuration of a principal portion of a DC/DC power converting apparatus according to a thirteenth embodiment of the present invention.

Next, a DC/DC power converting apparatus according to a thirteenth embodiment of the present invention is described with reference to the drawings. FIG. 17 shows the circuit configuration of the DC/DC power converting apparatus according to the thirteenth embodiment of the present invention.

Shown in this thirteenth embodiment is a buck-type DC/DC power converting apparatus which transfers energy from a voltage V2 across voltage terminals VHh and VHl to a voltage V1 across voltage terminals VL and Vcom. As in the foregoing tenth embodiment, the voltage V2 is approximately four times as high as the voltage V1, V1 and V2 being 50V and approximately 200V, respectively.

As shown in FIG. 17, the DC/DC power converting apparatus of this embodiment employs circuits A1d-A4d instead of the circuits A1-A4 of the DC/DC power converting apparatus of the aforementioned tenth embodiment shown in FIG. 13. The circuits A1d, A2d, A4d have the same configuration as the circuits A1, A2, A4 whereas the circuit A3d is configured with diodes (Di3L, Di3H) which substitute for the two MOSFETs (Mos3L, Mos3H), respectively. Specifically, the driving inverter circuits A1d, A2d, A4d are configured with pairs of MOSFETs, wherein each pair of MOSFETs, one serving as a low-voltage side device and the other as a high-voltage side device which are connected in series, is connected across opposite terminals of one of smoothing capacitors Cs1, Cs2, Cs4. Also, the rectifier circuit A3d is configured with the two diodes (Di3L, Di3H), one serving as a low-voltage side device and the other as a high-voltage side device, which are connected in series and together connected across opposite terminals of a smoothing capacitor Cs3. Accordingly, the gate driving circuit 113, the photocouplers 123H, 123L, the power supply Vs3 and the gate signals Gate3H, Gate3L for driving the MOSFETs of the circuit A3 of FIG. 13 are eliminated from the configuration shown therein. In this embodiment, only the driving gate signals Gate1H, Gate2H, Gate4H, Gate1L, Gate2L, Gate4L are output from a control circuit. The DC/DC power converting apparatus has otherwise the same configuration as the aforementioned tenth embodiment shown in FIG. 13.

While the driving gate signals Gate1H, Gate2H, Gate4H, Gate1L, Gate2L, Gate4L are generated in the same way as in the aforementioned tenth embodiment, the currents which flow through the MOSFETs of the rectifier circuits in the aforementioned tenth embodiment flow through the diodes of the rectifier circuit A3d in this embodiment, thus causing conduction loss. Due to the voltage-lowering operation performed in the same way as in the aforementioned tenth embodiment, however, it is possible to effectively use the resonance phenomenon of the LC series circuits LC13, LC23, LC34 and realize a DC/DC power converting apparatus having a high conversion efficiency.

Additionally, currents flowing through the respective LC series circuits LC13, LC23, LC34 and voltages across the capacitors Cr13, Cr23, Cr34 are approximately the same as in the case of the aforementioned tenth embodiment.

Specifically, it is possible to make the values of the currents flowing through the individual LC series circuits LC13, LC23, LC34 equal to minimum values and, thus, reduce the current values in this embodiment too as in the aforementioned tenth embodiment. This makes it possible to lower current ratings of the inductors Lr and the capacitors Cr of the LC series circuits LC13, LC23, LC34 used for energy transfer and reduce the inductors Lr and the capacitors Cr in size. Also, as the voltage terminals VL and Vcom serving as the output terminals are connected to both terminals of the smoothing capacitor Cs3 of the circuit A3 which is located midway between the other circuits, it is possible to lower voltage ratings of the capacitors Cr13, Cr23, Cr34 of the LC series circuits LC13, LC23, LC34 and further reduce the capacitors in size as in the foregoing ninth embodiment.

Fourteenth Embodiment

Figure 18:
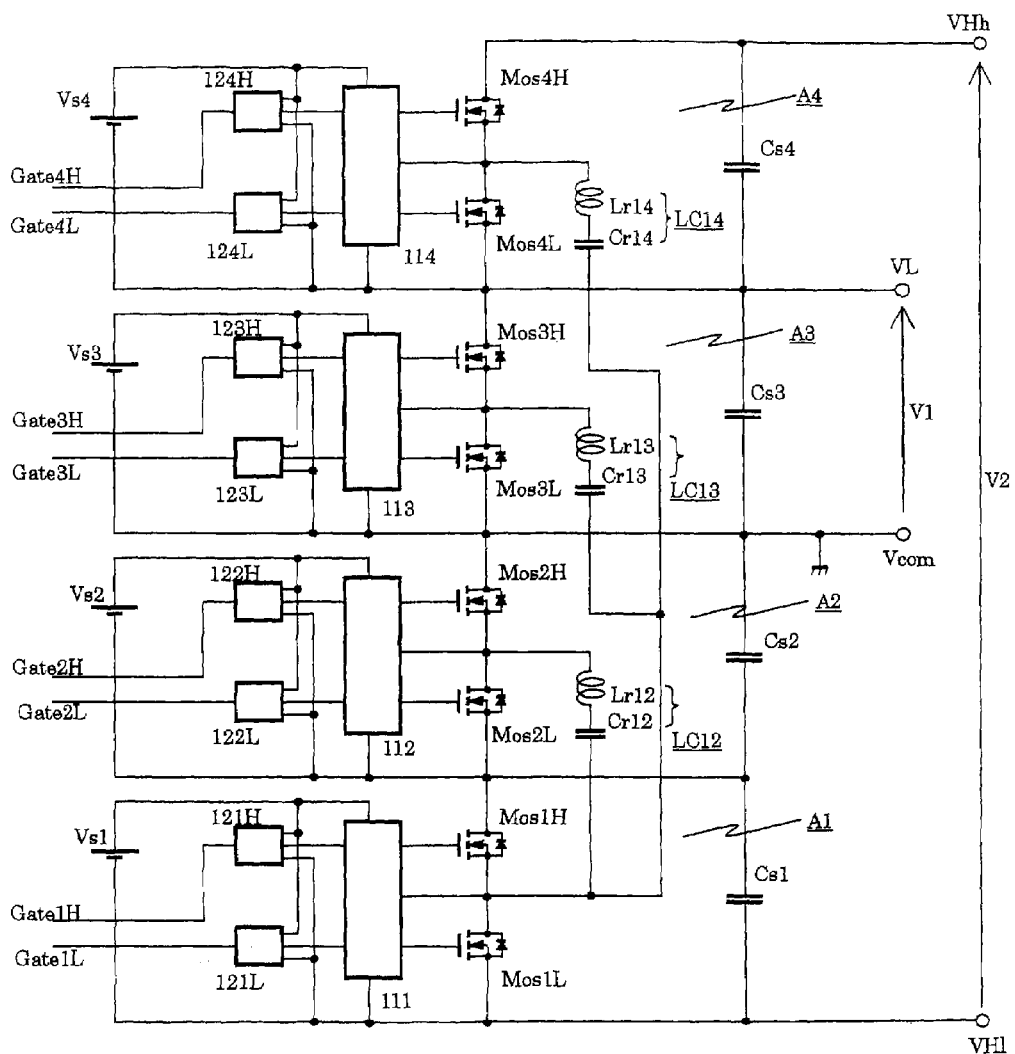
FIG. 18 is a diagram showing the circuit configuration of a principal portion of a DC/DC power converting apparatus according to a fourteenth embodiment of the present invention.
Figure 19:
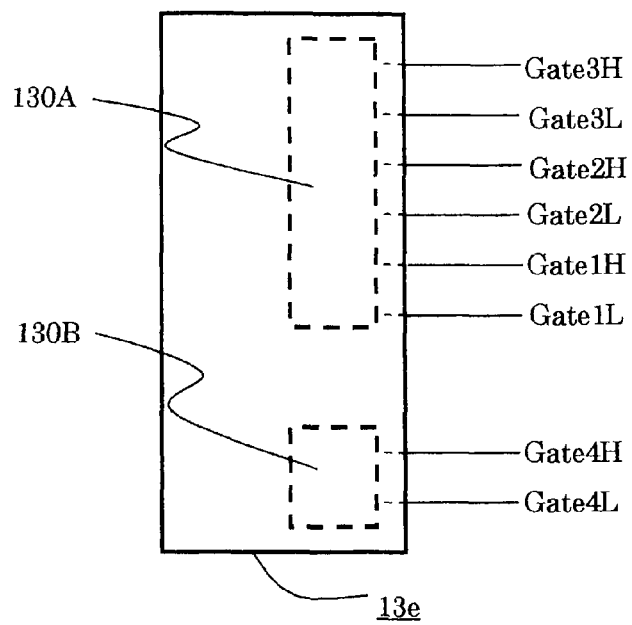
FIG. 19 is a diagram showing the circuit configuration of a gate signal generator of the DC/DC power converting apparatus according to the fourteenth embodiment of the present invention.

Next, a DC/DC power converting apparatus according to a fourteenth embodiment of the present invention is described. FIGS. 18 and 19 show the circuit configuration of the DC/DC power converting apparatus according to the fourteenth embodiment of the present invention. Particularly, FIG. 18 shows a principal portion of the apparatus and FIG. 19 shows a gate signal generator.

Shown in this fourteenth embodiment is a boost-type DC/DC power converting apparatus having a function to convert a voltage V1 input from across voltage terminals VL and Vcom to a voltage V2, which is approximately four times as high as the voltage V1, and output the voltage V2 thus raised from across voltage terminals VHh and VHl.

As shown in FIG. 18, the circuit configuration of the present invention differs from that of the aforementioned first embodiment shown in FIG. 1 in voltage terminal locations. The positive voltage terminal VL on the low-voltage side is connected to a connecting point of smoothing capacitors Cs3 and Cs4, and the grounded negative voltage terminal Vcom on the low-voltage side is connected to a connecting point of smoothing capacitors Cs2 and Cs3. Also, the positive voltage terminal VHh on the high-voltage side is connected to the high-voltage side terminal of the smoothing capacitor Cs4, and the negative voltage terminal VHl on the high-voltage side is connected to the low-voltage side terminal of a smoothing capacitor Cs1. Specifically, while the low-voltage side voltage terminals VL and Vcom are connected to both terminals of the smoothing capacitor Cs1 in the aforementioned first embodiment, the low-voltage side voltage terminals VL and Vcom are connected to both terminals of the smoothing capacitor Cs3 of the circuit A3 which is located midway between the other circuits, so that the voltage V1 is input across the terminals of the smoothing capacitor Cs3 in this embodiment. The circuit configuration is otherwise the same as the aforementioned first embodiment, and values of periods of resonance determined by inductance values and capacitance values of the inductors Lr and the capacitors Cr of the LC series circuits LC12, LC13, LC14 of the individual stages are made equal to one another.

The circuits A3 and A2 are used as driving inverter circuits for transferring energy input from across the voltage terminals VL and Vcom to the high-voltage side and the low-voltage side through ON/OFF operation of the MOSFETs (Mos3L, Mos3H), (Mos2L, Mos2H). Also, the circuit A4 is used as a rectifier circuit for rectifying a current driven by the driving inverter circuits A3, A2 and transferring the energy. While the circuit A1 takes a role as both a driving inverter circuit and a rectifier circuit, the circuit A1 drives by using below-mentioned driving gate signals so that the circuit A1 is herein referred to as the driving inverter circuit.

As shown in FIG. 19, gate signals Gate1L, Gate1H, Gate2L, Gate2H, Gate3L, Gate3H, Gate4L, Gate4H are generated by a control circuit 13e which constitutes the gate signal generator. The control circuit 13e has a driving gate signal generating portion 130A for generating the driving gate signals Gate3L, Gate3H, Gate2L, Gate2H, Gate1L, Gate1H for driving the driving inverter circuits A3, A2, A1 and a rectification gate signal generating portion 130B for generating the rectification gate signals Gate4L, Gate4H for driving the rectifier circuit A4. In this embodiment, a signal processing circuit like a microcomputer generates the driving gate signals and the rectification gate signals.

Next, the working is described.

The capacitance values of the smoothing capacitors Cs1, Cs2, Cs3, Cs4 are set at sufficiently large values as compared to the capacitance values of the capacitors Cr12, Cr13, Cr14 of the LC series circuits.

As the voltage V1 input from across the voltage terminals VL and Vcom is raised to the voltage V2 which is approximately four times as high as the voltage V1 and the voltage V2 thus raised is output from across the voltage terminals VHh and VHl as mentioned above, a load is connected between the voltage terminals VHh and VHl and, thus, the voltage V2 has a smaller value than 4×V1. Under steady-state conditions, the smoothing capacitor Cs3 is charged to a voltage equal to the voltage V1 and each of the smoothing capacitors Cs1, Cs2, Cs4 is charged to a voltage equal to (V2−V1)/3 on average.

The driving gate signals Gate3L, Gate3H, Gate2L, Gate2H, Gate1L, Gate1H are ON/OFF signals having a period T which is approximately equal to the period of resonance 2t determined by LC series resonance of Lr and Cr and a duty cycle of about 50%. Also, as is the case with the rectification gate signals of the aforementioned first embodiment, rise timings of pulses of the rectification gate signals Gate4L, Gate4H are set to coincide with rise timings of individual pulses of the driving gate signals and fall timings of the pulses of the rectification gate signals Gate4L, Gate4H are set to precede fall timings of the individual pulses of the driving gate signals by specific time periods τH, τL, respectively (refer to FIG. 3).

Since the circuit A1 which is the driving inverter circuit plays a role in rectification in this embodiment, reversing of currents flowing in the circuit A1 is avoided if the period T of the driving gate signals is made approximately equal to the period of resonance 2t.

When Mos1L, Mos2L, Mos3L, Mos4L which are the low-voltage side MOSFETs of the individual circuits A1-A4 are brought into the ON state, part of energy stored in the smoothing capacitors Cs3, Cs2, Cs1 is transferred to the capacitor Cr14 and energy charged into the capacitors Cr13, Cr12 is transferred to the smoothing capacitors Cs2, Cs1 through paths shown below, respectively, due to the presence of voltage differences. In Mos4L, a current flows from the source to the drain through the parasitic diode of the MOSFET even when the rectification pulse is in the OFF state. Specifically, in Mos4L, the current flows during the time period t which is equal to one-half the period of resonance of the LC series circuit LC14 and, then, the current is interrupted by the reverse current preventing function of the parasitic diode.

Cs1⇒Cs2⇒Cs3⇒Mos4L⇒Lr14⇒Cr14⇒Mos1L
Cr13⇒Lr13⇒Mos3L⇒Cs2⇒Cs1⇒Mos1L
Cr12⇒Lr12⇒Mos2L⇒Cs1⇒Mos1L

Subsequently, when Mos1H, Mos2H, Mos3H, Mos4H which are the high-voltage side MOSFETs of the individual circuits A1-A4 are brought into the ON state, the energy charged into the capacitor Cr14 is transferred to the smoothing capacitors Cs4, Cs3, Cs2, Cs1 and part of energy stored in the smoothing capacitors Cs2, Cs3 is transferred to the capacitors Cr13, Cr12 through paths shown below, respectively, due to the presence of voltage differences. In Mos4H, a current flows from the source to the drain through the parasitic diode of the MOSFET even when the rectification pulse is in the OFF state. Specifically, in Mos4H, a current flows during the time period t which is equal to one-half the period of resonance of the LC series circuit LC14 and, then, the current is interrupted by the reverse current preventing function of the parasitic diode.

Cr14⇒Lr14⇒Mos4H⇒Cs4⇒Cs3⇒Cs2⇒Mos1H
Cs2⇒Cs3⇒Mos3H⇒Lr13⇒Cr13⇒Mos1H
Cs2⇒Mos2H⇒Lr12⇒Cr12⇒Mos1H

The energy is transferred from the smoothing capacitor Cs3 to the smoothing capacitors Cs1, Cs2, Cs4 as a result of charging and discharging operation of the capacitors Cr12, Cr13, Cr14 as discussed above. Then, the voltage V1 input from across the voltage terminals VL and Vcom is raised to the voltage V2 which is approximately four times as high as the voltage V1 and the voltage V2 thus raised is output from across the voltage terminals VHh and VHl. Also, the inductors Lr12, Lr13, Lr14 are series-connected to the capacitors Cr12, Cr13, Cr14 to configure the LC series circuits LC13, LC13, LC14, respectively. This configuration utilizes the resonance phenomenon for transferring the energy, making it possible to efficiently transfer a large amount of energy.

Additionally, it is possible to make the values of currents flowing through the individual LC series circuits LC12, LC13, LC14 equal to minimum values and, thus, reduce the current values as in the aforementioned first embodiment. This makes it possible to lower current ratings of the inductors Lr and the capacitors Cr of the LC series circuits LC12, LC13, LC14 used for energy transfer and reduce the inductors Lr and the capacitors Cr in size.

The present embodiment employs the MOSFETs in the rectifier circuit A4 so that it is possible to reduce conduction loss and improve power conversion efficiency as compared to levels achieved with an arrangement using diodes.

Also, the MOSFETs of the rectifier circuit A4 are brought into the ON state simultaneously with the MOSFETs of the driving inverter circuits A3, A2, A1 and brought into the OFF state earlier than the MOSFETs of the driving inverter circuits A3, A2, A1 by a period of time not exceeding the time period t. It would be possible to minimize the conduction loss if the ON period of the MOSFETs of the rectifier circuit A4 is matched to the conduction period t of the MOSFETs. However, the MOSFETs of the rectifier circuit A4 conduct through the parasitic diodes if the ON state of the MOSFETs is terminated earlier as discussed above, so that the energy can be transferred during this conduction period as well. It is therefore possible to avoid problems caused by a delay in control, for instance, and improve reliability.

Additionally, since the rectification gate signals are generated within the time period t from the rise timings of the driving gate signals, currents are interrupted after flowing during the time period t which is equal to one-half the period of resonance of the LC series circuits LC12, LC13, LC14 and, thus, the currents do not flow in the reverse direction. It is therefore possible to effectively use the resonance phenomenon of the LC series circuits LC12, LC13, LC14. Moreover, as the conduction loss can be reduced by use of the MOSFETs, it is possible to realize a DC/DC power converting apparatus having a high conversion efficiency.

Furthermore, since the control circuit 13e has the driving gate signal generating portion 130A and the rectification gate signal generating portion 130B to separately generate the driving gate signals Gate3L, Gate3H, Gate2L, Gate2H, Gate1L, Gate1H and the rectification gate signals Gate4L, Gate4H, it is possible to easily control the MOSFETs of the rectifier circuit A4 separately from the MOSFETs of the driving inverter circuits A3, A2, A1 and realize the above-described desirable operation as well as a DC/DC power converting apparatus having a high conversion efficiency in a reliable fashion.

While the gate signals for the driving inverter circuits A3, A2, A1 and the gate signals for the rectifier circuit A4 are generated by the control circuit 13e in this fourteenth embodiment, the gate signals for the rectifier circuit A4 may be generated by detecting the currents flowing through the capacitors Cr as in the foregoing fourth to sixth embodiments.

Fifteenth Embodiment

While the boost-type DC/DC power converting apparatus for raising the voltage V1 to the voltage V2 which is approximately four times as high as the voltage V1 has been described in the foregoing fourteenth embodiment, the following discussion of the present embodiment illustrates a buck-type DC/DC power converting apparatus which lowers the voltage V2 down to the voltage V1.

Figure 20:
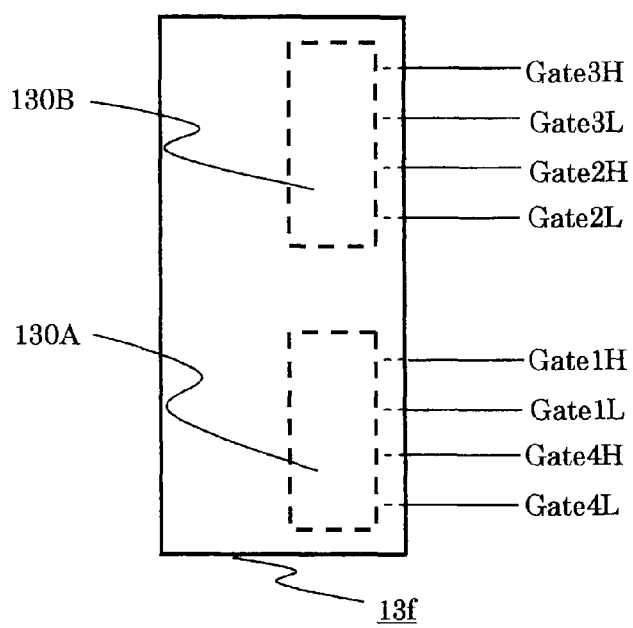
FIG. 20 is a diagram showing the circuit configuration of a gate signal generator of a DC/DC power converting apparatus according to a fifteenth embodiment of the present invention.

While a principal portion of the circuit configuration of the DC/DC power converting apparatus according to the present embodiment is the same as the circuit configuration shown in FIG. 18, the circuit A4 is used as a driving inverter circuit and the circuits A3, A2 are used as rectifier circuits in this embodiment. While the circuit A1 takes a role as both a driving inverter circuit and a rectifier circuit, the circuit A1 drives by using below-mentioned driving gate signals so that the circuit A1 is herein referred to as the driving inverter circuit. A control circuit 13f which is a gate signal generator is shown in FIG. 20. In this embodiment, the voltage terminals VL, Vcom connected to both terminals of the smoothing capacitor Cs3 serve as output terminals from which the voltage V1 obtained from across the terminals of the smoothing capacitor Cs3 is output, and to which a load is connected.

As shown in FIG. 20, gate signals Gate1L, Gate1H, Gate2L, Gate2H, Gate3L, Gate3H, Gate4L, Gate4H are generated by a control circuit 13f. The control circuit 13f has a driving gate signal generating portion 130A for generating the driving gate signals Gate4L, Gate4H, Gate1L, Gate1H for driving the driving inverter circuits A4, A1 and a rectification gate signal generating portion 130B for generating the rectification gate signals Gate3L, Gate3H, Gate2L, Gate2H for driving the rectifier circuits A3, A2. A signal processing circuit like a microcomputer generates the driving gate signals and the rectification gate signals in this embodiment as well.

Next, the working is described.

The capacitance values of the smoothing capacitors Cs1, Cs2, Cs3, Cs4 are set at sufficiently large values as compared to the capacitance values of the capacitors Cr12, Cr13, Cr14 of the LC series circuits.

As the voltage V2 input from across the voltage terminals VHh and VHl is lowered to the voltage V1 which is approximately ¼ times the voltage V2 and the voltage V1 thus lowered is output from across the voltage terminals VL and Vcom as mentioned above, a load is connected between the voltage terminals VL and Vcom and, thus, the voltage V2 has a larger value than 4×V1.

The driving gate signals Gate4L, Gate4H, Gate1L, Gate1H are ON/OFF signals having a period T which is approximately equal to the period of resonance 2t determined by LC series resonance of Lr and Cr and a duty cycle of about 50%. Rise timings of the rectification gate signals Gate3L, Gate3H, Gate2L, Gate2H are set to coincide with rise timings of the driving gate signals and fall timings of the rectification gate signals Gate3L, Gate3H, Gate2L, Gate2H are set to precede fall timings of the driving gate signals by specific time periods τH, τL, respectively.

Since the circuit A1 which is the driving inverter circuit plays a role in rectification in this embodiment, reversing of currents flowing in the circuit A1 is avoided if the period T of the driving gate signals is made approximately equal to the period of resonance 2t.

When Mos1H, Mos2H, Mos3H, Mos4H which are the high-voltage side MOSFETs of the individual circuits A1-A4 are brought into the ON state, part of energy stored in the smoothing capacitors Cs4, Cs3, Cs2 is transferred to the capacitor Cr14 and energy charged into the capacitors Cr13, Cr12 is transferred to the smoothing capacitors Cs3, Cs2 through paths shown below, respectively, due to the presence of voltage differences. In Mos3H, Mos2H, currents flow from the sources to the drains through the parasitic diodes of the respective MOSFETs even when the rectification pulse is in the OFF state. Specifically, in each of Mos3H and Mos2H, the current flows during the time period t which is equal to one-half the period of resonance of the LC series circuits LC13, LC12 and, then, the current is interrupted by the reverse current preventing function of the parasitic diode.
Cs2⇒Cs3⇒Cs4⇒Mos4H⇒Lr14⇒Cr14⇒Mos1H
Cr13⇒Lr13⇒Mos3H⇒Cs3⇒Cs2⇒Mos1H
Cr12⇒Lr12⇒Mos2H⇒Cs2⇒Mos1H Subsequently, when Mos1L, Mos2L, Mos3L, Mos4L which are the low-voltage side MOSFETs of the individual circuits A1-A4 are brought into the ON state, the energy charged into the capacitor Cr14 is transferred to the smoothing capacitors Cs3, Cs2, Cs1 and part of energy stored in the smoothing capacitors Cs1, Cs2 is transferred to the capacitors Cr13, Cr12 through paths shown below, respectively, due to the presence of voltage differences. In Mos3L, Mos2L, currents flow from the sources to the drains through the parasitic diodes of the respective MOSFETs even when the rectification pulse is in the OFF state. Specifically, in each of Mos3L and Mos2L, the current flows during the time period t which is equal to one-half the period of resonance of the LC series circuits LC13, LC12 and, then, the current is interrupted by the reverse current preventing function of the parasitic diode.
Cr14⇒Lr14⇒Mos4L⇒Cs3⇒Cs2⇒Cs1⇒Mos1L
Cs1⇒Cs2⇒Mos3L⇒Lr13⇒Cr13⇒Mos1L
Cs1⇒Mos2L⇒Lr12⇒Cr12⇒Mos1L The voltage V2 input from across the voltage terminals VHh and VHl is lowered to the voltage V1 which is approximately ¼ times the voltage V2 as a result of charging and discharging operation of the capacitors Cr14, Cr13, Cr12 as discussed above and the voltage V1 thus lowered is output from across the voltage terminals VL and Vcom. Also, the inductors Lr14, Lr13, Lr12 are series-connected to the capacitors Cr14, Cr13, Cr12, respectively, to configure the LC series circuits. This configuration utilizes the resonance phenomenon for transferring the aforementioned energy, making it possible to efficiently transfer a large amount of energy.

As in the foregoing fourteenth embodiment, it is possible to make the values of currents flowing through the individual LC series circuits LC14, LC13, LC12 equal to minimum values and, thus, reduce the current values in this embodiment as well. This makes it possible to lower current ratings of the inductors Lr and the capacitors Cr of the LC series circuits LC14, LC13, LC12 used for energy transfer and reduce the inductors Lr and the capacitors Cr in size.

The present embodiment employs the MOSFETs in the rectifier circuits A3, A2 so that it is possible to reduce conduction loss and improve power conversion efficiency as compared to levels achieved with an arrangement using diodes.

Also, the MOSFETs of the rectifier circuits A3, A2 are brought into the ON state simultaneously with the MOSFETs of the driving inverter circuits A4, A1 and brought into the OFF state earlier than the MOSFETs of the driving inverter circuits A4, A1 by a period of time not exceeding the time period t. It would be possible to minimize the conduction loss if the ON period of the MOSFETs of the rectifier circuits A3, A2 is matched to the conduction period t of the MOSFETs. However, the MOSFETs of the rectifier circuits A3, A2 conduct through the parasitic diodes if the ON state of the MOSFETs is terminated earlier as discussed above, so that the energy can be transferred during this conduction period as well. It is therefore possible to avoid problems caused by a delay in control, for instance, and improve reliability.

Additionally, since pulses of the rectification gate signals are generated within the time period t from the rise timings of pulses of the driving gate signals in this embodiment as well, currents are interrupted after flowing during the time period t which is equal to one-half the period of resonance of the LC series circuits LC12, LC13, LC14 and, thus, the currents do not flow in the reverse direction. It is therefore possible to effectively use the resonance phenomenon of the LC series circuits LC12, LC13, LC14. Moreover, as the conduction loss can be reduced by use of the MOSFETs in the rectifier circuits A3, A2, it is possible to realize a DC/DC power converting apparatus having a high conversion efficiency.

Furthermore, since provision is made to separately generate the driving gate signals and the rectification gate signals, it is possible to easily control the MOSFETs of the rectifier circuits A3, A2 separately from the MOSFETs of the driving inverter circuits A4, A1 and realize the above-described desirable operation as well as a DC/DC power converting apparatus having a high conversion efficiency in a reliable fashion.

It is to be pointed out that the gate signals for the rectifier circuits A3, A2 may be generated by detecting the currents flowing through the capacitors Cr in this fifteenth embodiment too as in the foregoing fourth to sixth embodiments.

Furthermore, although the input/output voltage terminals VL, Vcom are connected to both terminals of the smoothing capacitor Cs3 in the foregoing fourteenth and fifteenth embodiments, the voltage terminals VL, Vcom may be connected to both terminals of the smoothing capacitor Cs2. This alternative configuration also makes it possible to obtain the same advantageous effects as discussed in the fourteenth and fifteenth embodiments. Moreover, even when the number of stages of rectifier circuits is increased, it is possible to obtain the same advantageous effects if the voltage terminals VL, Vcom are connected to both terminals of the smoothing capacitor Cs of a circuit located midway between other circuits.

Additionally, while the boost-type DC/DC power converting apparatus for raising V1 to V2 has been described in the foregoing fourteenth embodiment and the buck-type DC/DC power converting apparatus for lowering V2 to V1 has been described in the foregoing fifteenth embodiment, it is possible to configure a buck-boost DC/DC power converting apparatus having the functions of both the aforementioned fourteenth and fifteenth embodiments to realize bi-directional energy transfer. In this case, the buck-boost DC/DC power converting apparatus is realized by inputting voltages at the voltage terminals VL, Vcom, VHh, VHl into a control circuit and switching the rectification gate signals and the driving gate signals by the control circuit based on the voltages at the voltage terminals as in the aforementioned third embodiment. Alternatively, the buck-boost DC/DC power converting apparatus may be realized by providing a circuit for generating rectification gate signals for voltage-boosting mode operation and a circuit for generating rectification gate signals for voltage-lowering mode operation by using detected currents, and switching the rectification gate signals and the driving gate signals as discussed in the fifth embodiment.

Also, in the foregoing fourteenth and fifteenth embodiments, each of the rectifier circuits may be configured with a pair of diodes, one serving as a low-voltage side device and the other as a high-voltage side device, which are connected in series and together connected across opposite terminals of a pertinent one of the smoothing capacitors. In this embodiment, elements other than the gate driving circuits, the photocouplers, the power supplies and the gate signals for driving the MOSFETs of the driving inverter circuits are eliminated and only the driving gate signals are output from a control circuit. Conduction loss would occur as currents flow through the diodes of each rectifier circuit. Due to operation performed in the same way as in the aforementioned fourteenth and fifteenth embodiments, however, it is possible to effectively use the resonance phenomenon of the LC series circuits LC12, LC13, LC14 and realize a DC/DC power converting apparatus having a high conversion efficiency.

Sixteenth Embodiment

Figure 21:
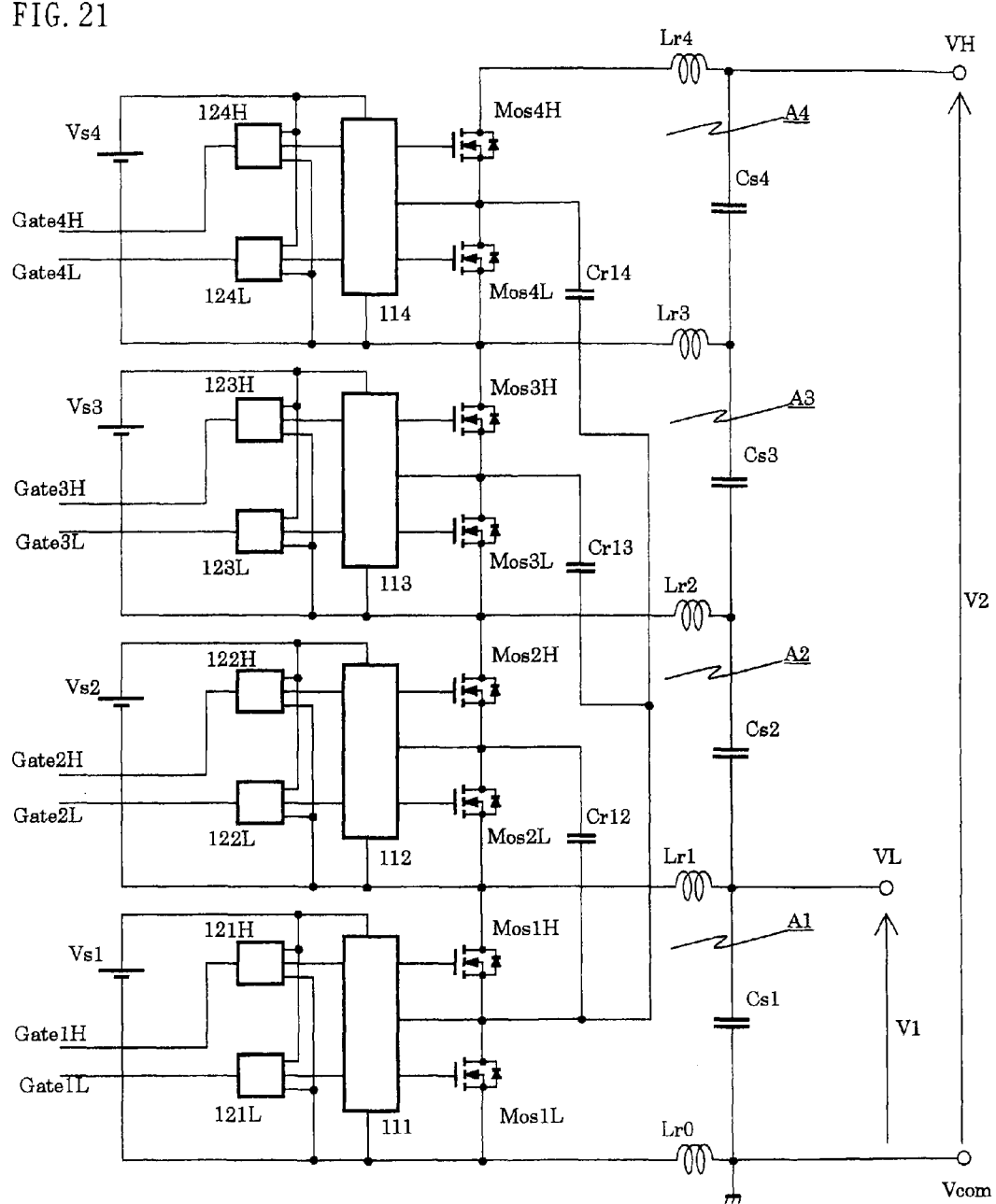
FIG. 21 is a diagram showing the circuit configuration of a principal portion of a DC/DC power converting apparatus according to a sixteenth embodiment of the present invention.

Next, a DC/DC power converting apparatus according to a sixteenth embodiment of the present invention is described. FIG. 21 shows the circuit configuration of a principal portion of the DC/DC power converting apparatus according to the sixteenth embodiment of the present invention. A gate signal generator is the same as shown in FIG. 2.

Shown in this sixteenth embodiment is a boost-type DC/DC power converting apparatus having a function to convert a voltage V1 input from across voltage terminals VL and Vcom to a voltage V2, which is approximately four times as high as the voltage V1, and output the voltage V2 thus raised from across voltage terminals VH and Vcom.

As shown in FIG. 21, the DC/DC power converting apparatus of this embodiment differs from that of the aforementioned first embodiment in locations of inductors Lr. Specifically, while each of the capacitors Cr12, Cr13, Cr14 for energy transfer is connected between the intermediate terminals of the circuit A1 and another circuit, inductors Lr0, Lr1, Lr2, Lr3, Lr4 connected in paths for charging and discharging the capacitors Cr12, Cr13, Cr14 are connected between lines interconnecting a plurality of MOSFETs and terminals of smoothing capacitors Cs1, Cs2, Cs3, Cs4, respectively.

Electrical connections are now described in detail. The inductor Lr4 is connected between the high-voltage side terminal of the smoothing capacitor Cs4 and the drain terminal of Mos4H, the inductor Lr3 is connected between the high-voltage side terminal of the smoothing capacitor Cs3 and the drain terminal of Mos3H, the inductor Lr2 is connected between the high-voltage side terminal of the smoothing capacitor Cs2 and the drain terminal of Mos2H, the inductor Lr1 is connected between the high-voltage side terminal of the smoothing capacitor Cs1 and the drain terminal of Mos1H, and the inductor Lr0 is connected between the low-voltage side terminal of Cs1 and the source terminal of Mos1L.

Capacitance values of the individual capacitors Cr are made approximately equal to one another as are inductance values of the individual inductors Lr and, thus, in the charging and discharging paths of the individual capacitors Cr, values of periods of resonance determined by the inductance values and the capacitance values are made equal to one another. In this embodiment, the charging and discharging path of each capacitor Cr contains the relevant capacitor Cr and two inductors Lr, so that the period of resonance is calculated as $2\pi(2Lr \cdot Cr)^{0.5}$, where Lr indicates the inductance value of the inductor Lr and Cr indicates the capacitance value of the capacitor Cr.

As is the case with the aforementioned first embodiment, the circuit A1 is used as a driving inverter circuit for transferring energy input from across the voltage terminals VL and Vcom to the high-voltage side through ON/OFF operation of the MOSFETs (Mos1L, Mos1H). Also, the circuits A2, A3, A4 are used as rectifier circuits for rectifying a current driven by the driving inverter circuit and transferring the energy to the high-voltage side. Gate signals Gate1L, Gate1H, Gate2L, Gate2H, Gate3L, Gate3H, Gate4L, Gate4H are also the same as the aforementioned first embodiment (refer to FIG. 3).

Next, the working is described.

The capacitance values of the smoothing capacitors Cs1, Cs2, Cs3, Cs4 are set at sufficiently large values as compared to the capacitance values of the capacitors Cr12, Cr13, Cr14.

As the voltage V1 input from across the voltage terminals VL and Vcom is raised to the voltage V2 which is approximately four times as high as the voltage V1 and the voltage V2 thus raised is output from across the voltage terminals VH and Vcom as mentioned above, a load is connected between the voltage terminals VH and Vcom and, thus, the voltage V2 has a smaller value than 4×V1. Under steady-state conditions, the smoothing capacitor Cs1 is charged to a voltage equal to the voltage V1 and each of the smoothing capacitors Cs2, Cs3, Cs4 is charged to a voltage equal to (V2−V1)/3 on average.

When Mos1L, Mos2L, Mos3L, Mos4L which are the low-voltage side MOSFETs of the individual circuits A1-A4 are brought into the ON state by a driving pulse 1b and a rectification pulse 2b of the gate signals fed into the low-voltage side MOSFETs, part of energy stored in the smoothing capacitors Cs1, Cs2, Cs3 is transferred to the capacitors Cr12, Cr13, Cr14 through paths shown below, respectively, due to the presence of voltage differences. In Mos2L, Mos3L, Mos4L, currents flow from the sources to the drains through the parasitic diodes of the respective MOSFETs even when the rectification pulse 2b is in an OFF state. Specifically, in each of the MOSFETs Mos2L, Mos3L, Mos4L, a current 3b flows during the time period t which is equal to one-half the aforementioned period of resonance and, then, the current is interrupted by the reverse current preventing function of the parasitic diode.

Cs1⇒Lr1⇒Mos2L⇒Cr12⇒Mos1L⇒Lr0
Cs1⇒Cs2⇒Lr2⇒Mos3L⇒Cr13⇒Mos1L⇒Lr0
Cs1⇒Cs2⇒Cs3⇒Lr3⇒Mos4L⇒Cr14⇒Mos1L⇒Lr0

Subsequently, when Mos1H, Mos2H, Mos3H, Mos4H which are the high-voltage side MOSFETs of the individual circuits A1-A4 are brought into the ON state by a driving pulse 1a and a rectification pulse 2a of the gate signals fed into the high-voltage side MOSFETs, the energy charged into the capacitors Cr12, Cr13, Cr14 is transferred to the smoothing capacitors Cs2, Cs3, Cs4 through paths shown below, respectively, due to the presence of voltage differences. In Mos2H, Mos3H, Mos4H, currents flow from the sources to the drains through the parasitic diodes of the respective MOSFETs even when the rectification pulse 2a is in an OFF state. Specifically, in each of the MOSFETs Mos2H, Mos3H, Mos4H, a current 3a flows during the time period t which is equal to one-half the aforementioned period of resonance and, then, the current is interrupted by the reverse current preventing function of the parasitic diode.

Cr12⇒Mos2H⇒Lr2⇒Cs2⇒Lr1⇒Mos1H
Cr13⇒Mos3H⇒Lr3⇒Cs3⇒Cs2⇒Lr1⇒Mos1H
Cr14⇒Mos4H⇒Lr4⇒Cs4⇒Cs3⇒Cs2⇒Lr1⇒Mos1H

The energy is transferred from the smoothing capacitor Cs1 to the smoothing capacitors Cs2, Cs3, Cs4 as a result of charging and discharging operation of the capacitors Cr12, Cr13, Cr14 as discussed above. Then, the voltage V1 input from across the voltage terminals VL and Vcom is raised to the voltage V2 which is approximately four times as high as the voltage V1 and the voltage V2 thus raised is output from across the voltage terminals VH and Vcom. Also, two of the inductors Lr (Lr0-Lr4) are connected in series in the charging and discharging path of each of the capacitors Cr12, Cr13, Cr14. This configuration utilizes the resonance phenomenon for transferring the energy, making it possible to efficiently transfer a large amount of energy.

It is also possible to reduce the values of currents flowing through the individual capacitors Cr and inductors Lr as in the aforementioned first embodiment and thus reduce the inductors Lr and the capacitors Cr in size.

Also, the MOSFETs of the rectifier circuits A2, A3, A4 are brought into the ON state simultaneously with the MOSFETs of the driving inverter circuit A1 and brought into the OFF state earlier than the MOSFETs of the driving inverter circuit A1 by a period of time not exceeding the time period t. It would be possible to minimize the conduction loss if the ON period of the MOSFETs of the rectifier circuits A2, A3, A4 is matched to the conduction period t of the MOSFETs. However, the MOSFETs of the rectifier circuits A2, A3, A4 conduct through the parasitic diodes if the ON state of the MOSFETs is terminated earlier as discussed above, so that the energy can be transferred during this conduction period as well. It is therefore possible to avoid problems caused by a delay in control, for instance, and improve reliability.

Additionally, since pulses of the rectification gate signals are generated within the time period t from the rise timings of pulses of the driving gate signals in this embodiment as well, currents are interrupted after flowing during the time period t which is equal to one-half the period of resonance and, thus, the currents do not flow in the reverse direction. It is therefore possible to effectively use the resonance phenomenon of the inductors Lr and the capacitors Cr. Moreover, as the conduction loss can be reduced by use of the MOSFETs in the rectifier circuits A2, A3, A4, it is possible to realize a DC/DC power converting apparatus having a high conversion efficiency.

Furthermore, since provision is made to separately generate the driving gate signals and the rectification gate signals, it is possible to easily control the MOSFETs of the rectifier circuits A2, A3, A4 separately from the MOSFETs of the driving inverter circuit A1 and realize the above-described desirable operation as well as a DC/DC power converting apparatus having a high conversion efficiency in a reliable fashion.

It is to be pointed out that the gate signals for the rectifier circuits A2, A3, A4 may be generated by detecting the currents flowing through the capacitors Cr in this sixteenth embodiment too as in the foregoing fourth to sixth embodiments.

Shown in this sixteenth embodiment is a case where the configuration in which the inductors Lr0-Lr4 disposed in the paths for charging and discharging the capacitors Cr for energy transfer are connected between the lines interconnecting the plurality of MOSFETs is applied to the aforementioned first embodiment. This kind of arrangement of the inductors Lr0-Lr4 can also be applied to the aforementioned second to fifteenth embodiments, yet providing the same advantageous effects as the individual embodiments.

Seventeenth Embodiment

Figure 22:
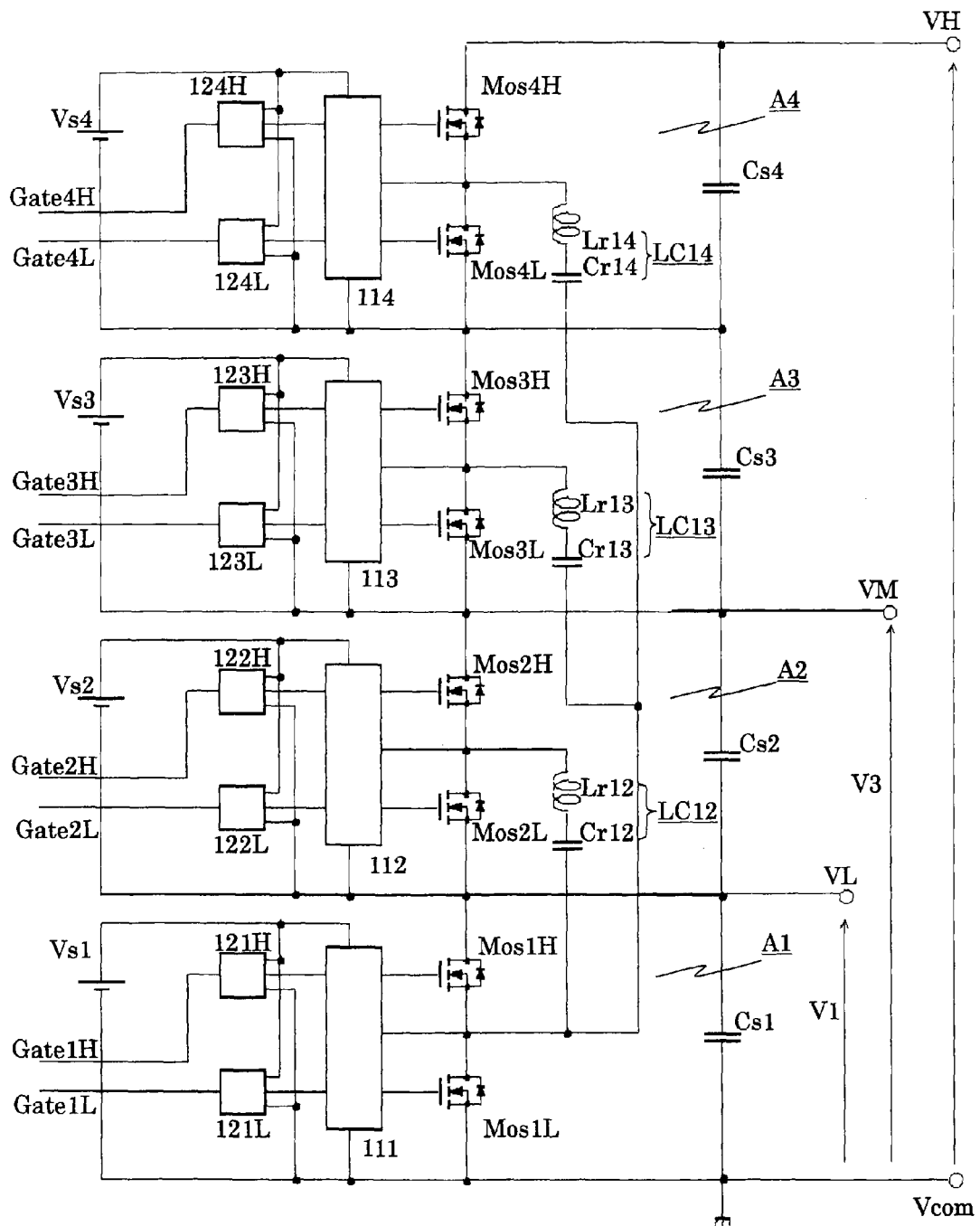
FIG. 22 is a diagram showing the circuit configuration of a principal portion of a DC/DC power converting apparatus according to a seventeenth embodiment of the present invention.

Next, a DC/DC power converting apparatus according to a seventeenth embodiment of the present invention is described. FIG. 22 shows the circuit configuration of the DC/DC power converting apparatus, in particular a principal portion thereof, according to the seventeenth embodiment of the present invention.

Described in this seventeenth embodiment is the DC/DC power converting apparatus having a function to convert a voltage V1 input from across voltage terminals VL and Vcom to a voltage V2, which is approximately four times as high as the voltage V1, and output the voltage V2 thus raised from across voltage terminals VH and Vcom, and to convert the voltage V1 to a voltage V3, which is approximately twice as high as the voltage V1, and output the voltage V3 thus raised from across the voltage terminals VM and Vcom. In this embodiment, there are two pairs of input/output terminals. These are VL-Vcom and VH-Vcom, and VL-Vcom and VM-Vcom.

As shown in FIG. 22, the voltage terminal VM is connected to the high-voltage side terminal of the smoothing capacitor Cs2. The DC/DC power converting apparatus has otherwise the same circuit configuration as that of the first embodiment, including the gate signal generator.

While the present embodiment is intended to permit the same voltage-boosting operation as in the aforementioned first embodiment, the DC/DC power converting apparatus can output the voltage V3 in addition to the voltage V2 due to the provision of the voltage terminal VM.

There may be provided three pairs or more of input/output terminals. Provision of multiple pairs of input/output terminals will permit the DC/DC power converting apparatus to raise the input voltage to multilevel voltages, thus offering an improved degree of freedom in circuit design.

While the boost-type DC/DC power converting apparatus has been described in the present embodiment, the buck-type DC/DC power converting apparatus like the one shown in the second embodiment can also output the voltage V3 in addition to the voltage V1 if provided with an intermediate voltage terminal VM. The bi-directional DC/DC power converting apparatus like the one shown in the third embodiment can also output the voltage V3 in addition to the voltage V1 if provided with an intermediate voltage terminal VM.

Multiple pairs of input/output terminals may also be provided in the aforementioned fourth to sixteenth embodiments in the same way as described above, yet offering the same advantageous effects as in the individual embodiments.

While power MOSFETs in which a parasitic diode is formed between the source and the drain are used as semiconductor switching devices in each driving inverter circuit and rectifier circuit in the foregoing individual embodiments, other types of semiconductor switching devices, like IGBTs, which can be turned on and off through a control electrode may be used instead. The semiconductor switching devices to be used in this case are of a type in which diodes connected in reverse parallel perform the function of the parasitic diodes of the power MOSFETs, whereby the same advantageous effects are achieved through the same control operation as in the foregoing individual embodiments.

Additionally, it goes without saying that the present invention as discussed in the foregoing individual embodiments is also applicable to DC/DC power converting apparatuses having various voltage ratios configured with varying numbers of stages of rectifier circuits.

Eighteenth Embodiment

Described hereinbelow are the power supplies Vsk (Vs1-Vs4) provided for driving the MOSFETs, the gate driving circuits, the photocouplers, and so on, in the plurality of circuits which constitute the DC/DC power converting apparatuses of the foregoing individual embodiments.

Figure 23:
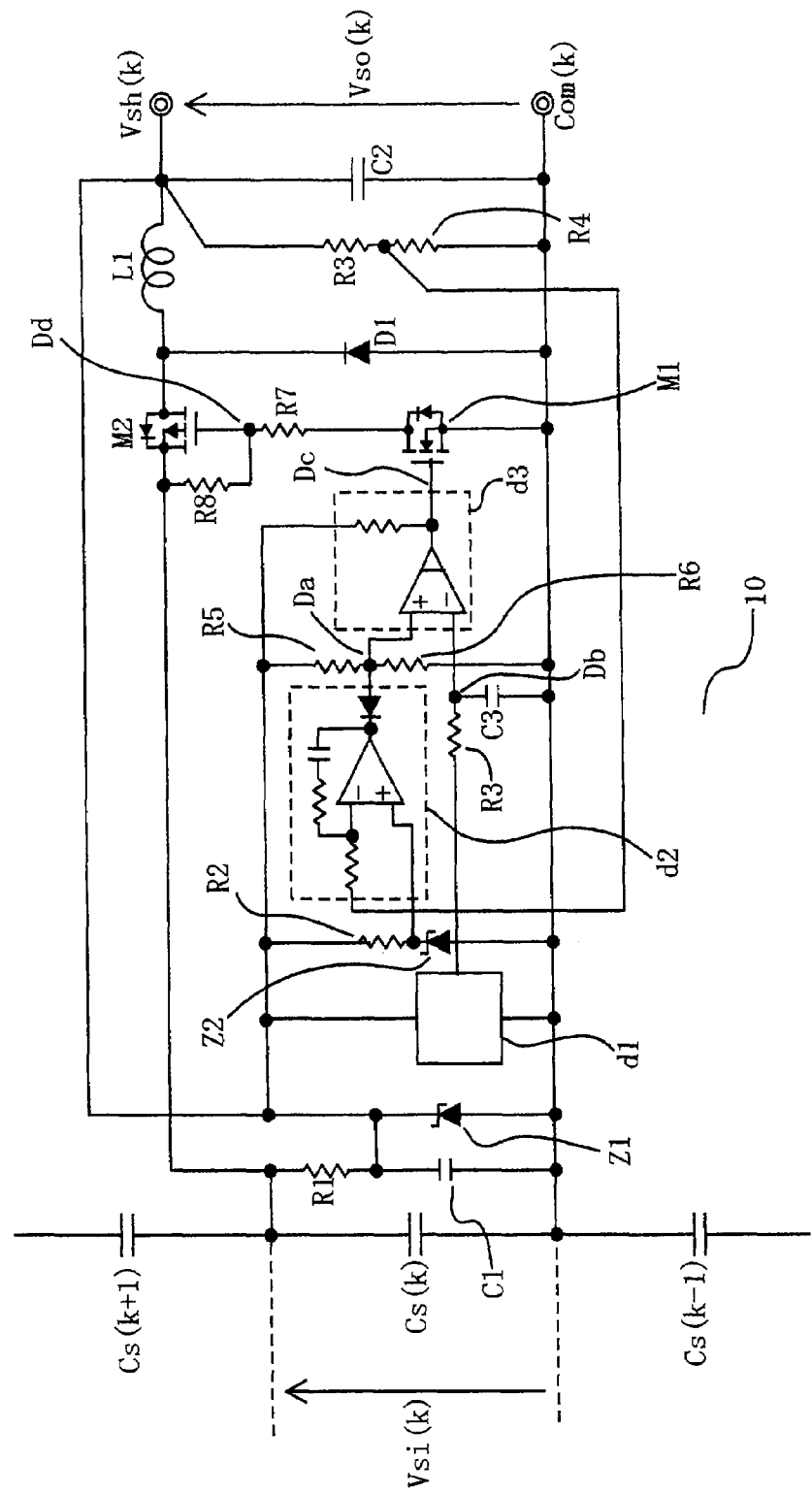
FIG. 23 is a diagram showing the configuration of a power supply Vsk of each circuit according to an eighteenth embodiment of the present invention.

FIG. 23 is a diagram showing the configuration of the power supply Vsk. Using a voltage produced across the smoothing capacitor Cs(k) (Cs1-Cs4) in each circuit as an input voltage Vsi(k), the power supply Vsk of each circuit, such as each of the power supplies Vsk of the circuits A1-A4 of the aforementioned first embodiment, produces an output voltage Vso(k) between output terminals Vsh(k) and Com(k).

Designated by Com(k) is a reference voltage of the voltages Vso(k) and Vsi(k). A high-voltage side terminal of the smoothing capacitor Cs(k) is connected to a source terminal of a p-type MOSFET M2, and a drain terminal of the MOSFET M2 is connected to a cathode terminal of a diode D1 and one terminal of a choke coil L1. An anode terminal of the diode D1 is connected to the reference voltage Com(k), the other terminal of the choke coil L1 is connected to one terminal of a capacitor C2, and the other terminal of the capacitor C2 is connected to the reference voltage Com(k). The capacitor Cs(k), the capacitor C2, the MOSFET M2, the diode D1 and the choke coil L1 together constitute a non-insulated buck-type DC/DC converter 10, through which the input voltage Vsi(k) is converted to the output voltage Vso(k).

A capacitor C1, the capacitor C2 and a Zener diode Z1 are connected parallel with one another, with an anode terminal side of the Zener diode Z1 connected to the reference voltage Com(k), and a cathode terminal side of the Zener diode Z1 connected to the terminal of the choke coil L1. The output voltage Vso(k) is produced by this parallel-connected unit of C1, C2, Z1. The voltage Vso(k) is supplied to a clock generator circuit d1, an error amplifier circuit d2 and a comparator circuit d3 to operate the individual circuits d1-d3. The Figure does not show how the voltage Vso(k) is supplied to the error amplifier circuit d2 and the comparator circuit d3.

An output of the clock generator circuit d1 is input into one of inputs of the comparator circuit d3 through a sawtooth wave generator configured with a resistor R3 and a capacitor C3. A target voltage produced by a combination of a resistor R2 and a Zener diode Z2 is input into one of inputs of the error amplifier circuit d2, and a measured voltage of Vso(k) is divided by resistors R3 and R4 and the divided voltage is input into the other of the inputs of the error amplifier circuit d2. Also, an output of the error amplifier circuit d2 is input into the other of the inputs of the comparator circuit d3 and a connecting point therebetween is connected to a connecting point of resistors R5 and R6. The other terminal of the resistor R5 is connected to the output terminal Vsh(k) at the voltage Vso(k) and the other terminal of the resistor R6 is connected to the reference voltage Com(k).

An output terminal of the comparator circuit d3 is connected to a gate terminal of an n-type MOSFET M1, and a source terminal and a drain terminal of the MOSFET M1 are connected to the reference voltage Com(k) and one terminal of a resistor R7, respectively. The other terminal of the resistor R7 is connected to a gate terminal of the MOSFET M2 and one terminal of a resistor R8. Also, the other terminal of the resistor R8 is connected to the source terminal of the MOSFET M2.

The working of the power supply Vsk thus configured is now described. In the case of voltage-lowering operation, an energy source is connected between VH and Vcom, so that a voltage appears across the smoothing capacitor Cs(k), thus causing the power supply Vsk to operate.

In the case of voltage-boosting operation, on the other hand, the energy source is connected between VL and Vcom, so that the apparatus is under conditions where a voltage appears across the smoothing capacitor Cs1 but no voltage appears across the other smoothing capacitors Cs(k) at the beginning of operation. The voltage across the smoothing capacitor Cs1, however, causes the power supply Vs1 to operate and, thus, the MOSFETs of the circuit A1 to turn on and off, so that the parasitic diodes in the MOSFETs of the circuits A2-A4 operate and energy is transferred to the smoothing capacitors Cs2, Cs3, Cs4. Although power conversion efficiency achieved by this operation using the parasitic diodes is not good enough, the time required for energy transfer to the individual smoothing capacitors Cs(k) is no more than 1 second. The voltage appears across the individual smoothing capacitors Cs(k) in this way and the individual power supplies Vsk operate.

The working is described in detail below. When the voltage is produced across the smoothing capacitor Cs(k), the capacitors C1, C2 are charged through a resistor R1. The voltage translates into a Zener voltage of the Zener diode Z1 which is 16V in this embodiment. As this voltage is supplied, the parallel-connected unit of C1, C2, Z1 produces the output voltage Vso(k), which is supplied to the clock generator circuit d1, the error amplifier circuit d2 and the comparator circuit d3. As a consequence, the individual circuits d1-d3 operate, thus causing the power supply Vsk to operate.

Since the resistor R1 has a relatively large resistance value to suppress power loss, energy supplied through the resistor R1 before operation of the power supply Vsk is not sufficient to cause the MOSFETs in the individual circuits to operate. When the power supply Vsk begins to operate, the non-insulated DC/DC converter 10 operates to convert the voltage Vsi(k) to the voltage Vso(k) and the amount of energy thereby supplied is sufficient for operating the MOSFETs in the individual circuits.

Figure 24:
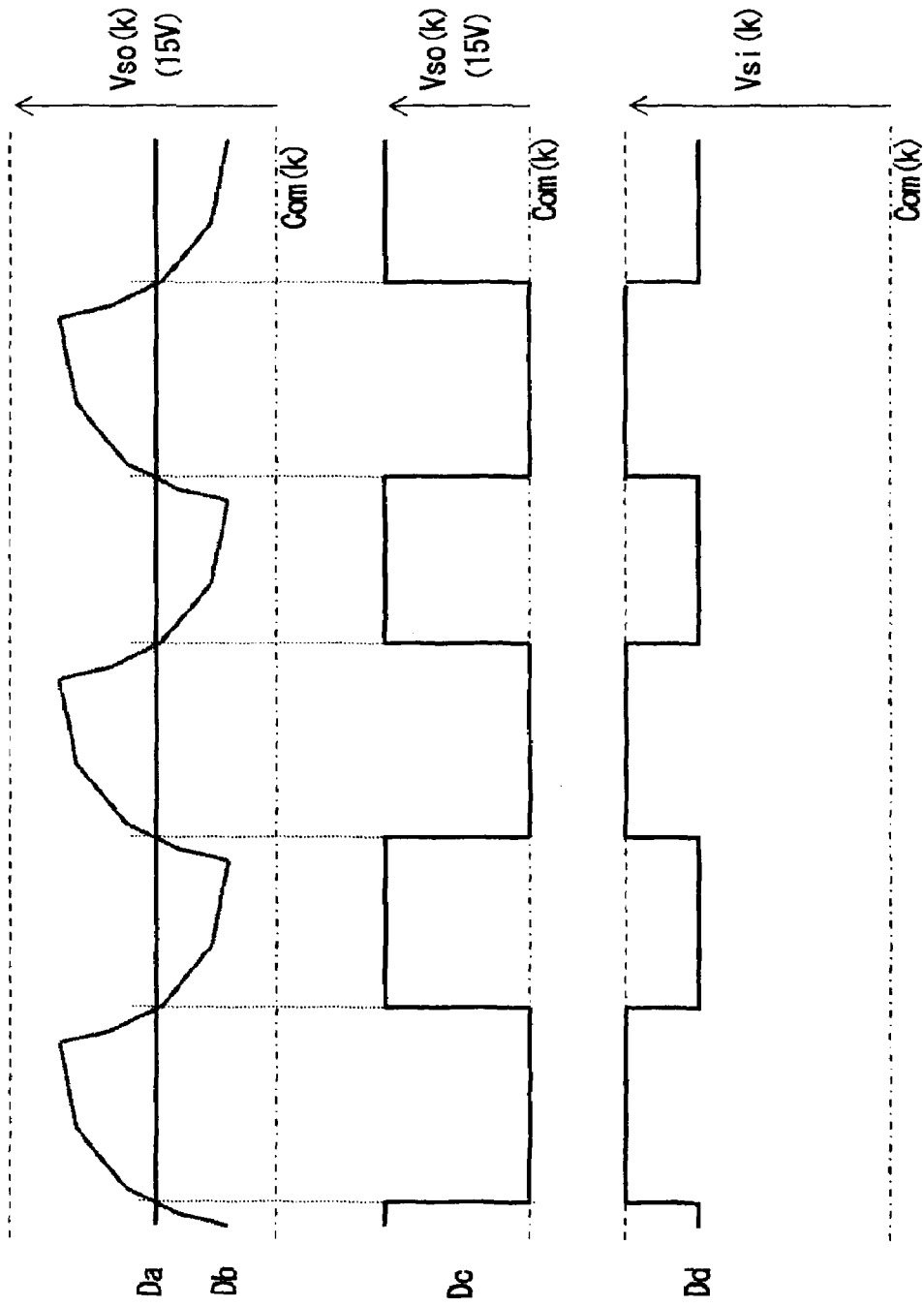
FIG. 24 is a diagram showing voltage waveforms at individual points of the power supply Vsk according to the eighteenth embodiment of the present invention.

FIG. 24 shows a voltage Da at an input terminal of the comparator circuit d3 on a side of the error amplifier circuit d2, a voltage Db at an input terminal of the comparator circuit d3 on a side of the clock generator circuit d1, a voltage Dc at the output terminal of the comparator circuit d3, and a gate voltage Dd of the MOSFET M2. The error amplifier circuit d2 outputs the voltage Da so that the voltage between the two input terminals becomes zero. Specifically, the error amplifier circuit d2 determines the voltage Da in such a manner that the output voltage Vso(k) (15V) matches the target voltage (15V) determined by the Zener diode Z2. The voltage Db is a sawtooth-shaped voltage which is formed by passing a rectangular-shaped voltage fed from the clock generator circuit d1 through a CR circuit. The rectangular-shaped voltage Dc is formed by the comparator circuit d3 based on a comparison between the voltages Da and Db. When the output voltage Vso(k) is decreased, for example, the voltage Da becomes lower and, as a result, a high-voltage period of the rectangular-shaped voltage Dc becomes shorter. The MOSFET M1 turns on and off due to the rectangular-shaped voltage Dc, and the voltage at the gate terminal of the MOSFET M2 varies between low and high levels with reference to the voltage at the source terminal of the MOSFET M1. Since the MOSFET M2 is a p-type MOSFET, the MOSFET M2 is in the ON state when the gate voltage is low and the MOSFET M2 is in the OFF state when the gate voltage is high. The voltage between the gate and source terminals of the MOSFET M2 is kept within a maximum rating due to voltage division by the resistors R7 and R8. As the MOSFET M2 performs ON/OFF operation with an ON period thereof controlled as discussed above, energy is transferred from the smoothing capacitor Cs(k) and the voltage Vso(k) between the output terminals Com(k) and Vsh(k) is controlled to match the specific voltage (15V).

In this embodiment, the power supplies Vsk for driving the individual circuits constituting the DC/DC power converting apparatus are configured to be powered from each of the smoothing capacitors Cs(k) in the individual circuits through the non-insulated type DC/DC converter 10. For this reason, there is no need for wires, connectors or the like for wiring between an input voltage portion and each power supply Vsk and it is not necessary to insulate wirings between the individual power supplies Vsk with a transformer, so that a compact power supply configuration featuring a high conversion efficiency will be obtained. This makes it possible to achieve an increase in efficiency and a reduction in size of the DC/DC power converting apparatus.

While the DC/DC converter 10 having a voltage-lowering circuit configuration has been described in the above-described embodiment on the assumption that the input voltage Vsi(k) is 20V or higher, a voltage-boosting DC/DC converter 10 is used if the input voltage Vsi(k) is as low as 10V or lower, for example.

Furthermore, while the reference voltage of the power supplies Vsk for driving the individual circuits of the DC/DC power converting apparatus is Com(k) and control portions like the gate driving circuits in the individual circuits are configured to operate with the reference voltage Com(k) in the aforementioned embodiment, the embodiment may be modified such that the control portions like the gate driving circuits in the individual circuits are configured to operate with reference to the voltage at the voltage terminal Vcom and the MOSFET M2 is driven with reference to the voltage Vcom with the reference voltage of the power supplies Vsk set at Vcom. Although this approach makes wire routings more or less complex, a power supply configuration having a high conversion efficiency will be obtained.

INDUSTRIAL APPLICABILITY

The present invention is widely applicable to DC/DC power converting apparatuses configured to utilize charging and discharging operation of capacitors for energy transfer with smoothing capacitors arranged in parallel in each of multiple circuits including a driving inverter circuit and rectifier circuits.

The invention claimed is:
1. A DC/DC power converting apparatus comprising:
 a plurality of circuits connected in series, each of said circuits including a high-voltage side device and a low-voltage side device made of semiconductor switching devices connected in series as well as a smoothing capacitor having positive and negative terminals between which said semiconductor switching devices are connected, capacitors for energy transfer connected individually between one specific circuit and the others of said plurality of circuits, and inductors disposed in charging and discharging paths of said capacitors, wherein, among said plurality of circuits, at least a specific circuit is used as a driving inverter circuit and any other circuit is used as a rectifier circuit, and said DC/DC power converting apparatus performs DC/DC conversion through charging and discharging operation of said capacitors.

2. The DC/DC power converting apparatus as recited in claim 1, wherein a connecting point of the high-voltage side device and the low-voltage side device of each of said circuits is used as an intermediate terminal, and series-connected units, each including said capacitors and said inductors, are connected individually between the intermediate terminals of said one specific circuit and said other circuits.

3. The DC/DC power converting apparatus as recited in claim 1, wherein a connecting point of the high-voltage side device and the low-voltage side device of each of said circuits is used as an intermediate terminal, said capacitors are connected individually between the intermediate terminals of said one specific circuit and said other circuits, and said inductors are each connected between a line interconnecting the high-voltage side device and the low-voltage side device and the terminals of the smoothing capacitor.

4. The DC/DC power converting apparatus as recited in claim 1, further comprising driving gate signal generating means for generating driving gate signals for ON/OFF control of said individual semiconductor switching devices in said driving inverter circuit and rectification gate signal generating means for generating rectification gate signals separately from the driving gate signals for ON/OFF control of said rectifier circuits.

5. The DC/DC power converting apparatus as recited in claim 4, wherein periods of resonance determined by capacitance of said individual capacitors and inductance of said individual inductors on the charging and discharging paths of said capacitors are equal to one another, and each of the rectification gate signals is constructed of pulses which are generated within a period of time equal to one-half the period of resonance from rise timings of individual pulses of the driving gate signals.

6. The DC/DC power converting apparatus as recited in claim 5, wherein rise timings of the individual pulses of the rectification gate signals coincide with the rise timings of the pulses of the driving gate signals and fall timings of the individual pulses of the rectification gate signals precede fall timings of the pulses of the driving gate signals by a specific time period.

7. The DC/DC power converting apparatus as recited in claim 5, wherein pulsewidth of the individual pulses of the rectification gate signals generally matches one-half the period of resonance.

8. The DC/DC power converting apparatus as recited in claim 5, further comprising current sensing means for detecting currents flowing through said capacitors connected to said rectifier circuits, wherein said rectification gate signal generating means generates the rectification gate signals according to the currents detected by said current sensing means.

9. The DC/DC power converting apparatus as recited in claim 1, wherein the DC/DC conversion is power conversion performed by voltage-boosting operation and said one specific circuit is said driving inverter circuit.

10. The DC/DC power converting apparatus as recited in claim 1, wherein the DC/DC conversion is power conversion performed by voltage-lowering operation and each of said circuits other than said one specific circuit is said driving inverter circuit.

11. The DC/DC power converting apparatus as recited in claim 1, wherein said one specific circuit is located midway between the others of said plurality of circuits with both sides of said one specific circuit connected to said other circuits.

12. The DC/DC power converting apparatus as recited in claim 1, wherein said individual circuits are provided with power supply circuits for operating said relevant circuits, wherein said power supply circuits are powered from said smoothing capacitors in said individual circuits through DC/DC converters.

13. The DC/DC power converting apparatus as recited in claim 1, wherein said DC/DC power converting apparatus is provided with multiple pairs of input/output terminals connected to the terminals of said smoothing capacitors.

14. A DC/DC power converting apparatus comprising:
a plurality of circuits connected in series, said circuits including a driving inverter circuit configured with a high-voltage side device and a low-voltage side device made of semiconductor switching devices connected in series as well as a smoothing capacitor having positive and negative terminals between which said semiconductor switching devices connected and a rectifier circuit configured with a high-voltage side device and a low-voltage side device made of diode devices connected in series as well as a smoothing capacitor having positive and negative terminals between which said diode devices are connected, capacitors for energy transfer connected individually between one specific circuit and the others of said plurality of circuits, and inductors disposed in charging and discharging paths of said capacitors, wherein said DC/DC power converting apparatus performs DC/DC conversion through charging and discharging operation of said capacitors.

15. The DC/DC power converting apparatus as recited in claim 14, wherein a connecting point of the high-voltage side device and the low-voltage side device of each of said circuits is used as an intermediate terminal, and series-connected units, each including said capacitors and said inductors, are connected individually between the intermediate terminals of said one specific circuit and said other circuits.

16. The DC/DC power converting apparatus as recited in claim 14, wherein a connecting point of the high-voltage side device and the low-voltage side device of each of said circuits is used as an intermediate terminal, said capacitors are connected individually between the intermediate terminals of said one specific circuit and said other circuits, and said inductors are each connected between a line interconnecting the high-voltage side device and the low-voltage side device and the terminals of the smoothing capacitor.

17. The DC/DC power converting apparatus as recited in claim 14, wherein periods of resonance determined by capacitance of said individual capacitors and inductance of said individual inductors on the charging and discharging paths of said capacitors are made equal to one another.

18. The DC/DC power converting apparatus as recited in claim 14, wherein the DC/DC conversion is power conversion performed by voltage-boosting operation and said one specific circuit is said driving inverter circuit.

19. The DC/DC power converting apparatus as recited in claim 14, wherein the DC/DC conversion is power conversion performed by voltage-lowering operation and each of said circuits other than said one specific circuit is said driving inverter circuit.

20. The DC/DC power converting apparatus as recited in claim 14, wherein said one specific circuit is located midway between the others of said plurality of circuits with both sides of said one specific circuit connected to said other circuits.

21. The DC/DC power converting apparatus as recited in claim 14, wherein said driving inverter circuit is provided with a power supply circuit for operating said relevant circuit, wherein said power supply circuit is powered from said smoothing capacitor in said driving inverter circuit through a DC/DC converter.

22. The DC/DC power converting apparatus as recited in claim 14, wherein said DC/DC power converting apparatus is provided with multiple pairs of input/output terminals connected to the terminals of said smoothing capacitors.

* * * * *